(12) United States Patent
Chen et al.

(10) Patent No.: US 12,055,464 B2
(45) Date of Patent: Aug. 6, 2024

(54) SYSTEMS AND METHODS FOR IMPROVED PIPELINE LEAK DETECTION

(71) Applicant: PIPESENSE, LLC, Clearbrook, MN (US)

(72) Inventors: Dingding Chen, Tomball, TX (US); Michael David Nash, Norman, OK (US); Kamy Tehranchi, Cypress, TX (US); Scott Bauer, Sugar Land, TX (US); Mitchell Stuart, Cypress, TX (US)

(73) Assignee: Pipesense, LLC, Clearbrook, MN (US)

( * ) Notice: Subject to any disclaimer, the term of this patent is extended or adjusted under 35 U.S.C. 154(b) by 0 days.

(21) Appl. No.: 18/301,059

(22) Filed: Apr. 14, 2023

(65) Prior Publication Data

US 2023/0332976 A1    Oct. 19, 2023

Related U.S. Application Data

(60) Provisional application No. 63/331,085, filed on Apr. 14, 2022.

(51) Int. Cl.
*G01M 3/28* (2006.01)
*F17D 5/02* (2006.01)
*G06N 3/043* (2023.01)
*G06N 3/0464* (2023.01)

(52) U.S. Cl.
CPC ............ *G01M 3/2815* (2013.01); *F17D 5/02* (2013.01); *G06N 3/043* (2023.01); *G06N 3/0464* (2023.01)

(58) Field of Classification Search
CPC ... G01M 3/2815; G06N 3/0464; G06N 3/043; F17D 5/02
See application file for complete search history.

(56) References Cited

U.S. PATENT DOCUMENTS

| 11,047,761 B1* | 6/2021 | Frackelton | G01M 3/2815 |
| 2015/0205000 A1* | 7/2015 | Perkins | G01V 8/10 |
| | | | 702/8 |
| 2023/0018960 A1* | 1/2023 | Ardel | G06N 3/08 |

FOREIGN PATENT DOCUMENTS

| CN | 109556797 A | * | 4/2019 | G01M 3/26 |
| JP | 2004529433 A | * | 9/2004 | |

OTHER PUBLICATIONS

J. Højstrup, "A Statistical Data Screening Procedure": Meas. Sci. Technol. 4 (1993) 153-157.

(Continued)

*Primary Examiner* — Mohamed Charioui
*Assistant Examiner* — Xiuqin Sun
(74) *Attorney, Agent, or Firm* — Locke Lord LLP; Christopher J. Capelli

(57) ABSTRACT

Provided herein are systems and methods to detect pipeline leaks. The systems and method can identify a pipeline pressure surge by applying a trained convolutional neural network (CNN) model for classifying pipeline pressure measurement images on each sensor site of a plurality of sensor sites, transfer pressure surge information obtained from at least a portion of the plurality of sensor sites to a cloud site, and determine whether the identified pressure surge is a pipeline leak at the cloud site using the pressure surge information. The plurality of sensor sites collect pipeline pressure measurement data. The pressure surge information corresponds to the identified pipeline pressure surge.

30 Claims, 45 Drawing Sheets

(56) References Cited

OTHER PUBLICATIONS

Bohorquez et al.; "Leak Detection and Topology Identification in Pipelines Using Fluid Transients and Artificial Neural Networks"; J. Water Resour. Plann. Manage., 2020, 146(6): 04020040.

Adegboye et al.; "Recent Advances in Pipeline Monitoring and Oil Leakage Detection Technologies: Principles and Approaches"; Sensors 2019, 19, 2548; doi:10.3390/s19112548.

Tsai et al.; "Using Convolutional Neural Networks in the Development of a Water Pipe Leakage and Location Identification System"; Appl. Sci. 2022, 12, 8034. https://doi.org/10.3390/app12168034.

Liu et al.; "A CNN-based transfer learning method for leakage detection of pipeline under multiple working conditions with AE signals"; Process Safety and Environmental Protection 170 (2023) 1161-1172. https://doi.org/10.1016/j.psep.2022.12.070.

Ahmad et al.; "A Method for Pipeline Leak Detection Based on Acoustic Imaging and Deep Learning"; Sensors 2022, 22, 1562. https://doi.org/10.3390/s22041562.

* cited by examiner

SYSTEMS AND METHODS FOR IMPROVED PIPELINE LEAK DETECTION

CROSS-REFERENCE

This application claims priority from U.S. Provisional Patent Application No. 63/331,085 filed on Apr. 14, 2022 entitled "SYSTEMS AND METHODS FOR DATA SCREENING OPTIMIZATION AND DEEP LEARNING NEURAL NETWORKS FOR PIPELINE LEAK DETECTION" the entire contents of which are hereby incorporated by reference herein.

FIELD

Embodiments of the present disclosure generally relate to the field of pipeline management, and more specifically, embodiments relate to devices, systems, and methods for improved leak detection in pipeline systems.

BACKGROUND

Pipeline transportation of a media, whether liquid or gas, is a method of moving the media from one location to another. The media and pressure under which it is transported vary; however, the fundamental objective remains the same: to safely move the media from point A to point B without suffering loss. Such losses may affect profitability and endanger the environment, personnel, and the public. The cause of such failures can vary. Pipeline failures (e.g., failures of elements of the pipeline network) may result from age, force majeure, or malice. For example, pipeline networks can experience component degradation, small leaks due to material impurities or chemical reactions, significant wall ruptures, and even product theft (e.g., via siphoning) all of which may result in media loss. With so many potential sources of media loss, it can be important that leak detection be timely, accurate, and precise.

Robust and reliable leak detection can be crucial for pipeline operations (e.g., oil and gas) to mitigate environmental pollution, minimize financial loss, and secure compliance with regulatory requirements. Pipeline operations can be used in both commercial operations and residential applications. Some detection methods can require a high volume of fluid to be lost before those methods are capable of accurately detecting the leak. Even still it may be difficult for some methods to accurately identify the location or size of the leak once detected.

Undetected leaks can lead to a substantial loss of product before the leak is indicated and then verified. The effectiveness of leak detection may be limited by system specific features and some approaches may be unable to discriminate actual leaks from normal operating phenomena making it challenging to transfer a leak detection system from one pipeline system to another.

Approaches to leak detection may require some form of active observation along the length of the pipeline or the surrounding area. Such approaches can involve physically driving along the pipeline and visually inspecting for leaks. However, physical inspection techniques are costly and time consuming.

There is a need for improved leak detection that can be implemented in a variety of pipeline systems.

SUMMARY

Robust and reliable leak detection can be useful for pipeline operations (e.g., oil and gas) to mitigate environmental pollution, minimize financial loss, and secure compliance with increasingly strict regulations. Among internal and external leak detection techniques, there can be implementations based on negative pressure wave (NPW) propagation analysis that integrate sensor technologies with pipeline fluid transient simulation. However, the leak signatures that are typically related to sudden pressure drops can be contaminated with other pipeline anomalies, background noise, or interfered with from routine operational pressure surges pertaining to the use of pumps, compressors, and valves without supervisory control, making signature identification difficult, especially if only a simple threshold-driven logic is deployed. For multi-sensor inferred leak detection, differentiating true leaks from the events with similar instant signatures may be more complex, requiring intensive simulation which can be computationally expensive and not suitable to real-time or near real-time decision making.

In an aspect, embodiments described herein provide systems and methods which integrate deep learning with advanced decision-making technologies to minimize false alarms and improve NPW applications in pipeline leak detection.

In another aspect, embodiments described herein combine signal processing, statistics and machine learning to provide enhanced pressure wave analysis and improve pipeline leak (and other pipeline anomaly) detection. In another aspect, embodiments described herein make use of transfer learning from convolutional neural networks used to identify images to detect leaks (and other pipeline anomalies) in signal data. In another aspect, embodiments described herein identify pressure surges at sensor sites and further determine whether the pressure surges correspond to leaks based on pressure surge information received from a portion of a plurality of sensors.

In accordance with an aspect, there is provided a method to detect pipeline leaks. The method can include identifying a pipeline pressure surge by applying a trained convolutional neural network (CNN) model for classifying pipeline pressure measurement images on each sensor site of a plurality of sensor sites, transferring pressure surge information obtained from at least a portion of the plurality of sensor sites to a cloud site, and determining whether the identified pressure surge is a pipeline leak at the cloud site using the pressure surge information. The plurality of sensor sites collecting pipeline pressure measurement data. The pressure surge information corresponding to the identified pipeline pressure surge.

In accordance with a further aspect, the CNN model can be trained for classifying pipeline pressure measurement images using a pipeline pressure measurement image database.

In accordance with a further aspect, the pipeline pressure measurement image database can be constructed by collecting pressure measurement data from a plurality of pipelines transmitting one or more fluids, processing the measurement data using one or more filtering algorithms, selecting representative data patterns from a windowed time series, assigning the representative data patterns into different classes, creating 3D images from the representative data patterns using continuous wavelet transform (CWT), checking image class assignment of the created 3D images and removing outliers, and storing the created 3D images as measurement images with their class labels.

In accordance with a further aspect, training the CNN model can include selecting measurement images from the pipeline pressure measurement image database, training the CNN model through transfer learning, adjusting image selection or image class assignment for re-training, and comparing multiple CNN model performance to optimize model selection.

In accordance with a further aspect, determining whether the identified pressure surge is a pipeline leak can include differentiating the pipeline leak from other pressure surges by using an adaptive neuro-fuzzy inference system (ANFIS) model.

In accordance with a further aspect, the method can include identifying the location of the pipeline leak.

In accordance with a further aspect, applying the trained CNN model can include receiving the pipeline pressure measurement data from a sensor site of the plurality of sensor sites, screening the pipeline pressure measurement data to detect an anomaly triggering point, constructing a continuous wavelet transform (CWT) 3D testing image using windowed data inputs around the anomaly triggering point, identifying a pressure surge by classifying the testing image using the trained CNN model.

In accordance with a further aspect, the pressure surge information can include timestamps at a pressure surge point and at least one of a value of a pressure drop (DP), a simulated change of the flow rate (DV) for the given pressure drop, a magnitude of the triggering value (MT) from a simulation output of enhanced filtering, and a sum of the scalogram (SS) of the CWT.

In accordance with a further aspect, the ANFIS model can be pipeline specific. The ANFIS model can be trained with recorded historic pressure surge data inputs from one or more of actual pipeline leak events, simulated leak events, and the events associated with pipeline routine operations.

In accordance with a further aspect, the recorded historic pressure surge data inputs can be calculated from an adjacent sensor pair of the plurality of sensor sites. The recorded historic pressure surge data inputs can include a DT gradient and at least one of a ratio parameter value of a pressure drop (DP) over a distance between the adjacent sensor pair, a simulated change of the flow rate (DV) for the given pressure drop over a distance between the adjacent sensor pair, a magnitude of the triggering value (MT) from a simulation output of enhanced filtering over a distance between the adjacent sensor pair, and a sum of the scalogram (SS) of the CWT over a distance between the adjacent sensor pair.

In accordance with a further aspect, the recorded historic pressure surge data inputs can be calculated from an adjacent sensor pair of the plurality of sensor sites. Output from the ANFIS model can be a scalar output. Magnitude of the scalar output can indicate that at least one of pipeline leak or routine operation is initiated within a distance between the adjacent sensor pair, at one sensor site of the adjacent sensor pair, or outside a measurement range of the adjacent sensor pair.

In accordance with an aspect, there is provided a system to detect pipeline leaks. The system can include a plurality of sensor sites and a cloud site being communicatively connected to the plurality of sensor sites. Each sensor site including a sensor processor and a sensor memory. The cloud site including a cloud processor and a cloud memory. Sensor instructions stored in the sensor memory and executable by the sensor processor can instruct each sensor site to collect pipeline pressure measurement data, identify a pipeline pressure surge by applying a trained convolutional neural network (CNN) model for classifying pipeline pressure measurement images, and transfer pressure surge information. The pressure surge information corresponding to the identified pipeline pressure surge. Cloud instructions stored in the cloud memory and executable by the cloud processor can instruct the cloud site to receive the pressure surge information from at least a portion of the plurality of sensor sites and determine whether the identified pressure surge is a pipeline leak using the pressure surge information.

In accordance with a further aspect, the CNN model can be trained for classifying pipeline pressure measurement images using a pipeline pressure measurement image database.

In accordance with a further aspect, the pipeline pressure measurement image database can be constructed by collecting pressure measurement data from a plurality of pipelines transmitting one or more fluids, processing the measurement data using one or more filtering algorithms, selecting representative data patterns from a windowed time series, assigning the representative data patterns into different classes, creating 3D images from the representative data patterns using continuous wavelet transform (CWT), checking image class assignment of the created 3D images and removing outliers, and storing the created 3D images as measurement images with their class labels.

In accordance with a further aspect, training the CNN model can include selecting measurement images from the pipeline pressure measurement image database, training the CNN model through transfer learning, adjusting image selection or image class assignment for re-training, comparing multiple CNN model performance to optimize model selection.

In accordance with a further aspect, the identified pressure surge can determined to be pipeline leak by differentiating the pipeline leak from other pressure surges by using an adaptive neuro-fuzzy inference system (ANFIS) model.

In accordance with a further aspect, the cloud instructions can instruct the cloud site to identify the location of the pipeline leak.

In accordance with a further aspect, applying the trained CNN model can include receiving the pipeline pressure measurement data from the sensor site, screening the pipeline pressure measurement data to detect an anomaly triggering point, constructing a continuous wavelet transform (CWT) 3D testing image using windowed data inputs around the anomaly triggering point, identifying a pressure surge by classifying the testing image using the trained CNN model.

In accordance with a further aspect, the pressure surge information can include timestamps at a pressure surge point and at least one of a value of a pressure drop (DP), a simulated change of the flow rate (DV) for the given pressure drop, a magnitude of the triggering value (MT) from a simulation output of enhanced filtering, and a sum of the scalogram (SS) of the CWT.

In accordance with a further aspect, the ANFIS model can be pipeline specific. The ANFIS model can be trained with recorded historic pressure surge data inputs from one or more of actual pipeline leak events, simulated leak events, and the events associated with pipeline routine operations.

In accordance with a further aspect, the recorded historic pressure surge data inputs can be calculated from an adjacent sensor pair of the plurality of sensor sites. The recorded historic pressure surge data inputs can include a DT gradient and at least one of a ratio parameter value of a pressure drop (DP) over a distance between the adjacent sensor pair, a simulated change of the flow rate (DV) for the given pressure drop over a distance between the adjacent sensor pair, a magnitude of the triggering value (MT) from a simulation output of enhanced filtering over a distance between the adjacent sensor pair, and a sum of the scalogram (SS) of the CWT over a distance between the adjacent sensor pair.

In accordance with a further aspect, the recorded historic pressure surge data inputs can be calculated from an adjacent sensor pair of the plurality of sensor sites. Output from the ANFIS model can be a scalar output. Magnitude of the scalar output can indicate that at least one of pipeline leak or routine operation is initiated within a distance between the adjacent sensor pair, at one sensor site of the adjacent sensor pair, or outside a measurement range of the adjacent sensor pair.

In accordance with an aspect, there is provided a non-transient computer readable medium containing program instructions for causing a computer to the methods described herein.

In accordance with an aspect, there is provided a method for leak detection in a pipeline. The method can involve filtering pipeline measurement data received from at least one pipeline sensor fluidly connected to the pipeline by extracting a feature data set, computing and comparing a dynamic ratio signature against the leak threshold based on a forecast error distribution of predicted pipeline measurement data, generating a leak alarm using a dynamic leak signature, and transmitting and/or storing the leak alarm.

In accordance with a further aspect, the method may further include validating a leak check triggered by the dynamic leak signature using a convolutional neural network (CNN), and classifying a leak type using the CNN. The leak check may include a time-frequency representation of related data. Generating the leak alarm may include generating the leak alarm using the validated leak check triggered by the leak signature.

In accordance with an aspect, there is provided a method to detect pipeline leaks using an adapted convolutional neural network (CNN). The method involves receiving pipeline measurement data from at least one pipeline sensor fluidly connected to the pipeline, extracting a time-frequency representation of the pipeline measurement data, constructing 3D images by transforming the time-frequency representations using a continuous wavelet transform (CWT), generating a leak alarm by detecting leak patterns in the 3D images using the CNN, and transmitting and/or storing the leak alarm.

In accordance with a further aspect, the method can involve generating filtered pipeline measurement data using filters selected by time and frequency analysis covering a primary feature frequency range of the pipeline measurement data to generate near-Gaussian or normal distributed data, and signal noise ratio-enhanced time series.

In accordance with a further aspect, the method can involve filtering pipeline measurement data received from at least one pipeline sensor by extracting feature information which may include performing data smoothing, selecting a filter bank, manipulating filtering, and applying feature extraction.

In accordance with a further aspect, the method can involve computing and comparing a dynamic ratio signature against the leak threshold based on the forecast error distribution of predicted pipeline measurement data. This may include establishing initial statistics of the filtered pipeline measurement data at an initial time component, developing an initial simulation of a forecast error, and executing real-time data screening to monitor the forecast error distribution based on new pipeline measurement data set at a subsequent time component.

In accordance with a further aspect, the method can involve establishing the initial statistics of the filtered pipeline measurement data at an initial time component which may include computing mean, variance, and autocorrelation of the filtered pipeline measurement data.

In accordance with a further aspect, developing the initial simulation of the forecast error may include updating the mean, the variance, and the autocorrelation using a simulated data forecast to compute the forecast error.

In accordance with a further aspect, the method can involve executing real-time data screening to monitor the forecast error distribution based on the new pipeline measurement data set at the subsequent time component which may include computing a mean forecasting error and a variance forecasting error.

In accordance with a further aspect, the method can involve computing and comparing the dynamic ratio signature against the leak threshold based on the forecast error distribution of predicted pipeline measurement data which may be computed by the forecasting error and the corresponding standard deviation.

In accordance with a further aspect, the method can involve data screening which may include updating instantaneous statistics of the filtered pipeline measurement data based on the new pipeline measurement data set at the subsequent time component, computing instantaneous forecast and forecast errors based on the updated instantaneous statistics, updating instantaneous mean and variance of the forecast error, and determining the dynamic leak signature based on the updated instantaneous mean and variance of the forecast error.

In accordance with a further aspect, the method can involve generating filtered pipeline measurement data using an evolutionary optimization process to optimize filter parameter selection and leak signature determination.

In accordance with a further aspect, the at least one pipeline sensor may include at least one of a pressure sensor, a sonic (acoustic) sensor, an accelerometer transducer, a temperature sensor, a fluid density sensor, and a flow velocity sensor.

In accordance with a further aspect, the filtering the pipeline measurement data which may include smoothing the pipeline measurement data, selecting a filter bank based on the primary feature frequency, manipulating filtering to determine an order of filters of the filter bank applied, and extracting features.

In accordance with a further aspect, parameters may be used to select the filter bank and manipulate the filtering. The parameters can be determined using an evolutionary optimization process.

In accordance with a further aspect, the system can validate the leak check by converting the leak check into a 3D image using a continuous wavelet transform, and processing the 3D image using the CNN. The CNN can be trained for image recognition tasks.

In accordance with a further aspect, generating the leak alarm may include identifying a distance between the at least one pipeline sensor and a leak.

In accordance with a further aspect, generating the leak alarm may include identifying a size of a leak.

In accordance with a further aspect, generating the leak alarm may include identifying a shape of a leak.

In accordance with a further aspect, the at least one pipeline sensor may include a plurality of pipeline sensors.

In accordance with a further aspect, the CNN may be adapted for leak detection using 3D color image inputs generated from a continuous wavelet transform (CWT) of transient pressure measurements.

In accordance with a further aspect, the method may include processing image inputs transformed from raw pressure waves using the CNN. The CNN may be trained with pipeline calibration, testing, and operation data, for automated filtering, pattern recognition, leak detection, and classification.

In accordance with an aspect, there is provided a method for enhanced pipeline leak detection. The method may involve applying a fast data screening algorithm to filtered pipeline measurements, using an evolutionary optimization process to optimize filter parameter selection and leak signature determination, and determining a leak alarm using the optimized filter parameter selection and leak signature determination.

In accordance with an aspect, there is provided a method for enhanced pipeline leak detection. The method involves adapting convolutional neural networks (CNNs) through transfer learning using 3D color image inputs generated from a continuous wavelet transform (CWT) of pipeline measurements. The CNNs can take image inputs from at least one of raw or filtered pipeline measurements to monitor the operation status, validate triggered events, and recognize leak patterns.

In accordance with a further aspect, the fast data screening algorithm may involve acquiring and filtering pipeline measurement data, establishing initial statistics of filtered pipeline data, developing initial statistics on data forecasting, executing data screening with fast two-point statistics, and applying robust threshold for leak detection.

In accordance with a further aspect, the optimization may involve selecting a searching range of multiple filtering parameters and trigger threshold of leak events, selecting calibration and testing data, performing multi-parameter evolutionary optimization, and applying optimized parameters to determine the leak alarm.

In accordance with a further aspect, optimization may further involve at least one of moving average window size in data preprocessing, modifying cut-off frequency for a pre-selected filter, and modifying the ratio threshold of screening forecast error over its standard deviation.

In accordance with a further aspect, the calibration and testing data may include at least one of diverse internal test loop data and diverse field calibration and operation data.

In accordance with an aspect, there is provided a method to adapt convolutional neural networks (CNNs) through transfer learning for pipeline data filtering, feature extraction, leak detection, and leak classification. The method including collecting pipeline measurement data with adequate sampling frequency from different pipeline systems/configurations and sensor modules, including pitch and catch data, testing data with various leak sizes (orifices), and none-leak steady state/operation data, selecting a window size with length of data coverage that varies from seconds to minutes, picking sliding training data intervals from each filtered time series for time-frequency analysis, performing a continuous wavelet transformation (CWT) of windowed data inputs with adapted sampling frequency and colormap resolution to create color images, assigning each image to its specified output category/class for supervised training, and retraining pre-selected deep pattern recognition CNNs with modified layer parameters for leak detection and classification.

In accordance with a further aspect, the method involves applying low-pass filters (LPF), high-pass filters (HPF), band-pass filters (BPF) or a combination of the above to enhance pressure wave analysis.

In accordance with a further aspect, the method involves combining training images from raw and filtered pipeline image datastores as universal images.

In accordance with an aspect, there is provided a method to apply adapted CNNs for pipeline operation data monitoring, health check, and leak detection. The method including collecting operation data, fitting the operation data to the sliding windows with predetermined size, performing a continuous wavelet transform and constructing color image, feeding image inputs to the CNNs and generating outputs, and tracking timestamps and determining a location of detected leaks.

In accordance with a further aspect, processing raw operation data with predetermined filtering algorithms, and the fitting the operation data may include fitting the filtered operation data.

In accordance with an aspect, there is provided system for leak detection in a pipeline. The system can include at least one pipeline sensor fluidly connected to the pipeline, a processor, a memory operatively coupled to the processor, and instructions stored in the memory. The at least one pipeline sensor is communicatively connected to the processor. The instructions are executable by the processor to instruct the system to filter pipeline measurement data received from the at least one pipeline sensor by extracting a feature data set, compute and compare a dynamic ratio signature against the leak threshold based on a forecast error distribution of predicted pipeline measurement data, generate a leak alarm using a dynamic leak signature, and transmit the leak alarm and/or store the leak alarm.

In accordance with a further aspect, the instructions may further instruct the system to validate a leak check triggered by the dynamic leak signature using a convolutional neural network (CNN), and classify a leak type using the CNN. The leak check may include a time-frequency representation of related data. The generate the leak alarm may include generating the leak alarm using the validated leak check triggered by the leak signature threshold.

In accordance with an aspect, there is provided a system to detect pipeline leaks using an adapted convolutional neural network (CNN). The system can include at least one pipeline sensor fluidly connected to the pipeline, a processor, a memory operatively coupled to the processor, instructions stored in the memory. The at least one pipeline sensor is communicatively connected to the processor. The instructions are executable by the processor to instruct the system to receive pipeline measurement data from the at least one pipeline sensor, extract a time-frequency representation of the pipeline measurement data, construct 3D images by transforming the time-frequency representations using a continuous wavelet transform (CWT), generate a leak alarm by detecting leak patterns in the 3D images using the CNN, and transmit the leak alarm and/or store the leak alarm.

In accordance with a further aspect, the system generates filtered pipeline measurement data which may include using filters selected by time and frequency analysis covering a primary feature frequency range of the pipeline measurement data to generate near-Gaussian or normal distributed data, and signal to noise ratio-enhanced time series.

In accordance with a further aspect, the system filters pipeline measurement data received from the at least one pipeline sensor by extracting feature information which may include performing data smoothing, selecting a filter bank, manipulating filtering, and applying feature extraction.

In accordance with a further aspect, the system computes and compares a dynamic ratio signature against the leak threshold to trigger a leak check based on the forecast error distribution of predicted pipeline measurement data. This may include establishing initial statistics of the filtered pipeline measurement data at an initial time component, developing an initial simulation of a forecast error, and executing real-time data screening to monitor the forecast error distribution based on new pipeline measurement data set at a subsequent time component.

In accordance with a further aspect, the system establishes the initial statistics of the filtered pipeline measurement data at an initial time component which may include computing mean, variance, and autocorrelation of the filtered pipeline measurement data.

In accordance with a further aspect, the system develops the initial simulation of the forecast error which may include updating the mean, the variance, and the autocorrelation using a simulated data forecast to compute the forecast error.

In accordance with a further aspect, the system executes real-time data screening to monitor the forecast error distribution based on the new pipeline measurement data set at the subsequent time component which may include computing a mean forecasting error and a variance forecasting error.

In accordance with a further aspect, the system establishes the dynamic ratio signature against the leak threshold based on the forecast error distribution of predicted pipeline measurement data. The ratio signature may be computed by the forecasting error and the corresponding standard deviation.

In accordance with a further aspect, the system may implement data screening which may include updating instantaneous statistics of the filtered pipeline measurement data based on the new pipeline measurement data set at the subsequent time component, computing instantaneous forecast and forecast errors based on the updated instantaneous statistics, and updating instantaneous mean and variance of the forecast error. The system can determine the dynamic leak signature based on the updated instantaneous mean and variance of the forecast error.

In accordance with a further aspect, the system generates filtered pipeline measurement data which may include using an evolutionary optimization process optimize filter parameter selection and leak signature determination.

In accordance with a further aspect, the at least one pipeline sensor may include at least one of a pressure sensor, a sonic (acoustic) sensor, an accelerometer transducer, a temperature sensor, a fluid density sensor, and a flow velocity sensor.

In accordance with a further aspect, the filter the pipeline measurement data which may include smoothing the pipeline measurement data, selecting a filter bank based on the primary feature frequency, manipulating filtering to determine an order of filters of the filter bank applied, and extracting features.

In accordance with a further aspect, parameters used to select the filter bank and manipulate the filtering may be determined using an evolutionary optimization process.

In accordance with a further aspect, the system can validate the leak check by converting the leak check into a 3D image using a continuous wavelet transform, and processing the 3D image using the CNN. The CNN can be trained for image recognition tasks.

In accordance with a further aspect, generating the leak alarm may include identifying a distance between the at least one pipeline sensor and a leak.

In accordance with a further aspect, generating the leak alarm may include identifying a size of a leak.

In accordance with a further aspect, generating the leak alarm may include identifying a shape of a leak.

In accordance with a further aspect, the at least one pipeline sensor may include a plurality of pipeline sensors.

In accordance with a further aspect, the CNN may be adapted for leak detection using 3D color image inputs generated from a continuous wavelet transform (CWT) of transient pressure measurements.

In accordance with a further aspect, the instructions may further instruct the system to process image inputs transformed from raw pressure waves using the CNN. The CNN can be trained with pipeline calibration, testing, and operation data, for automated filtering, pattern recognition, leak detection, and classification.

In accordance with an aspect, there is provided a system for enhanced pipeline leak detection. The system can include at least one pipeline sensor fluidly connected to the pipeline, a processor, a memory operatively coupled to the processor, and instructions stored in the memory. The at least one pipeline sensor is communicatively connected to the processor. The instructions are executable by the processor to instruct the system to apply a fast data screening algorithm to filtered pipeline measurements, use an evolutionary optimization process to optimize filter parameter selection and leak signature determination, and determine a leak alarm using the optimized filter parameter selection and leak signature determination.

In accordance with an aspect, there is provided a system for enhanced pipeline leak detection. The system including at least one pipeline sensor fluidly connected to the pipeline, a processor, a memory operatively coupled to the processor, instructions stored in the memory. The at least one pipeline sensor is communicatively connected to the processor. The instructions are executable by the processor to instruct the system to adapt convolutional neural networks (CNNs) through transfer learning using 3D color image inputs generated from a continuous wavelet transform (CWT) of pipeline measurements received from the at least one pipeline sensor wherein the CNNs can take image inputs from at least one of raw or filtered pipeline measurements to monitor the operation status, validate triggered events, and recognize leak patterns.

In accordance with a further aspect, the fast data screening algorithm may involve acquiring and filtering pipeline measurement data, establishing initial statistics of filtered pipeline data, developing initial statistics on data forecasting, executing data screening with fast two-point statistics, and applying robust threshold for leak detection.

In accordance with a further aspect, the optimization may involve selecting a searching range of multiple filtering parameters and trigger threshold of leak events, selecting calibration and testing data, performing multi-parameter evolutionary optimization, and applying optimized parameters to determine the leak alarm.

In accordance with a further aspect, optimization may further involve at least one of moving average window size in data preprocessing, modifying cut-off frequency for a pre-selected filter, and modifying the ratio threshold of screening forecast error over its standard deviation.

In accordance with a further aspect, the calibration and testing data may involve at least one of diverse internal test loop data and diverse field calibration and operation data.

In accordance with an aspect, there is provided a system to adapt convolutional neural networks (CNNs) through transfer learning for pipeline data filtering, feature extraction, leak detection, and leak classification. The system including at least one pipeline sensor fluidly connected to a pipeline, a processor, a memory operatively coupled to the processor, instructions stored in the memory. The at least one pipeline sensor is communicatively connected to the processor. The instruction executable by the processor to instruct the system to collect pipeline measurement data with adequate sampling frequency from different pipeline systems/configurations and sensor modules, including pitch and catch data, testing data with various leak sizes (orifices), and none-leak steady state/operation data, select a window size with length of data coverage that varies from seconds to minutes, pick sliding training data intervals from each filtered time series for time-frequency analysis, perform continuous wavelet transformation (CWT) of windowed data inputs with adapted sampling frequency and colormap resolution to create color images, assign each image to its specified output category/class for supervised training, and retrain pre-selected deep pattern recognition CNN with modified layer parameters for leak detection and classification. Once trained, the system may store CNN on the memory or an electronic datastore for future use or transmit it to an external computing device/server.

In accordance with a further aspect, the instructions may further instruct the system to apply low-pass filters (LPF), high-pass filters (HPF), band-pass filters (BPF) or a combination of the above to enhance pressure wave analysis.

In accordance with a further aspect, the instructions may further instruct the system to combine training images from raw and filtered pipeline image datastores as universal images. The system may retrieve these images from at least one sensor, memory, or from electronic datastore.

In accordance with an aspect, there is provided a system to apply adapted CNNs for pipeline operation data monitoring, health check, and leak detection. The system including at least one pipeline sensor fluidly connected to a pipeline, a processor, a memory operatively coupled to the processor, instructions stored in the memory. The at least one pipeline sensor is communicatively connected to the processor. The instruction executable by the processor to instruct the system to collect operation data, fit the operation data to the sliding windows with predetermined size, perform a continuous wavelet transform and construct color image, feed image inputs to the CNNs and generating outputs, and track timestamps and determining a location of detected leaks.

In accordance with a further aspect, the instructions may further instruct the system to process raw operation data with predetermined filtering algorithms using filter, and the fit the operation data includes fitting the filtered operation data.

In accordance with a further aspect, a computer readable medium containing program instructions for causing a computer to perform the methods described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
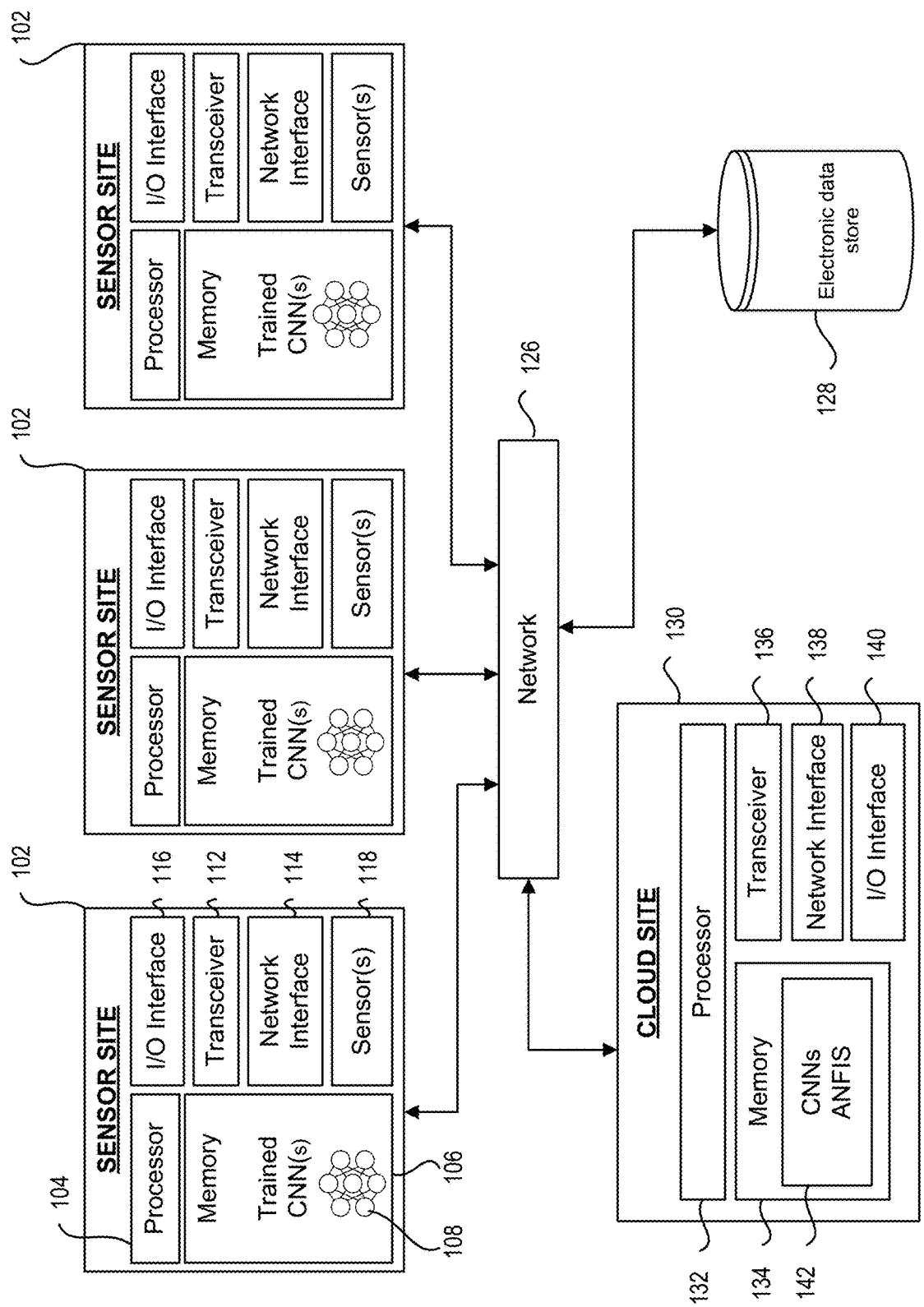
FIG. 1 illustrates a system to identify a pressure surge as a pipeline leak, according to some embodiments.

Robust and reliable leak detection can be useful for pipeline operations (e.g., oil and gas) to mitigate environmental pollution, minimize financial loss, and secure compliance with increasingly strict regulations. Among internal and external leak detection techniques, implementations based on negative pressure wave (NPW) propagation analysis that integrate sensor technologies with pipeline fluid transient simulation can be deployed. However, the leak signatures that are typically related to sudden pressure drops can be contaminated with other pipeline anomalies, background noise, or interfered with from routine operational pressure surges pertaining to the use of pumps, compressors, and valves without supervisory control, making signature identification difficult, especially if only a simple threshold-driven logic is deployed. For multi-sensor inferred leak detection, differentiating true leaks from the events with similar instant signatures may be more complex, requiring intensive simulation which can be computationally expensive and not suitable to real-time or near real-time decision making.

In an aspect, embodiments described herein provide systems and methods which integrate deep learning with advanced decision-making technologies to minimize false alarms and improve NPW applications in pipeline leak detection.

Systems and methods described herein can be used for enhanced pipeline leak detection. Some embodiments include retraining convolutional neural networks (CNNs) for classifying pipeline measurement images through transfer learning. CNNs can be retrained using 3D color image inputs generated from scalograms of multiclass pipeline pressure transient signals to detect pressure surges, pipeline leaks, and/or other pipeline anomalies at, for example, the sensor site.

Some embodiments include building adaptive neuro-fuzzy inference system (ANFIS) models for multisite sensor data integration and decision making. ANFIS models can be built with at least two ratio parameter inputs over the distance of an adjacent pair of sensors. Some embodiments further include distinguishing pressure surge patterns from other pipeline anomalies at the sensor sites with retrained CNNs and differentiating pipeline leaks from other pressure surges at the cloud site with ANFIS models.

Systems and methods according to embodiments described herein include model development and application. Model development can involve building CNNs for pipeline multi-class pattern recognition through transfer learning, and building ANFIS models for advanced decision-making. Application methodology can involve classifying pipeline measurement images with CNNs at the sensor sites to identify pressure surges, transferring pressure surge information and simulation outputs to a cloud site with computing equipment (e.g. servers, processors, data storage), and differentiating pipeline leaks from other pressure surges at the cloud site using ANFIS models.

Pipeline pressure measurement data can be collected at a high sampling frequency at multiple sensor sites over time.

The measurement data can include normal operation data, data of fluid releasing transients from the simulated leak tests, pressure surge data pertaining to the routine operation with use of pumps, compressors, and valves, and data from other anomaly events, such as frequency shift and valve chattering, that can lead to false alerts (e.g., with pressure drop exceeding the predetermined threshold in some techniques).

As noted, model development can involve building CNNs for pipeline multi-class pattern recognition through transfer learning. Pattern recognition CNNs can be retrained by transfer learning with pipeline data to recognize pressure surges in 3D images. CNN retraining data can be selected from the data classes noted above (e.g., normal operation, simulated leaks, and normal pressure surges). Training images can be generated from a Continuous Wavelet Transform (CWT) applied to windowed raw data and/or the data after enhanced filtering. The retrained CNN models can be used at each sensor site to identify pressure surges. CNN identified pressure surges can be transferred for further data integration analysis. Other anomaly events, such as frequency shift and valve chattering, can be recognized at the sensor sites and may not be considered as leak incidents.

Leak detection algorithms are implemented at the cloud site with computing equipment (e.g. servers, processors, data storage) for differentiating pipeline leaks from other pressure surges through integrated data analysis using the measurement (e.g., timestamp, value of a pressure drop, a sum of the scalogram (SS) of the CWT) and simulation outputs (e.g., simulated changes in flow rate or a magnitude of a triggering value) transferred from multiple sensor sites. ANFIS models can be built with inputs calculated from the gradients of ratio parameters over the distance between the adjacent sensor pair. Pipeline leaks can be characterized by, for example, a higher signal attenuation rate than other pressure surges. ANFIS model outputs can indicate if a pressure surge is a leak or is induced by routine operation within the measurement site, at the sensor sites, or outside of the measurement site.

Embodiments described herein provide systems and methods that involve Image-based pattern recognition for pipeline leak detection. Image-based pattern recognition can be more robust than constant threshold-based reasoning in distinguish pressure surges from frequency shifts and valve chattering. Determination of thresholds may becomes less crucial if an event triggering is followed by CNN classification.

Instrumentation and background noise can be different in diverse commodity pipelines. CNNs trained on measurement images of a particular liquid pipeline might be used by embodiments described herein to classify measurement images from pipelines running other fluids, especially in recognizing pressure surges. In other words, the systems designed for one liquid may be transferable and usable for the pressure surge detection and pipeline leak detection of other different liquids.

Further, according to some embodiments described herein, equipment cost can be reduced by performing ANFIS analysis to identify events even outside of measurement site (i.e., beyond the terminal sensor sites) without using additional boundary sensors on the both sides of measurement sites.

Pipeline pressure measurement data from, for example, a field-trial liquefied propane pipeline can be collected in high sampling frequency at multiple sensor sites over time for CNN development. Pattern recognition CNNs can be trained by transfer learning and retrained with pipeline data. Training a deep CNN can be computationally expensive and requires a large amount of training data. In various applications, a sufficient amount of training data may not available, and synthesizing new realistic training examples may not be feasible. In these cases, leveraging neural networks that have been trained on large data sets for conceptually similar tasks may be desirable. This leveraging of neural networks is called transfer learning. For example, the structure of a neural network, such as a deep CNN developed for image recognition of large number of objects (e.g. GoogleNet or SqueezeNet), can be adapted by modifying some layer parameters, setting new training options, and retraining the CNN (e.g. GoogleNet or SqueezeNet) with new image data for the pipeline leak detection and classification problems.

In an embodiment, CNN retraining data includes normal pipeline operation data, data of fluid releasing transients from the simulated leak tests, pressure surge data pertaining to the routine operation with use of pumps, compressors and valves, and data from other anomaly events, such as frequency shift and valve chattering, that often lead to false alerts with pressure drop exceeding the predetermined threshold in current practices. The retraining data can be selected around triggering points of the events. The 3D training images generated by applying a Continuous Wavelet Transform (CWT) to the windowed raw data and/or the data after enhanced filtering.

FIG. 1 illustrates a system 100 to identify a pressure surge as a pipeline leak, according to some embodiments.

The system 100 includes a cloud site 130, one or more sensor sites 102, a network 126, and an electronic datastore 128, which also may be referred to as the pipeline pressure measurement image database. Each sensor site 102 (also referred to as field operating units (FPUs)) can include a sensor processor 104, a sensor memory 106, a transceiver 112, a network interface 114, an I/O interface 116, and a sensor 118. The sensor memory 106 includes a trained convolutional neural network (CNN) 108. The cloud site 130 can include a cloud processor 132, a cloud memory 142, a transceiver 136, a network interface 138, and an I/O interface 140. The cloud memory 134 may include convolutional neural networks (CNNs) or adaptive neuro-fuzzy inference system (ANFIS) models 142.

Sensor(s) 118 can be pipeline sensors capable of measuring pipeline parameters. In some embodiments sensor(s) 118 can be pressure sensors, sonic (acoustic) sensors, accelerometer transducers, temperature sensors, fluid density sensors, or flow velocity sensors. Other sensor types are also possible. Sensor(s) 118 may also include a plurality of sensors which may or may not be the same type of sensor. Sensor(s) 118 can provide pipeline measurements. In an example embodiment, sensor(s) 118 can communicate with cloud site 130 using transceiver 112.

Sensor processor 104 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Sensor memory 106 can be configured to store various data utilized by sensor site 102 including, for example, data reflective of a time-frequency representation extractor, a 3D image constructor, and a pressure surge detector including the trained CNN 108. Sensor memory 106 may also store training data, model parameters, variables, hyperparameters, and the like. Sensor memory 106 may implement a relational or object-oriented database, such as Microsoft SQL Server, Oracle, DB2, Sybase, Pervasive, MongoDB, NoSQL, or the like. Sensor memory 106 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In some embodiments, sensor memory 106 can extract a time-frequency representation of pipeline measurement data using a time-frequency representation extractor (not shown). The time-frequency extraction can be performed using filters to extract the time-frequency representation.

In some embodiments, sensor memory 106 can construct a 3D image from the time-frequency representation of the pipeline measurement data using a 3D image constructor (not shown). The 3D image extractor can convert the data into an image that CNN 108 can be retrained to identify pipeline leaks or pressure surges.

In some embodiments, sensor memory 106 can detect a pressure surge based on the 3D image of the time-frequency representation of the pipeline measurement data using a pressure surge detector (not shown). The pressure surge detector may use CNN 108 which may be a CNN that can be trained for image recognition tasks and retrained for surge detection tasks (including detecting leaks or other pipeline anomalies). CNN 108 can process the 3D image to ascertain whether there is a leak (or other anomaly) and optionally the location of said leak and the size.

In some embodiments, time-frequency representation extractor, 3D image constructor, or surge detector including CNN 108, can be integrated with the sensor site 102, or may each be a standalone device (e.g., with a hardware processor and memory) connected to different components by network interface 114, a connection, or a communication channel.

Transceiver 112 can be used to transmit pressure surge data to another computing device. For example, transceiver 112 may send the pressure surge data to a cloud site 130.

In some embodiments, transceiver 112 can use cellular, satellite, or local Ethernet methods of sending and receiving information. Systems, methods, and devices described herein can be compatible with all cloud-based platforms, such as IoT, remote control of leak testing, and data storage.

Network interface 114 enables sensor site 102 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 116 enables sensor site 102 to interconnect with one or more input devices, such as a keyboard, mouse, camera, touch screen and a microphone, or with one or more output devices such as a display screen and a speaker. When I/O interface 116 is interconnected to a display screen, it may be referred to as a display interface.

Network 114 can enable components of the system to communicate with one another such as cloud site 130, and electronic data store 128.

Cloud site 130 includes a cloud processor 132, a cloud memory 134, a transceiver 136, a network interface 138, and an I/O interface 140. The cloud memory 134 includes an adaptive neuro-fuzzy inference system (ANFIS) model 142. The cloud memory 134 may further include program instructions for CNNs that may be implemented at sensor sites 102

Cloud processor 132 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Cloud memory 134 can be configured to store various data utilized by cloud site 130 including, for example, data reflective of ANFIS model 142. Cloud memory 134 may also store training data, model parameters, variables, hyper-parameters, and the like. Cloud memory 134 may implement a relational or object-oriented database, such as Microsoft SQL Server, Oracle, DB2, Sybase, Pervasive, MongoDB, NoSQL, or the like. Cloud memory 134 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

ANFIS model 142 can verify that a pressure surge is a pipeline leak. In some embodiments, ANFIS model 142 can be configured to receive pressure surge information from sensor site(s) 102 when sensor site(s) 102 detect anomalies in one or more of the sensor data. ANFIS model 142 can use the pressure surge information from one or more sensor sites 102 to determine whether the pressure surge was caused by a pipeline leak. Cloud site 130 can issue a verified pressure surge notice or a leak alarm or other notification. Cloud site 130 can further detect the location of the leak once verified.

Transceiver 136 can be used to transmit the verified pressure surge notice or leak alarm data to another computing device. For example, transceiver 136 may send the verified pressure surge notice or leak alarm to a computing device with an interface for a user to indicate to the user that there is a (potential) leak detected. Alternatively, transceiver 136 may send the leak alarm to an external datastore to store data relating to the leak alarm. Transceiver 136 may also send and receive other information between cloud site 130 and other components (e.g., sensor site(s) 102).

In some embodiments, transceiver 112 can use cellular, satellite, or local Ethernet methods of sending and receiving information. Systems, methods, and devices described herein can be compatible with all cloud-based platforms, such as IoT, remote control of leak testing, and data storage.

Network interface 138 enables cloud site 130 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 140 enables cloud site 130 to interconnect with one or more input devices, such as a keyboard, mouse, camera, touch screen and a microphone, or with one or more output devices such as a display screen and a speaker. When I/O interface 116 is interconnected to a display screen, it may be referred to as a display interface.

Electronic datastore 128 can be configured to store various data utilized by sensor site(s) 102 or cloud site 130 including, for example, data reflective of a time-frequency representation extractor, a 3D image constructor, a pressure surge detector, CNN 108. Electronic datastore 128 can further be configured to store various data utilized by cloud site 130 such as ANFIS model 142. Electronic datastore 128 may also store training data, model parameters, variables, hyperparameters, and the like. Electronic datastore 128 may implement a relational or object-oriented database, such as Microsoft SQL Server, Oracle, DB2, Sybase, Pervasive, MongoDB, NoSQL, or the like. Electronic datastore 128 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In accordance with an aspect, there is provided a system 100 to detect pipeline leaks. The system 100 can include a plurality of sensor sites 102 and a cloud site 130 being communicatively connected to the plurality of sensor sites 102. Each sensor site 102 including a sensor processor 104 and a sensor memory 106. The cloud site 130 including a cloud processor 132 and a cloud memory 134. Sensor instructions stored in the sensor memory 106 and executable by the sensor processor 104 can instruct each sensor site 104 to collect pipeline pressure measurement data using sensor(s) 118, identify a pipeline pressure surge by applying a trained convolutional neural network (CNN) model 108 for classifying pipeline pressure measurement images, and transfer pressure surge information using transceiver 112 or network interface 114. The pressure surge information corresponding to the identified pipeline pressure surge. Cloud instructions stored in the cloud memory 134 and executable by the cloud processor 132 can instruct the cloud site 132 to receive the pressure surge information from at least a portion of the plurality of sensor sites 102 using the transceiver 136 or the network interface 138 and determine whether the identified pressure surge is a pipeline leak using the pressure surge information using ANFIS model 142.

In some embodiments, using multiple sensor sites 102 can add redundancy in the system 100. In these embodiments, the "upstream" and "downstream" sensor sites 102 from the "leak" can collect relevant data. Should one fail, the next "upstream" and "downstream" sensor sites 102 can provide the requisite information. In some embodiments, there can be different combinations of sensor sites 102 to determine leak location more accurately.

In some embodiments, the sensor sites 102 independently collect data, process data, create images, and classify the images (with their own CNNs 108) to identify anomalies. The sensor sites 102 can send these to the cloud site 130. The cloud site 130 can differentiate the anomalies (i.e., pressure surge information) from one or more sensors 102 using, for example, an ANFIS model 142 to determine whether the anomaly is a leak or something else (e.g., normal operation). This may be beneficial to reduce the rate of false alarms. The systems described herein may use negative wave pressure technology to generate its simulation data.

In some embodiments, the pressure surge information may include timestamps, pressure drops, simulate flow rate changes, CWT data/scalograms, trigger magnitudes, surge signatures, site location information (e.g., which site collected the information), a summary of the pressure surge, filtered data, other simulated data. In some embodiments, the images themselves may not be transferred to the cloud site 130 which may be beneficial to reduce data transfer loads.

In accordance with a further aspect, the CNN model 108 can be trained for classifying pipeline pressure measurement images using a pipeline pressure measurement image database 128. In some embodiments, processor 104 of sensor site 102 executing sensor instructions, processor 132 of cloud site executing cloud instructions, or both may be configured to train the CNN model.

In accordance with a further aspect, the pipeline pressure measurement image database 128 can be constructed by collecting pressure measurement data from a plurality of pipelines transmitting one or more fluids, processing the measurement data using one or more filtering algorithms, selecting representative data patterns from a windowed time series, assigning the representative data patterns into different classes, creating 3D images from the representative data patterns using continuous wavelet transform (CWT), checking image class assignment of the created 3D images and removing outliers, and storing the created 3D images as measurement images with their class labels. In some embodiments, sensor instructions, cloud instructions, or both may instruct each sensor site 102, cloud site 130, or both to construct the pipeline pressure measurement image database. For example, sensor instructions executed by processor 104, cloud instructions executed by processor 132, or both may instruct each sensor site 102, cloud site 130, or both to construct the pipeline pressure measurement image database. To construct the pipeline pressure measurement image database, the sensor instructions, the cloud instructions, both instruct each sensor site, the cloud site or both to collect pressure measurement data from a plurality of pipelines transmitting one or more fluids. process the measurement data using one or more filtering algorithms, select representative data patterns from a windowed time series, assign the representative data patterns into different classes, create 3D images from the representative data patterns using continuous wavelet transform (CWT).check image class assignment of the created 3D images and removing outliers, store the created 3D images as measurement images with their class labels, or perform any combination of the foregoing.

In accordance with a further aspect, training the CNN model 108 can include selecting measurement images from the pipeline pressure measurement image database 128, training the CNN model 108 through transfer learning, adjusting image selection or image class assignment for re-training, comparing multiple CNN model 108 performance to optimize model selection. In some embodiments, this can include a multi-CNN performance comparison based on the training and validation error indicated at the end of each CNN training session.

In accordance with a further aspect, the identified pressure surge can determined to be pipeline leak by differentiating the pipeline leak from other pressure surges by using an adaptive neuro-fuzzy inference system (ANFIS) model 142.

In accordance with a further aspect, the cloud instructions can instruct the cloud site 130 to identify the location of the pipeline leak.

In accordance with a further aspect, applying the trained CNN model 108 can include receiving the pipeline pressure measurement data from the sensor site 102, screening the pipeline pressure measurement data to detect an anomaly triggering point, constructing a continuous wavelet transform (CWT) 3D testing image using windowed data inputs around the anomaly triggering point, identifying a pressure surge by classifying the testing image using the trained CNN model 108.

In accordance with a further aspect, the pressure surge information can include timestamps at a pressure surge point and at least one of a value of a pressure drop (DP), a simulated change of the flow rate (DV) for the given pressure drop, a magnitude of the triggering value (MT) from a simulation output of enhanced filtering, and a sum of the scalogram (SS) of the CWT.

In accordance with a further aspect, the ANFIS model 142 can be pipeline specific. The ANFIS model 142 can be trained with recorded historic pressure surge data inputs from one or more of actual pipeline leak events, simulated leak events, and the events associated with pipeline routine operations.

In accordance with a further aspect, the recorded historic pressure surge data inputs can be calculated from an adjacent sensor pair 102 of the plurality of sensor sites 102. The recorded historic pressure surge data inputs can include a DT gradient and at least one of a ratio parameter value of a pressure drop (DP) over a distance between the adjacent sensor pair 102, a simulated change of the flow rate (DV) for the given pressure drop over a distance between the adjacent sensor pair 102, a magnitude of the triggering value (MT) from a simulation output of enhanced filtering over a distance between the adjacent sensor pair 102, and a sum of the scalogram (SS) of the CWT over a distance between the adjacent sensor pair 102.

In accordance with a further aspect, the recorded historic pressure surge data inputs can be calculated from an adjacent sensor pair 102 of the plurality of sensor sites 102. Output from the ANFIS model can be a scalar output. Magnitude of the scalar output can indicate that at least one of pipeline leak or routine operation is initiated within a distance between the adjacent sensor pair 102, at one sensor site 102 of the adjacent sensor pair 102, or outside a measurement range of the adjacent sensor pair 102.

Figure 2:
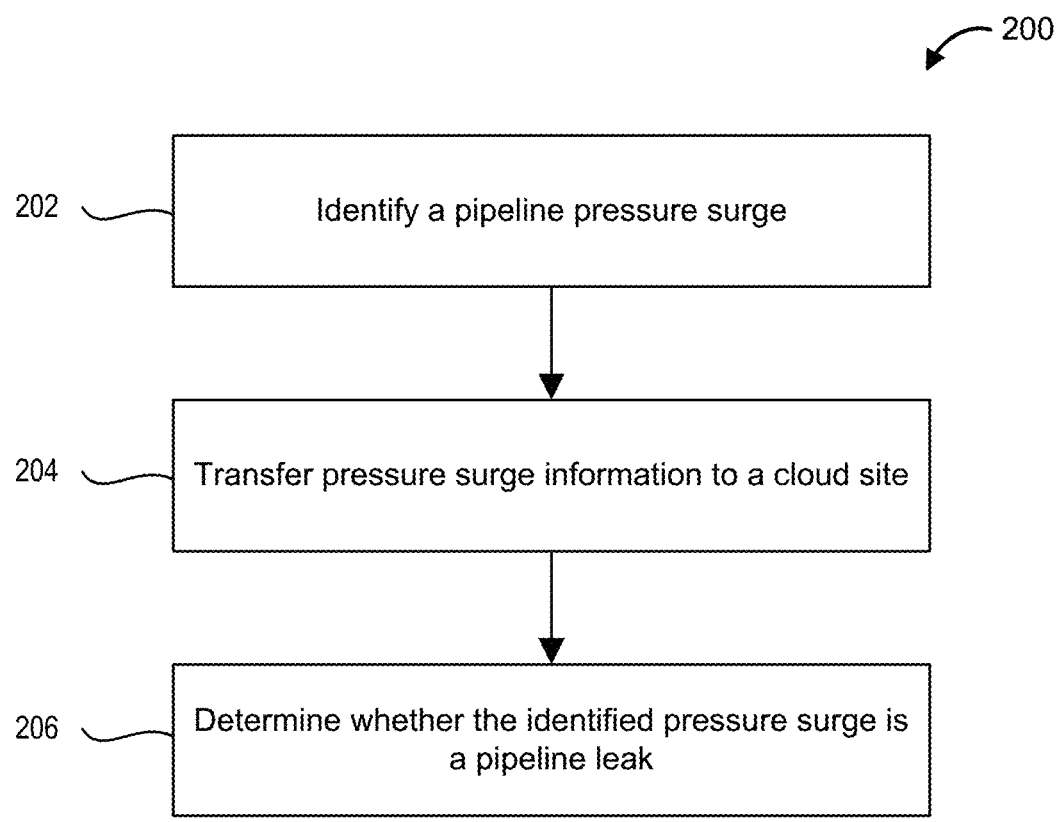
FIG. 2 illustrates an example method for determining that a pressure surge is a pipeline leak, according to some embodiments.

FIG. 2 illustrates an example method 200 for determining that a pressure surge is a pipeline leak, according to some embodiments.

In method 200 a pipeline pressure surge is identified at the sensor site(s) (202). The pressure surge may be identified by generating a 3D image from the pressure data applying, for example, a continuous wavelet transform (CWT) to the pressure data received by the sensors at the sensor site and using a convolutional neural network (CNN) trained to identify pressure surges in 3D images. Once identified, the sensor site may be configured to transfer pressure surge information to a cloud site (204). In some embodiments, the pressure surge information may include timestamps of the pressure surge point. In some embodiments, the pressure surge information may include a value of a pressure drop (DP), a simulated change of the flow rate (DV) for the given pressure drop, a magnitude of the triggering value (MT) from a simulation output of enhanced filtering, and a sum of the scalogram (SS) of the CWT. The cloud site may then determine whether the identified pressure surge is a pipeline leak using the pressure surge information (206). In some embodiments, the cloud site may use the pressure surge information from two sensor sites that are along the pipeline. In some embodiments, the cloud site may use of pressure surge information from several or all sensor sites. In some embodiments, the cloud site may determine whether the identified pressure surge is a pipeline leak by differentiating the pipeline leak from other pressure surges using an adaptive neuro-fuzzy inference system (ANFIS) model.

In some embodiments, the presence of multiple sensor sites can provide the system with redundancy. For example, if a sensor site is knocked out due to, for example, maintenance or a malfunction, then the other sensor sites may be used to identify pressure surges and/or pipeline leaks. In a further example, it may be beneficial to use adjacent sensor sites to identify a pipeline leak, but if one of an adjacent pair becomes inoperative, then it may be possible to use the next sensor site as a replacement in that adjacent pair.

Furthermore, in some embodiments, by using the pressure surge information from multiple sensor sites, it may be possible to more accurately identify the location of any identified pipeline leaks. For example, it may be possible to identify a pipeline leak by using a pair of sensors and may further be possible to further determine the location of the pipeline leak more accurately if using sensor sites that are upstream and/or downstream from the pair of sensor sites.

The CNN may in some embodiments be configured to identify a pipeline leak. The CNN may in some embodiments be configured to identify an anomaly (e.g., a pressure surge, a pipeline leak) and raise an alarm. In some embodiments, the pressure surges can be verified by a cloud site before a pipeline leak alarm is raised to, for example, reduce the number of false positives.

In accordance with an aspect, there is provided a method 200 to detect pipeline leaks. The method 200 can include identifying a pipeline pressure surge by applying a trained convolutional neural network (CNN) model for classifying pipeline pressure measurement images on each sensor site of a plurality of sensor sites (block 202), transferring pressure surge information obtained from at least a portion of the plurality of sensor sites to a cloud site (block 204), and determining whether the identified pressure surge is a pipeline leak at the cloud site using the pressure surge information (block 206). The plurality of sensor sites collecting pipeline pressure measurement data. The pressure surge information corresponding to the identified pipeline pressure surge.

In some embodiments, using multiple sensor sites can add redundancy in the method 200. In these embodiments, the "upstream" and "downstream" sensor sites from the "leak" can collect relevant data. Should one fail, the next "upstream" and "downstream" sensor sites can provide the requisite information. In some embodiments, there can be different combinations of sensor sites to determine leak location more accurately.

In some embodiments, the sensor sites independently collect data, process data, create images, and classify the images (with their own CNNs) to identify anomalies. The sensor sites can send these to the cloud site. The cloud site can differentiate the anomalies (i.e., pressure surge information) from one or more sensors using, for example, an ANFIS model to determine whether the anomaly is a leak or something else (e.g., normal operation). This may be beneficial to reduce the rate of false alarms. The methods described herein may use negative wave pressure technology to generate its simulation data.

In some embodiments, the pressure surge information may include timestamps, pressure drops, simulate flow rate changes, CWT data/scalograms, trigger magnitudes, surge signatures, site location information (e.g., which site collected the information), a summary of the pressure surge, filtered data, other simulated data. In some embodiments, the images themselves may not be transferred to the cloud site which may be beneficial to reduce data transfer loads.

In accordance with a further aspect, the CNN model can be trained for classifying pipeline pressure measurement images using a pipeline pressure measurement image database.

In accordance with a further aspect, the pipeline pressure measurement image database can be constructed by collecting pressure measurement data from a plurality of pipelines transmitting one or more fluids, processing the measurement data using one or more filtering algorithms, selecting representative data patterns from a windowed time series, assigning the representative data patterns into different classes, creating 3D images from the representative data patterns using continuous wavelet transform (CWT), checking image class assignment of the created 3D images and removing outliers, and storing the created 3D images as measurement images with their class labels.

In accordance with a further aspect, training the CNN model can include selecting measurement images from the pipeline pressure measurement image database, training the CNN model through transfer learning, adjusting image selection or image class assignment for re-training, and comparing multiple CNN model performance to optimize model selection. In some embodiments, this can include a multi-CNN performance comparison based on the training and validation error indicated at the end of each CNN training session.

In accordance with a further aspect, determining whether the identified pressure surge is a pipeline leak (block 206) can include differentiating the pipeline leak from other pressure surges by using an adaptive neuro-fuzzy inference system (ANFIS) model.

In accordance with a further aspect, the method 200 can include identifying the location of the pipeline leak.

In accordance with a further aspect, applying the trained CNN model can include receiving the pipeline pressure measurement data from a sensor site of the plurality of sensor sites, screening the pipeline pressure measurement data to detect an anomaly triggering point, constructing a continuous wavelet transform (CWT) 3D testing image using windowed data inputs around the anomaly triggering point, identifying a pressure surge by classifying the testing image using the trained CNN model.

In accordance with a further aspect, the pressure surge information can include timestamps at a pressure surge point and at least one of a value of a pressure drop (DP), a simulated change of the flow rate (DV) for the given pressure drop, a magnitude of the triggering value (MT) from a simulation output of enhanced filtering, and a sum of the scalogram (SS) of the CWT.

In accordance with a further aspect, the ANFIS model can be pipeline specific. The ANFIS model can be trained with recorded historic pressure surge data inputs from one or more of actual pipeline leak events, simulated leak events, and the events associated with pipeline routine operations.

In accordance with a further aspect, the recorded historic pressure surge data inputs can be calculated from an adjacent sensor pair of the plurality of sensor sites. The recorded historic pressure surge data inputs can include a DT gradient and at least one of a ratio parameter value of a pressure drop (DP) over a distance between the adjacent sensor pair, a simulated change of the flow rate (DV) for the given pressure drop over a distance between the adjacent sensor pair, a magnitude of the triggering value (MT) from a simulation output of enhanced filtering over a distance between the adjacent sensor pair, and a sum of the scalogram (SS) of the CWT over a distance between the adjacent sensor pair.

In accordance with a further aspect, the recorded historic pressure surge data inputs can be calculated from an adjacent sensor pair of the plurality of sensor sites. Output from the ANFIS model can be a scalar output. Magnitude of the scalar output can indicate that at least one of pipeline leak or routine operation is initiated within a distance between the adjacent sensor pair, at one sensor site of the adjacent sensor pair, or outside a measurement range of the adjacent sensor pair.

In accordance with an aspect, there is provided a non-transient computer readable medium containing program instructions for causing a computer to perform the methods 200 described herein.

Example Embodiment of a System Using an ANFIS Model to Verify Pressure Surges The following discussion is directed to a non-limiting exemplary embodiment of the systems and methods described herein. In particular, the following discussion focuses on a system and method that uses an adaptive neural-fuzzy inference system (ANFIS) model to determine whether pressure surges identified by a sensor site represent a pipeline leak (or other pipeline pressure anomaly).

Multi-fluid leak detection studies provided herein are based on commodity pipelines of liquefied propane, natural gas, and water injection with measurement ranges of up to 50 miles. The testing equipment was installed isolated from any existing pipeline Supervisory Control and Data Acquisition (SCADA) systems. Many pressure surges detected at sensor sites can be initiated from routine operations with use of pumps, compressors, and valves outside of the measurement site (as defined by the boundary field processing units). The leak detection in these studies can be involve differentiating the pipeline leaks from other pressure surges.

FIG. 3, FIG. 4, FIG. 5, and FIG. 6 all show sensor responses to different pipeline events at different stages of processing, according to some embodiments. These figures can show that pressure surges (possibly indicative of pipeline leaks or other anomalies) can be differentiated within the characteristic pressure data according to some embodiments. Pipeline anomalies may be characteristic of different phenomena. Some examples include pipeline leaks, pipeline frequency shifts, pipeline valve chattering events, and normal operation (defined further below).

Figure 3:
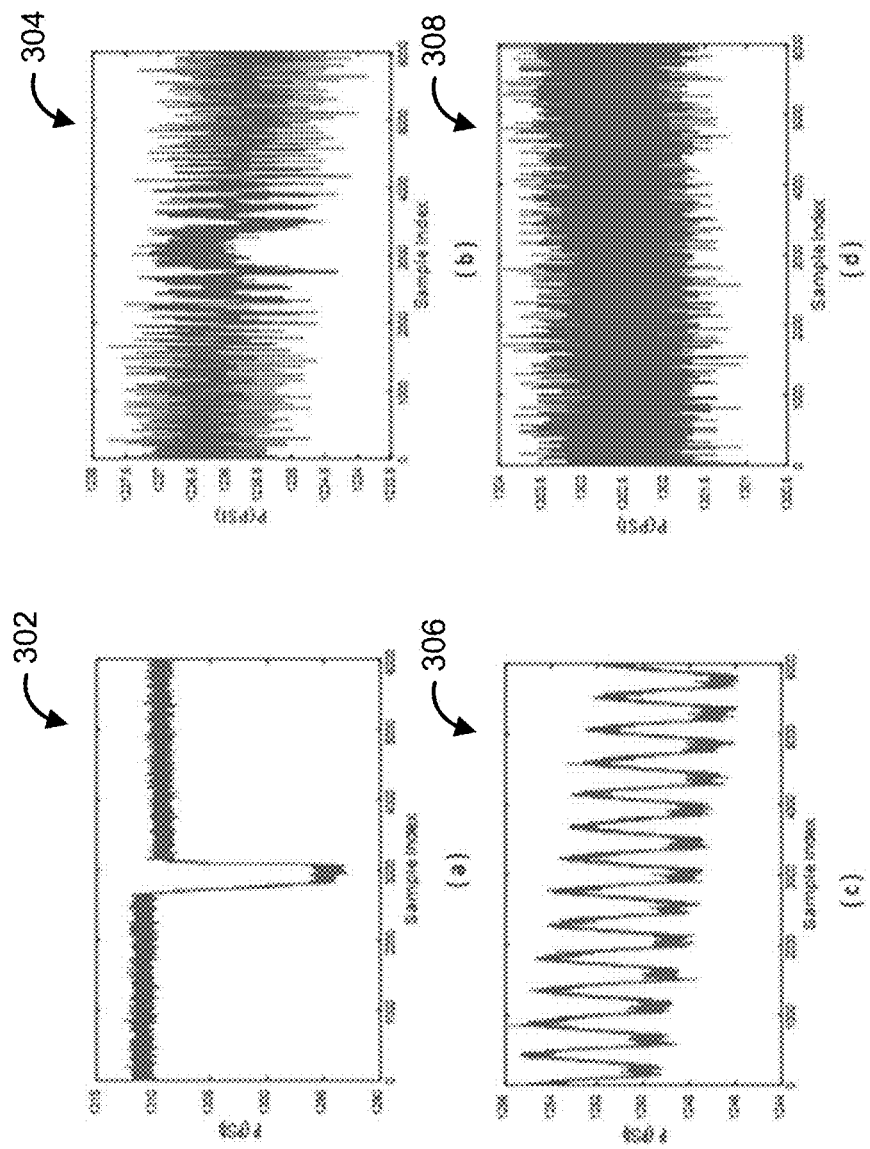
FIG. 3 illustrates examples of raw pressure sensor responses to different pipeline events used as the basic measurement classes, according to some embodiments.

FIG. 3 illustrates examples of raw pressure sensor responses to different pipeline events used as the basic measurement classes, according to some embodiments.

The subplot 302 shows an example of a simulated pipeline leak by opening and closing a releasing valve, according to some embodiments. The subplot 304 shows an example of a pipeline frequency shift event, according to some embodiments. The subplot 306 shows an example of a pipeline valve chattering event, according to some embodiments. The subplot 308 shows an example of the typical normal operation data, according to some embodiments.

Figure 4:
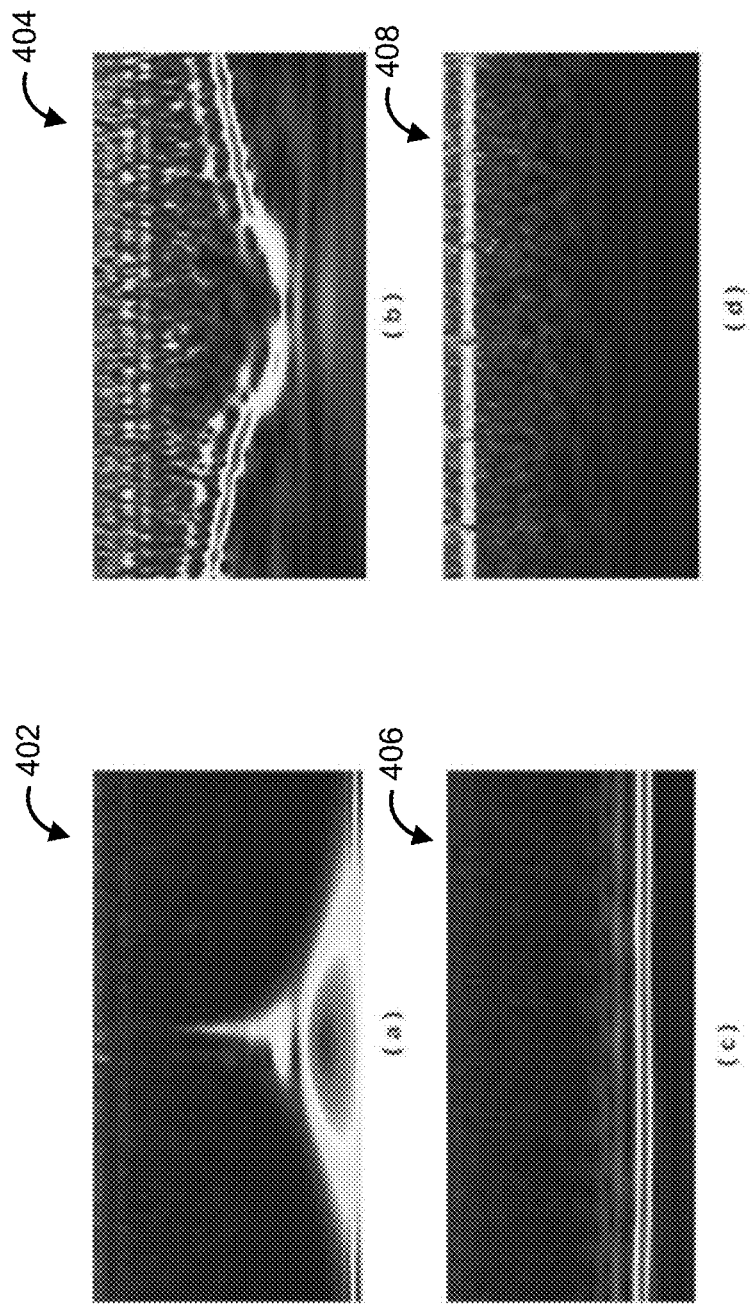
FIG. 4 illustrates examples of 3D Images generated using a CWT analysis using FIG. 3 data inputs, according to some embodiments.

FIG. 4 illustrates examples of 3D Images generated using a CWT analysis using FIG. 3 data inputs, according to some embodiments.

Image 402 shows the 3D image of the simulated leak generated using a CWT analysis using subplot 302 data input, according to some embodiments. Image 404 shows is the 3D image of the frequency shift generated using a CWT analysis using subplot 304 data input, according to some embodiments. Image 406 shows is the 3D image of the valve chattering generated using a CWT analysis using subplot 306 data input, according to some embodiments. Image 408 shows is the 3D image of the normal operation data generated using a CWT analysis using subplot 308 data input, according to some embodiments. These images show that the 3D images produced using a CWT may be distinct from one another and thus a CNN may be capable of distinguishing pressure surges indicative of, for example a pipeline leak from pressure surges indicative of other phenomena.

Figure 5:
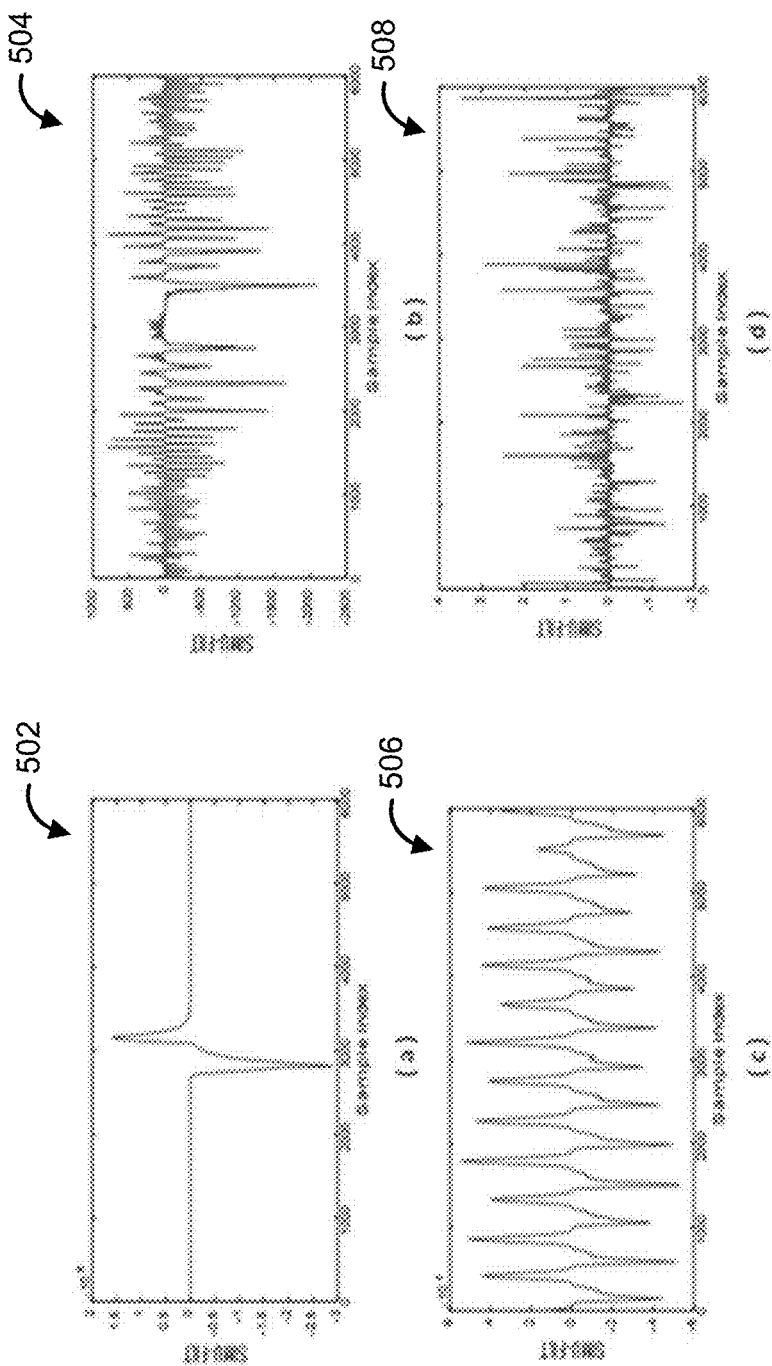
FIG. 5 shows examples of bandpass-filtered pressure data responses to different pipeline events with additional signal-to-noise enhancement by cubing the filter output using the simulated pipeline leak data input from FIG. 3, according to some embodiments.

FIG. 5 shows examples of bandpass-filtered pressure data responses to different pipeline events with additional signal-to-noise enhancement by cubing the filter output using the simulated pipeline leak data input from FIG. 3, according to some embodiments.

The subplot 502 shows the enhanced filtering output using the simulated pipeline leak data input from subplot 302, according to some embodiments. The subplot 504 shows the enhanced filtering output using the pipeline frequency shift data input from subplot 304, according to some embodiments. The subplot 506 shows the enhanced filtering output using the pipeline valve chattering data input from subplot 306, according to some embodiments. The subplot 508 shows the enhanced filtering output using the normal operation data input from subplot 308, according to some embodiments.

Figure 6:
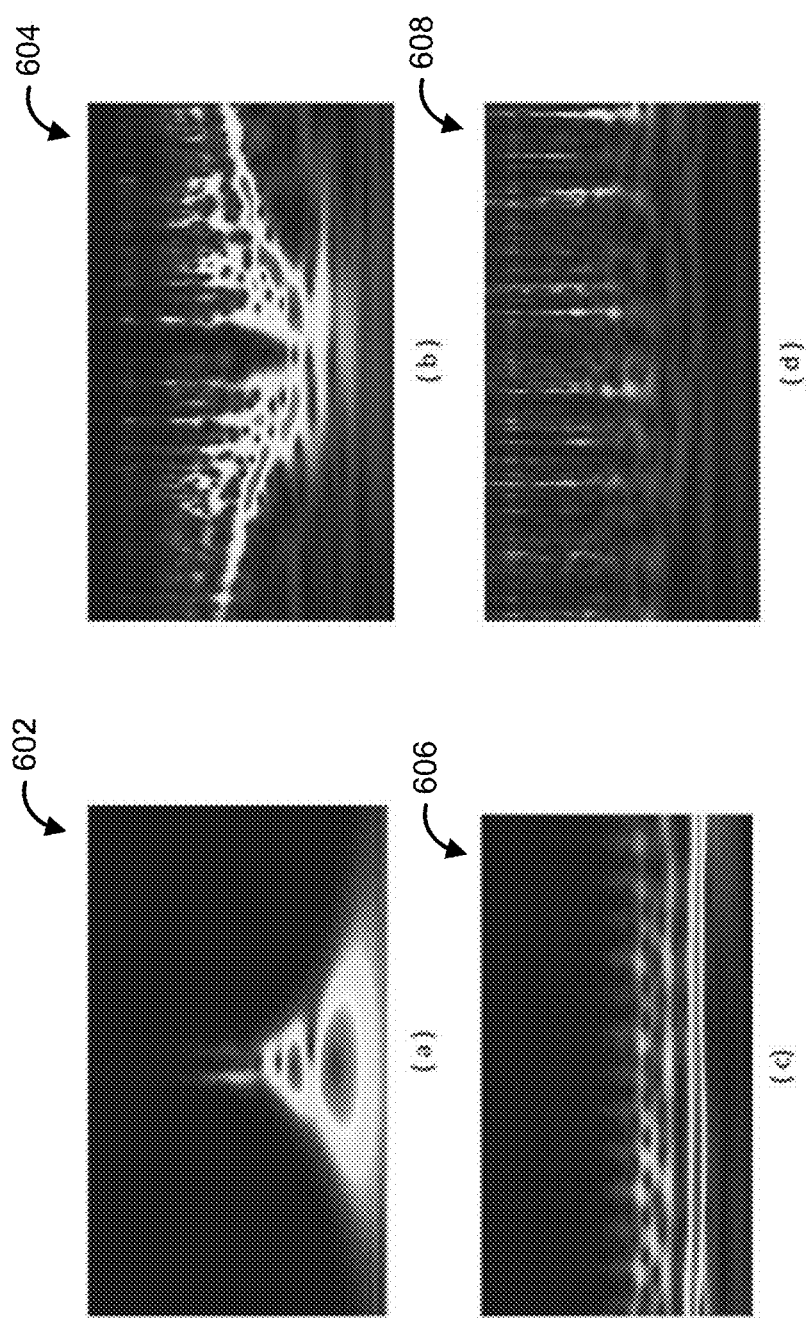
FIG. 6 shows examples of 3D Images generated using a CWT analysis using FIG. 5 data inputs, according to some embodiments.

FIG. 6 shows examples of 3D Images generated using a CWT analysis using FIG. 5 data inputs, according to some embodiments.

Image 602 shows the 3D image of the simulated leak generated using a CWT analysis using the subplot 502 data input, according to some embodiments. Image 604 shows the 3D image of the frequency shift generated using a CWT analysis using the subplot 504 data input, according to some embodiments. Image 606 shows the 3D image of the valve chattering generated using a CWT analysis using the subplot 506 data input, according to some embodiments. Image 608 shows is the 3D image of the normal operation data generated using a CWT analysis using the subplot 508 data input, according to some embodiments. Filtering can be useful in some implementations where there is expected to be, for example, high noise or small pressure surges. This advantage can be seen from the difference between image 402 and 602, 404 and 604, 406 and 606, and 408 and 608. These differences can make it easier for any method (e.g., a CNN) to distinguish between images indicative of a pipeline leak from those indicative of other pipeline behaviour.

Figure 7:
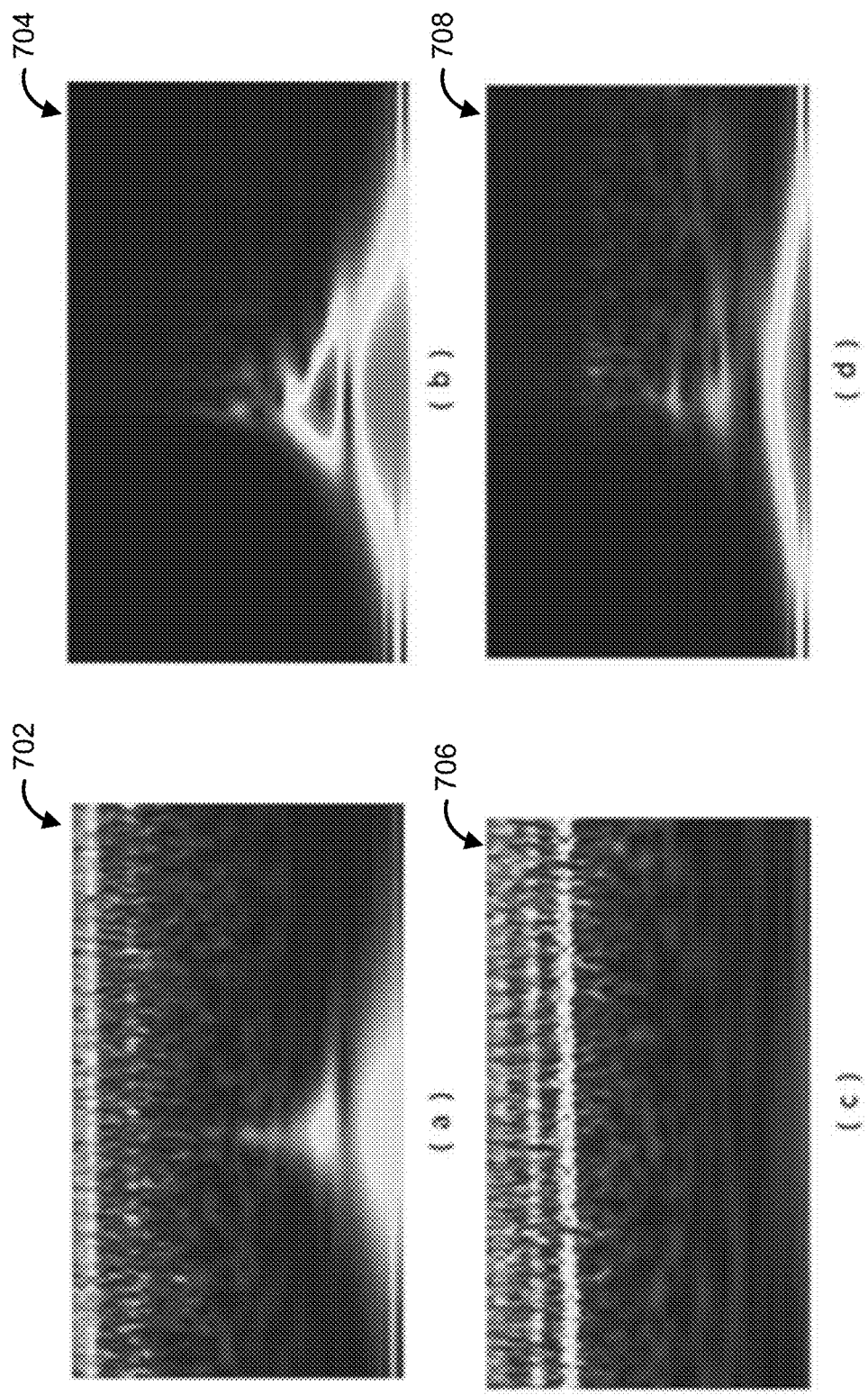
FIG. 7 illustrates examples of filtered or raw data with large or small pressure surges, according to some embodiments.

FIG. 7 illustrates examples of filtered or raw data with large or small pressure surges, according to some embodiments.

Image 702 is generated from the raw pressure data inputs with large pressure surge by applying a CWT analysis, according to some embodiments. Image 704 is generated from the filtered pressure data inputs with large pressure surge, according to some embodiments. Image 706 is generated from the raw pressure data inputs with small pressure surge, according to some embodiments. Image 708 is generated from the filtered pressure data inputs with small pressure surge, according to some embodiments.

FIG. 7 shows example images from pipelines carrying natural gas, according to some embodiments. Images 702 and 704 are both generated from pressure data with a large pressure surge, but image 702 shows how raw data might be processed while 704 shows how filtered data might be processed. Images 706 and 708 are both generated from pressure data with a small pressure surge, but 706 shows how raw data might be processed while 708 shows how filtered data might be processed. Both sets of images show that the distinctive patterns produced from the surge after applying a CWT analysis may be more prominent if the raw input is filtered before the 3D image is generated, especially where the pressure surge is small.

CNN models can be developed as a universal model for different pipeline applications. Noise levels can vary from case to case. For low-noise applications with large pressure surges, images from filtered data and raw data may look similar. For high-noise applications with small pressure surges (e.g., natural gas pipelines), measurement images may be very sensitive to the background noise and hence it may be beneficial to filter the pressure data.

For pipeline-specific CNN design, the training image selection can be fit-for-purpose. However, universal CNN design may best utilize deep learning capabilities to solve complex pattern recognition problems. Filtering the pressure data may also be commercially advantageous because the CNN may be adapted to a variety of background noise and signal processing algorithms.

In some embodiments, a frequency shift event can be specific to the system and equipment electronics. During a frequency shift, the measured dominant frequency of the pipeline may decrease to near-zero in a short time interval, hold there for a while, and then may quickly increase back afterward. Frequency shift events may also be observed from different fluid types (e.g., liquefied propane pipelines, natural gas pipelines and water injection pipelines) using similar sensor hardware units.

In some embodiments, valve chattering can refer to the abnormally rapid reciprocating motion of the pressure-relief valve from its oriented position, causing a pressure oscillation to propagate through the sensor sites.

In some embodiments, the interference of frequency shift and valve chattering can be eliminated at the sensor sites after training CNNs with the different measurement image classes above. This may be useful in some embodiments with use of CNN to reduce the rate of false positives. This may also be useful to reduce the computational burden on, for example, the cloud site, in embodiments that use a cloud site to verify whether pressure surges are pipeline leaks.

In some embodiments, categories or classes may refer to the classification patterns of the CNN. In some embodiments, a CNN four-pattern classifier can be used to, for example, classify the data patterns of pressure surge, frequency shift, valve chattering, and normal operation. In some embodiments, frequency shift can be grouped into (e.g., classified with) normal operation because pressure variation induced by a frequency shift does not propagate through the pipeline (i.e., it is only local signal variation). Such an embodiment may only require that the CNN distinguish between three classes (or categories) of data patterns (e.g., pressure surges, valve chattering, and normal operation). In some embodiments, valve chattering can be grouped into (e.g., classified with) other propagated anomalies. In some embodiments, pressure surges may not be a unique response of pipeline leak and may be induced by other routine operations. In some embodiments, identifying a pressure surge is the task of CNN at the sensor site. In some embodiments, differentiating pipeline leaks from other pressure surges is the task of the ANFIS model at the cloud site.

In some embodiments, new categories of detected pipeline phenomena can be added to increase the number of classes for CNN recognition. In some embodiments, the presence of different pipeline phenomena may rule out (or otherwise make it less likely that) a pressure surge arises from a pipeline leak. For example, a pressure surge coupled with frequency shift, or pressure surge coupled with valve chattering in the same time interval may be recognized by the system as either one of the two categories dependent on a calculated probability. Alternatively in some embodiments, the categories can also be grouped into two new coexistent measurement classes. New classes of measurements may also be taken from the pipeline hydrostatic testing and pigging as extended services to detect existing pipeline leaks and estimate pigging locations. In some embodiments, pressure surges induced by simulated leaks and routine operations may not be separated into different classes at each sensor site. For example, pressure surges indicative of an activation of a pump or compressor or a partial open valve may be distinguishable from the pressure surges arising from a pipeline leak. In some embodiments, various pressure surges may be differentiated at the cloud site by integrating measurement data from multiple sensor units.

Classifying pipeline measurements with CNNs can be carried out by classifying time series data using wavelet analysis with deep learning. Such pipeline classifications may be useful in a variety of industries (e.g., in the oil and gas pipeline industry).

Figure 8B:
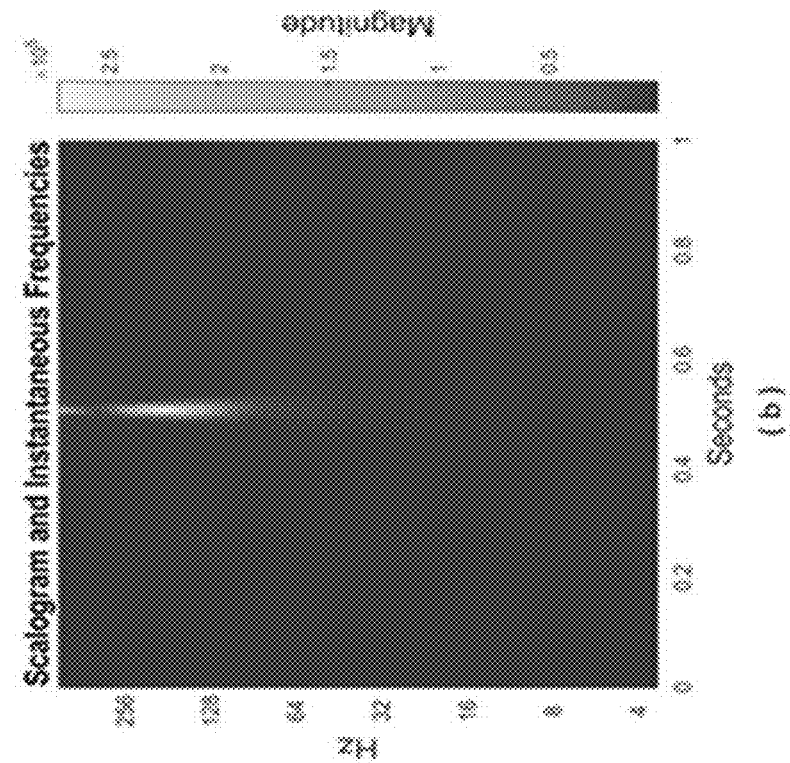
FIG. 8B shows the scalogram and instantaneous frequencies applied to a simulated leak from a small gas test loop with sampling frequency of 1000 Hz, according to some embodiments.
Figure 8A:
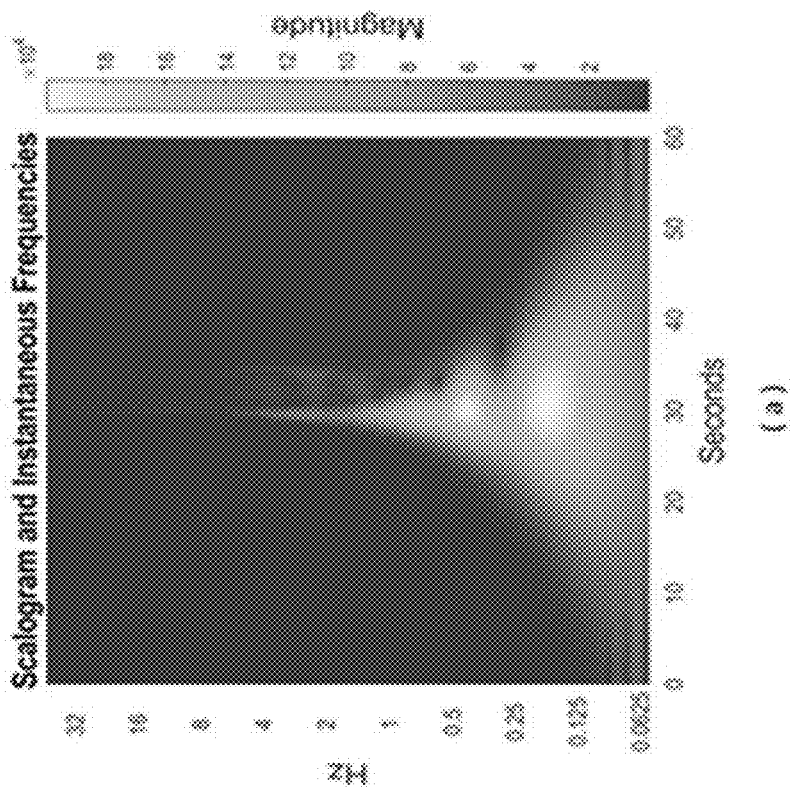
FIG. 8A shows the scalogram and instantaneous frequencies applied to a simulated leak from a liquified propane pipeline with re-sampling frequency of 100 Hz, according to some embodiments.

FIG. 8A and FIG. 8B illustrates examples of scalogram and instantaneous frequencies of two events (a low-frequency, long duration event and a high-frequency, short duration event), according to some embodiments. The scalogram is the absolute value of the continuous wavelet transform (CWT) of a signal, plotted as a function of time and frequency.

FIG. 8A shows the scalogram and instantaneous frequencies applied to a simulated leak from a liquified propane pipeline with re-sampling frequency of 100 Hz, according to some embodiments. FIG. 8B shows the scalogram and instantaneous frequencies applied to a simulated leak from a small gas test loop with sampling frequency of 1000 Hz, according to some embodiments. Using the scalogram, better frequency localization may be determined for low-frequency, longer-duration events like that of FIG. 8A, and better time localization may be determined for short-duration, high-frequency events like that of FIG. 8B. In some embodiments, CNNs with training images converted from one-dimensional CWT analysis can extract adequate features to recognize the patterns of different pipeline events.

In some embodiments, retraining GoogleNet (or SqueezeNet) may first be applied to the measurement data from a liquefied propane pipeline. More than 14,000 3D images can be created from one-dimensional pressure measurements for CNN training and validation in identifying pressure surge, frequency shift, valve chattering, and normal operation data. The image data inputs can be resampled at a frequency of, for example, 100 Hz for 60 seconds to achieve high resolution at low-frequency range and provide adequate window length in collecting longer-duration events. In some embodiments, to improve diversity of the retraining examples, the 60-second data inputs can be shifted from, for example, −20 seconds to +20 seconds from the center of the triggering point in, for example, 5 second steps to generate images for pressure surge, frequency shift and valve chattering.

Liquefied propane can be a representation of Liquefied Petroleum Gas (LPG) with a fluid density falling between non-compressible liquids and highly compressible natural gas. In some embodiments, LPG images can be used as pipeline pressure measurement images. In some embodiments, image data from different pipelines in various classes can be integrated into the LPG images used for pipeline pressure measurement images. Testing images from other pipelines can be classified even if the CNNs are retrained from LPG pipeline data alone. By applying pipeline-specific signal processing, the CNN classifier may be insensitive to pipeline configuration and fluid types, especially for pressure surge identification.

Figure 9:
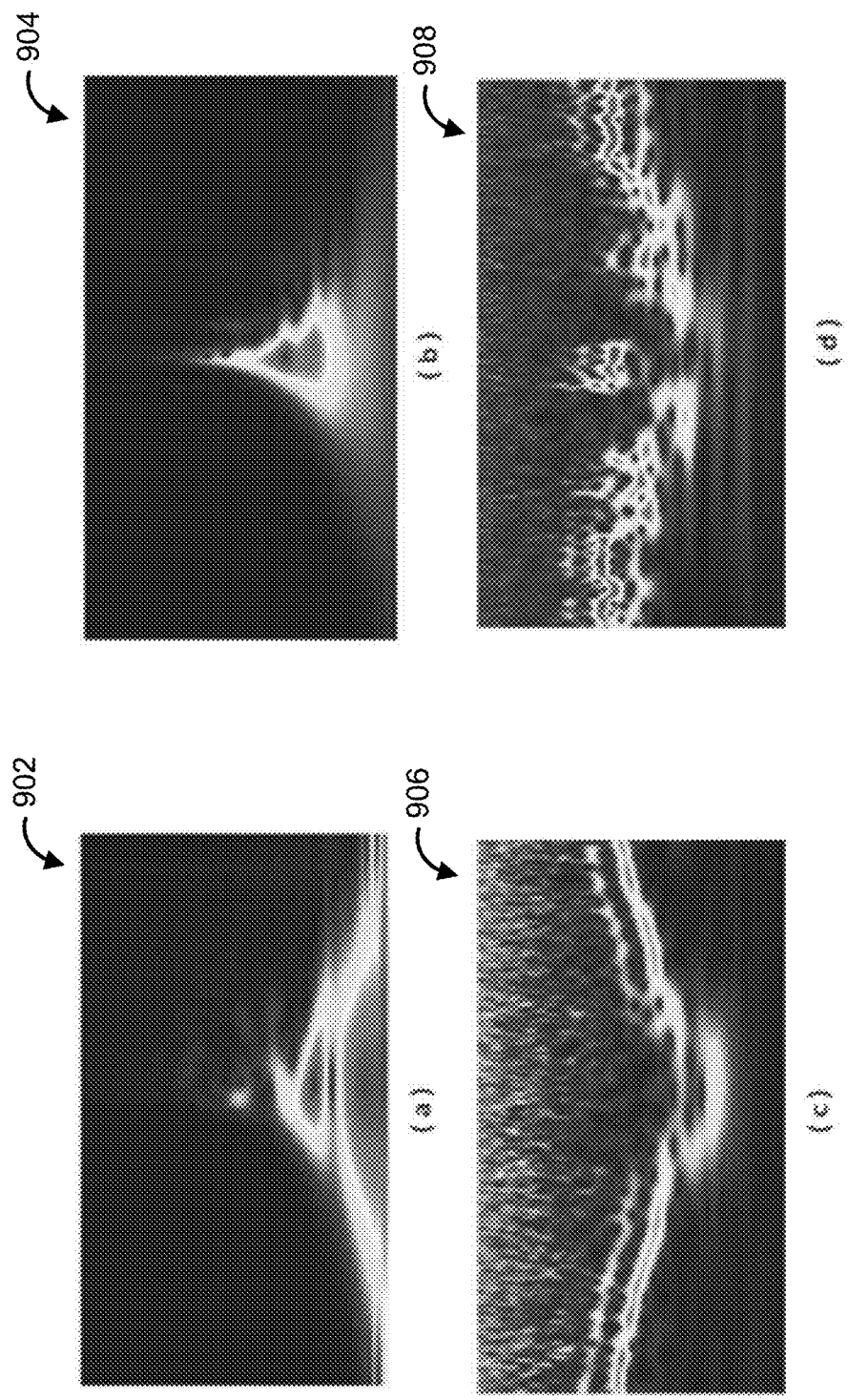
FIG. 9 illustrates some testing images generated from pipeline liquids different from the training pipeline, according to some embodiments.

FIG. 9 illustrates some testing images generated from pipeline liquids different from the training pipeline, according to some embodiments.

Image 902 shows a simulated leak from a natural gas pipeline, according to some embodiments. Image 904 shows the simulated leak from a water injection pipeline. Image 906 shows the frequency shift from a natural gas pipeline. Image 908 shows the frequency shift from a water injection pipeline. In some embodiments, the differences between 3D images generated from the pressure data of different liquids may be usable for fluid or phase identification for pipeline batch mode transmission with different fluid types, variable fluids compositions, and/or multi-phase scenarios.

In some embodiments, the time window length of the CNN testing images can be different from the CNN training images depending on the duration of the events and the focus of interest. The data inputs of training images can also be sampled with different frequencies and time intervals. CNN can adapt variable window length and variable frequency, and scale them to the specified image size (e.g., either 224-224-3 for GoogleNet or 227-227-3 for SqueezeNet). In some embodiments, the CNN classifier can be implemented through retraining with transfer learning. In some embodiments, the CNN classifier can be implemented independently of third party image recognition models (e.g., GoogleNet and SqueezeNet). In such embodiments, the structure may be simplified to reduce the computation load for real-time data processing. Pipeline measurement images can be used to build CNNs on various neural network training platforms such as Matlab and Python. The trained CNNs can also be exchanged between different platforms, for example, for testing and real-time data processing.

In some embodiments, after a pressure surge is detected with the CNN, the relevant information of the event (i.e., the pressure surge) can be transferred from each sensor site to the cloud site. In some embodiments, the transferred data may include the timestamps at the pressure surge point, the value of the pressure drop (DP), the simulated change of the flow rate (DV) for the given pressure drop, the magnitude of the triggering value (MT) from the simulation output of enhanced filtering, and the sum of the scalogram (SS) of the CWT, which is an approximation of the energy of CWT over time and frequency. Timestamps, DP, and the MT can be obtained directly during real-time signal processing on the sensor sites. DV may be measured directly if a flow meter is installed near the pressure sensor site. DV may also be simulated from the available measurements of pressure and temperature by determining the speed of sound and density of the fluid running through the pipeline. SS may be a more comprehensive representation of pressure surge transients. SS can be calculated from the CWT scalogram using filtered pressure data inputs. SS can be saved before the 3D image is created for CNN classification. SS can also be recalculated with adjusted CWT window size after the pressure surge is detected.

Case Studies with an Exemplary System Implementing an ANFIS Model

FIG. 10, FIG. 11, FIG. 12, and FIG. 13 all illustrate the profiles of two parameters in logarithm base 10 scale, according to some embodiments.

The following discussion deals with exemplary cases illustrating simulated leaks or routine operations generated from a liquefied propane pipeline with 6" ID. The discussion provides an exemplary illustration of some embodiments of the systems and methods described herein and the applications of same. The following discussion in no way limits the full scope of the systems and methods described herein.

In some embodiments, simulated leaks may be generated to test the accuracy of CNN pipeline pressure surge detection and/or ANFIS model pipeline leak detection. The simulated leak can be generated by opening and closing a valve with a fixed or variable orifice size at certain pipeline points, and measuring the propagated pressure surge response at different sensor sites for signal attenuation analysis. Signal attenuation may be a function of leak size, fluid type, and pipeline configuration.

FPUs can be multi-component units for local sensor data acquisition, processing, and transmission. The data acquisition can be controlled by a Programmable Logic Controller (PLC) for all pressure, temperature, and density data sampling. The GPS timestamp can be added to each sampling point during data acquisition. The signal processing code can be loaded to each FPU (e.g., individually). The CNN model may be loaded on each sensor site. The sensor site software container may be embedded in, for example, an IoT sensor site stack to provide functionality. Communication hardware and services can enable wireless communication from IoT sensor site devices to the central cloud site for application data transmission. The cloud software container can be embedded in the IoT cloud application and provide the central cloud site functions. The sensor site hardware can be built with industrial PLC (nano) for data influx and may get simulation and testing output to the cloud site. To determine a leak location with NPW technology, at least two FPUs may be installed on the upstream and downstream side of the leak point respectively.

FPU1 to FPU4 in the following exemplary cases are different units installed along a pipeline spaced either evenly or unevenly apart. The FPUs are installed from north to south. FPU1 can be called the boundary unit on the north side, and FPU4 can be called the boundary unit on the south side. There can be a section of pipeline on each side without a FPU installed. Events may occur in an area defined by the boundary units (FPU1 and FPU4) and be considered to occur within the measurement site. Events can also occur outside of the measurement site (e.g., either north of FPU1 or south of FPU4).

Figure 10:
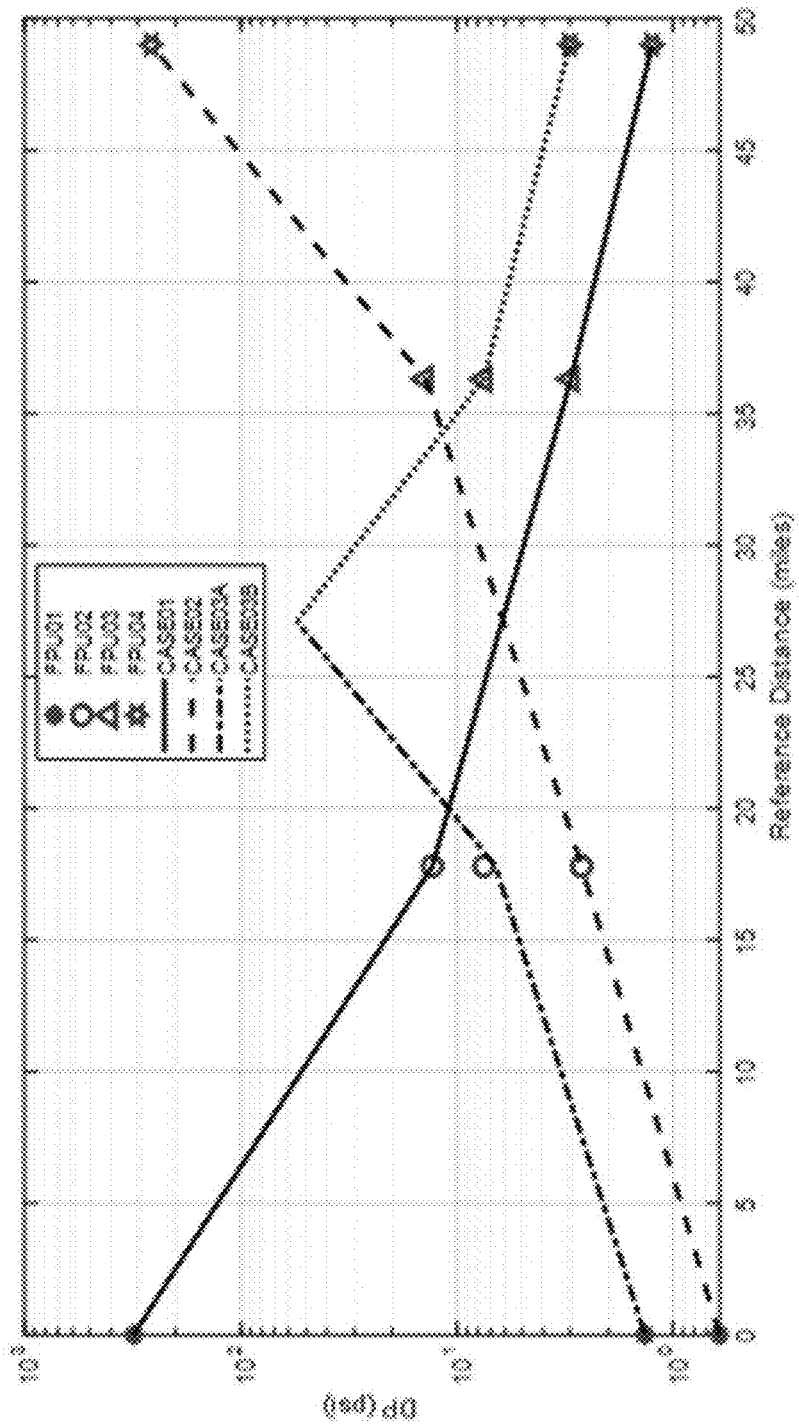
FIG. 10 and FIG. 11 illustrate the DP and SS responses to the simulated leaks in three cases (CASE01, CASE02, and CASE03) at four field operating units (FPUs), according to some embodiments.
Figure 11:
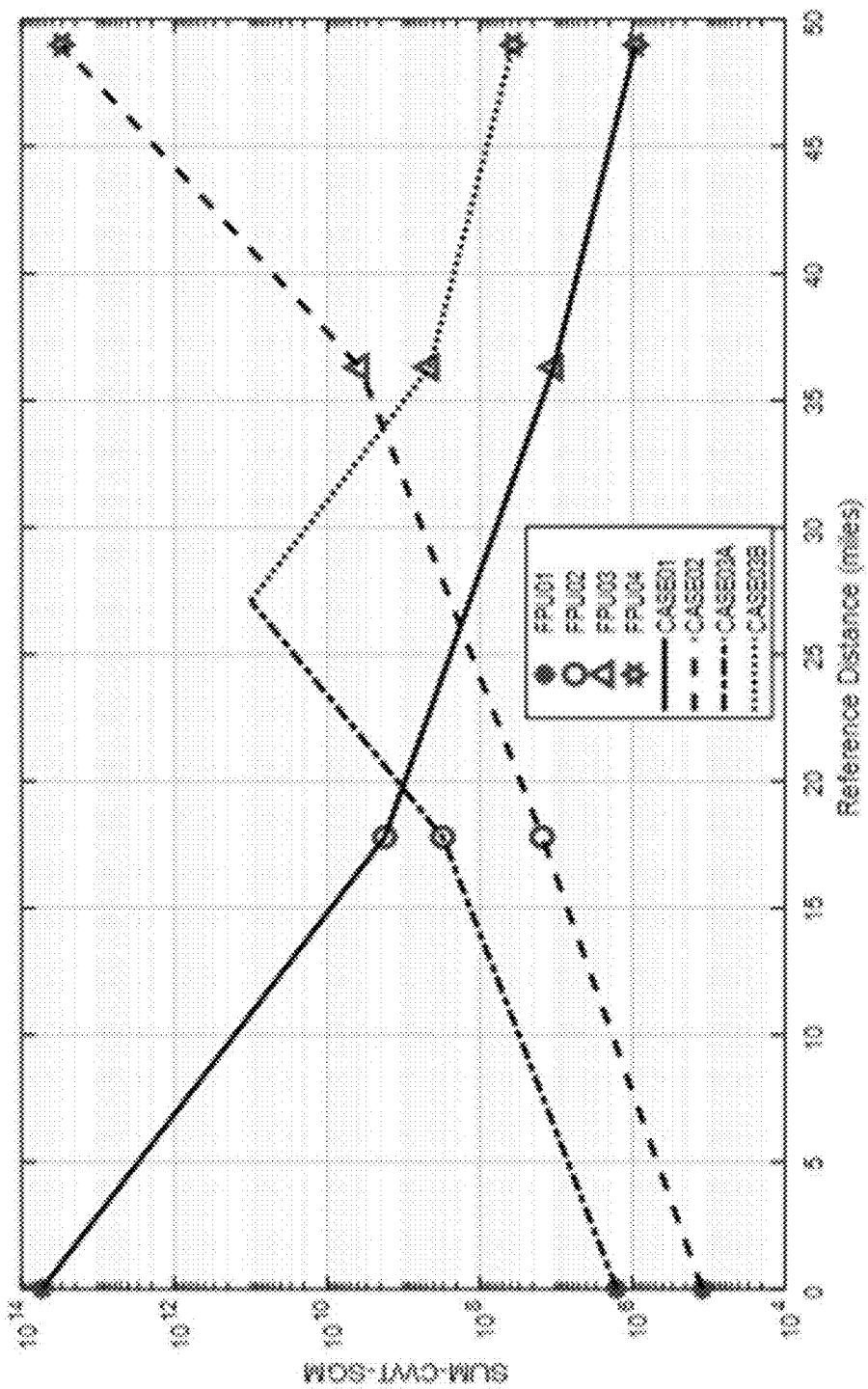

FIG. 10 and FIG. 11 illustrate the DP and SS responses to the simulated leaks in three cases (CASE01, CASE02, and CASE03) at four field operating units (FPUs), according to some embodiments.

In exemplary CASE01, the simulated leak was initiated using a half inch orifice at the manifold of boundary sensor unit of FPU1. The negative pressure wave was propagated from FPU1 to FPU4 with quick signal attenuation. In exemplary CASE02, the simulated leak was initiated with the same orifice size at the manifold of boundary sensor unit FPU4, and the pressure surge was propagated in the opposite direction from FPU4 to FPU1. Exemplary CASE03 was created by initiating the simulated leak near the midpoint between FPU2 and FPU3 with using of a quarter inch releasing orifice. The negative pressure wave was propagated in two directions over the existing measurement site. The value of the pressure surge and data installed transients in CASE03 at the leak point were not observable. The curve extension in CASE03 was estimated from flow analysis.

Figure 12:
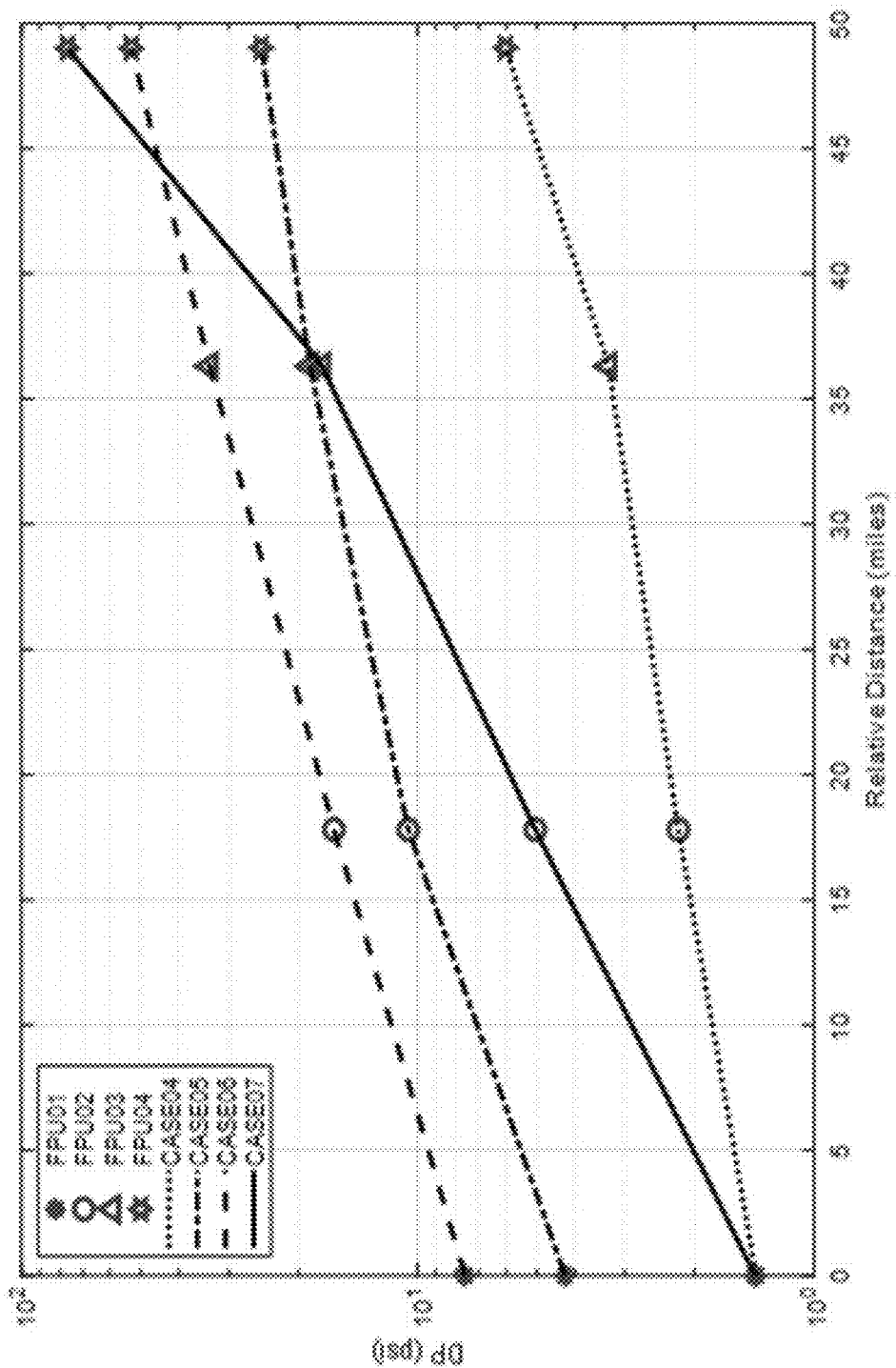
FIG. 12 and FIG. 13 illustrate the same DP and SS responses to the actual exemplary field events in four more exemplary cases (CASE04, CASE05, CASE06, CASE07), according to some embodiments.
Figure 13:
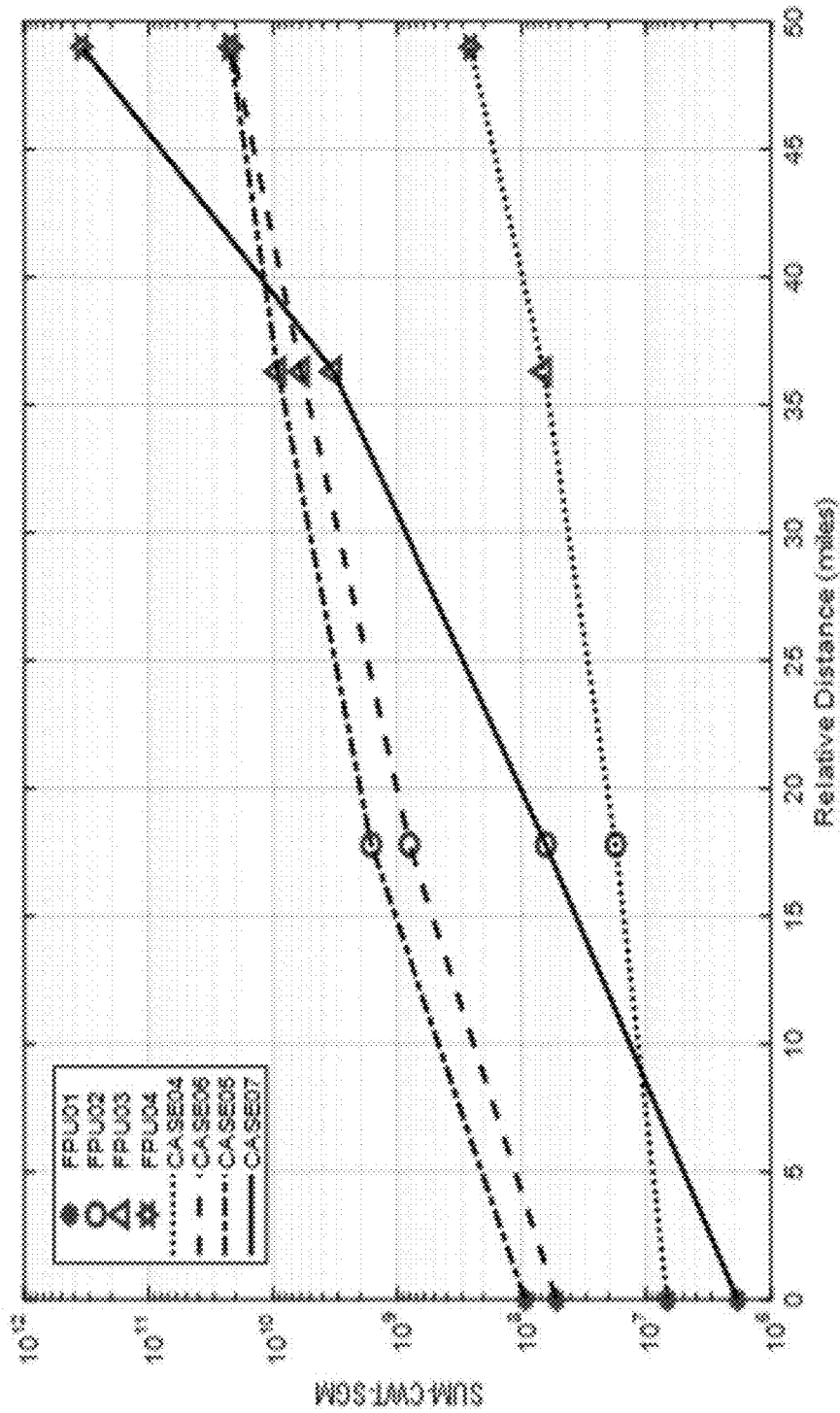

FIG. 12 and FIG. 13 illustrate the same DP and SS responses to the actual exemplary field events in four more exemplary cases (CASE04, CASE05, CASE06, CASE07), according to some embodiments. All events are initiated from outside of FPU4, and propagated from FPU4 to FPU1. The trend and separation of curves may indicate the differences in the driving forces of events.

Figures 14A, 14B:
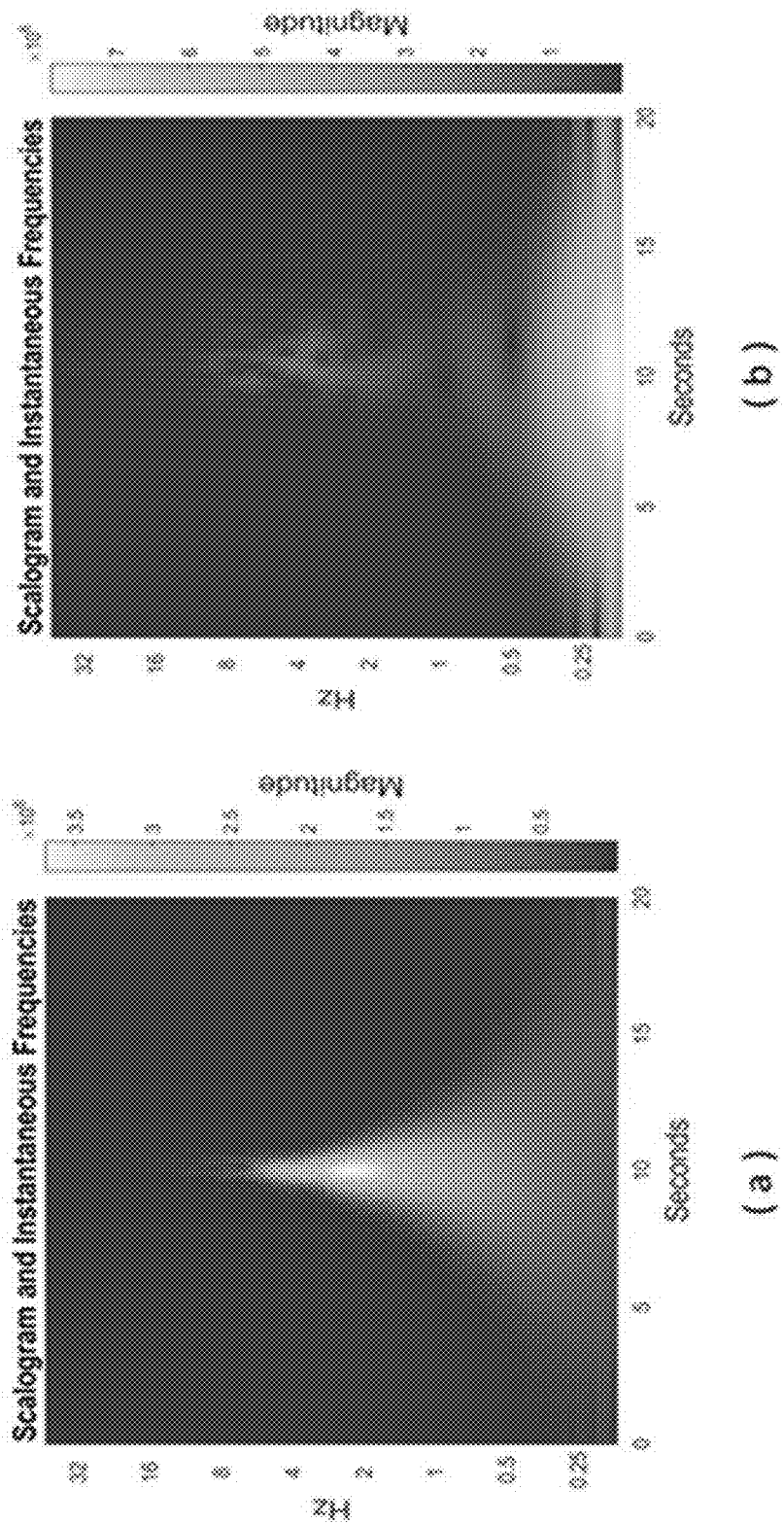
FIG. 14A and FIG. 14B illustrate scalograms of CASE05 and CASE06, respectively, calculated at FPU4, according to some embodiments.

FIG. 14A and FIG. 14B illustrate scalograms of CASE05 and CASE06, respectively, calculated at FPU4, according to some embodiments. Compared to the longer-duration, lower-frequency surge in CASE06, CASE05 can trigger a short-duration, higher-frequency surge.

The ratio of the measurements over the distance can be calculated as shown in Table 1 using the adjacent sensor pair having the earliest timestamps registered in each of the exemplary cases. The gradient of the measurement ratio can be used with a DT gradient as analytical inputs to build the logics (i.e., training the models) in differentiating simulated leaks from other pressure surges. DT can represent the difference between the timestamps of the adjacent sensor pair. The DT can be used to estimate the speed of sound and accurately determine the leak location. DT gradient can represent the DT divided by the distance between the adjacent sensor pair. DT gradient can be used with gradients calculated from other ratio parameters to evaluate the signal attenuation (see Table 1 below). With fixed distance between the sensor pair, the DT and other ratio parameters can simply be used. The gradient calculation over the distance can be used to account for unevenly spaced sensors. In some embodiments, the wave propagation behavior between the FPUs may suggest different leak locations. The analytical inputs can be linguistic large when the simulated leaks are initiated at the FPU sites in CASE01 and CASE02, and the DT gradients corresponding to the one-direction site-to-site wave propagation time measured on the same day can be about the same. In contrast, the two-direction wave propagation in CASE03 only registered minor differences in analytical inputs on the adjacent sensor pair, which strongly suggests fluid releasing near the middle point of FPU3 and FPU2. Although the DP and SS curves from CASE04 to CASE06 may be different in FIG. 12 and FIG. 13, the gradients of the measurement ratio of FPU4/FPU3 may be within a range which can be defined linguistic small. The DT gradients in those three cases may indicate the one-direction wave propagation time over the distance between FPU4 and FPU3, but vary a bit compared to CASE02 possibly due to the effect of temperature on the speed of sound on different days for the compressible LPG fluid. CASE07 profiles may look similar to the profiles of the simulated leak in CASE02 with quick signal attenuation from FPU4 to FPU1. However, the ratio analytical inputs of CASE07 can be linguistic medium because the event may be initiated outside of measurement site. Inference in Table 1 may also demonstrate that with integrated data analysis performed on the cloud site (which only needs limited additional information transferred from the sensor sites), The need to use additional boundary sensors to identify the events outside of measurement site can be eliminated.

TABLE 1

Exemplary pressure surges driven by simulated leaks
or routine operations, according to some embodiments.

| | | PARAS | | |
|---|---|---|---|---|
| CASES | (T1-T2)/DIST (sec/mile) | (DP1/DP2) DIST | (SS1/SS2) DIST | Inference |
| 1 | FPU1 and FPU2 | 2.0065 (Large) | 1.9447 (Large) | 1744.2 (Large) | Leak at FPU1 |
| 2 | FPU4 and FPU3 | 2.0317 (Large) | 1.4623 (Large) | 640.61 (Large) | Leak at FPU4 |
| 3 | FPU3 and FPU2 | 0.0106 (Small) | 0.0612 (Small) | 0.0803 (Small) | Leak near middle of FPU2 and FPU3 |
| 4 | FPU4 and FPU3 | 1.9858 (Large) | 0.1432 (Small) | 0.3065 (Small) | Routine control outside FPU4 |
| 5 | FPU4 and FPU3 | 1.8954 (Large) | 0.1045 (Small) | 0.1929 (Small) | Routine control outside FPU4 |
| 6 | FPU4 and FPU3 | 1.8641 (Large) | 0.1241 (Small) | 0.2868 (Small) | Routine control outside FPU4 |
| 7 | FPU4 and FPU3 | 1.9227 (Large) | 0.3460 (Medium) | 8.3199 (Medium) | Probable leak outside FPU4 |

Adaptive Neuro-Fuzzy Inference System (ANFIS)

In some embodiments, the logics used to differentiate pipeline leaks from other pressure surges can be implemented on the cloud site, for example, as an adaptive neuro-fuzzy inference system (ANFIS) model. ANFIS model can map input characteristics to input membership functions, input membership function to rules, rules to a set of output characteristics, output characteristics to output membership functions, and the output membership function to a single-valued output or a decision associated with the output. Given the training, validation, and testing sets available on the pipeline cloud site, ANFIS models can be built, for example, by learning from data with membership function parameters adjusted using a backpropagation algorithm in combination with a least squares type of method to minimize the calibration error.

Figure 15:
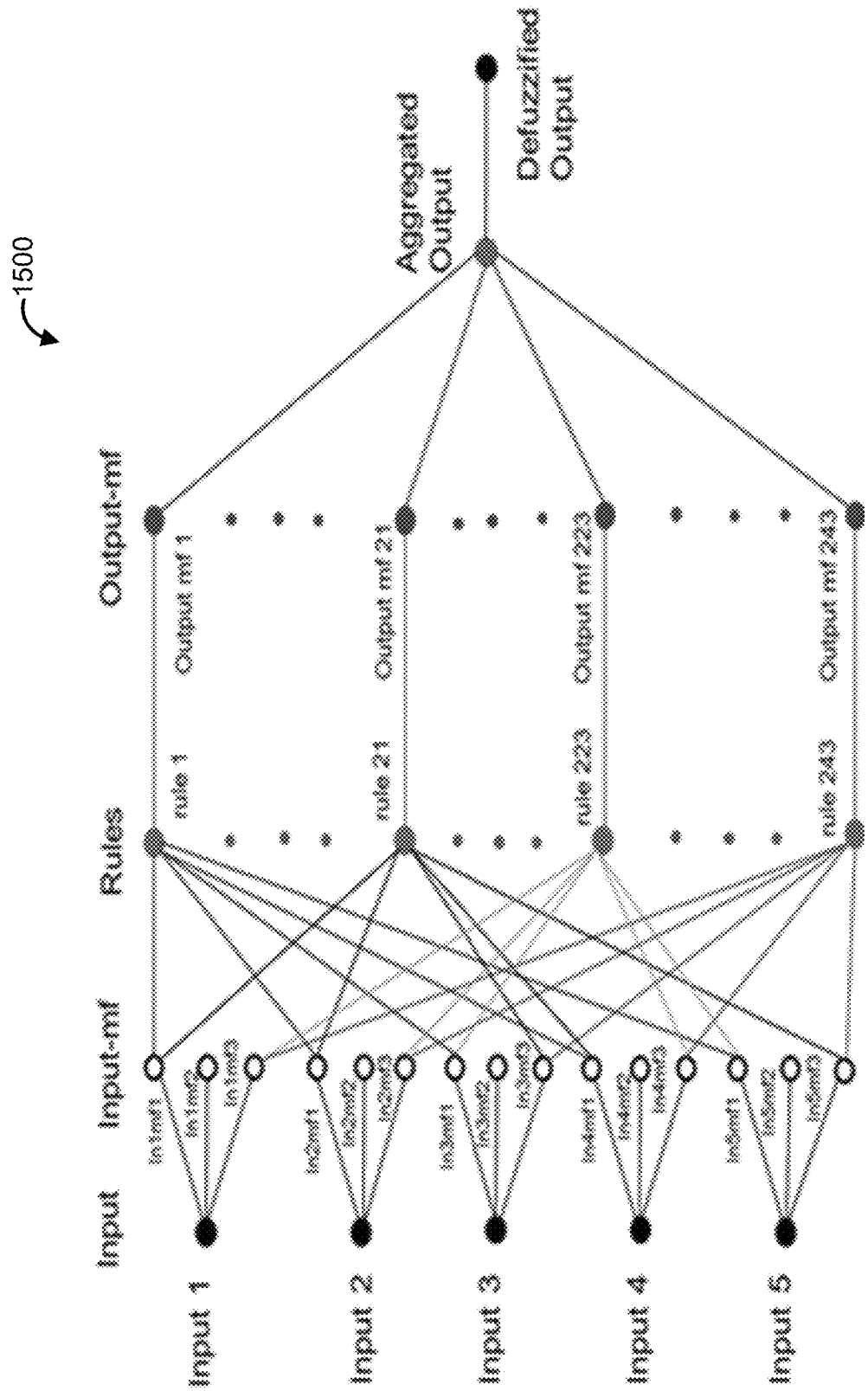
FIG. 15 illustrates an example adaptive neuro-fuzzy inference system (ANFIS) model structure, according to some embodiments.

FIG. 15 illustrates an example adaptive neuro-fuzzy inference system (ANFIS) model structure 1500, according to some embodiments.

In FIG. 15, five model inputs are shown for explanation purpose, but the implementation of an ANFIS model for leak detection can use a different number of model inputs, for example, at least two model inputs. In some embodiments, the number of membership functions (a function showing a probability distribution over a parameter range) and model inputs can provide the relationship that defines the fuzzy rules. In some embodiments, the number of fuzzy rules may be equal to the number of membership functions to the power of the number of model input. For example, three membership functions (MF) can be defined for each linguistic small (mf1), medium (mf2) and large (mf3), two model inputs can deduce $3^2=9$ fuzzy rules, and five model inputs can deduce $3^5=243$ fuzzy rules. For each input, the bell-shaped MF with a maximum degree equal to 1 and a minimum degree equal to 0 (also called fuzzy input set) can be calculated with 3 nonlinear tuning parameters for each MF optimized through training. Referring to FIG. 15, for example, the rule 1 can be associated with all 5 small (mf1) fuzzy inputs, and the rule 243 applies if, for example, all 5 fuzzy inputs are large (mf3). The output membership function corresponding to the same rule number can be a linear combination of inputs calculated. For each rule, the number of linear parameters for each output MF is 3 for two-input ANFIS models, and is 6 for five-input ANFIS models. The overall number of parameters including both nonlinear and linear parts equals 45 for two-input ANFIS models, and 1503 for five-input ANFIS, which can be implemented into a software package after the ANFIS models model is built. The advantage of an ANFIS model can be its power for modeling nonlinear systems by interpolating multiple linear models. In order to achieve good generalization capability, it can be important to have the number of training data points be larger than the number of parameters to be estimated.

In some embodiments, input parameters for the ANFIS model can be based on a sensor pair with the earliest registered timestamps. For example, DP1 and SS1 registered earlier than DP2 and SS2. In such embodiments, the positive ratio of DP1/DP2 and SS1/SS2 may indicate that the earlier registered parameter has a larger magnitude. In some embodiments, the ANFIS model may capture information beyond a relevant sensor pair. In some embodiments, inputs from multiple sensors (i.e., more than the sensor pair with the earliest registered timestamps) can be used to, for example, more accurately determine the sensor timestamp. Uncertainty in a timestamp measurement can be reduced when looking to other sensor pairs (e.g., for sensor pair 1 and 2, looking to sensor pairs 1 and 3 or 1 and 4).

In some embodiments where pipeline fluid is less-compressible, and the pipeline configuration elements between the adjacent sensors are about the same (e.g., similar distance between sensors, consistent pipe configuration, piping material, etc.), a unique ANFIS model may preferentially be built for the particular pipeline. In some embodiments, where the pipeline fluid is highly compressible and with very different distances between measurement units, ANFIS models may preferentially be built individually for each adjacent sensor pair. In some embodiments, DT gradient can be included as an input. Other candidate inputs may include a value of a pressure drop (DP), a simulated change of the flow rate (DV) for the given pressure drop, a magnitude of the triggering value (MT) from a simulation output of enhanced filtering, and a sum of the scalogram (SS) of the CWT. The central frequency at the triggering point of the event can be another candidate input. The single training output can be set to different values for various cases. For example, '0' for a leak within the measurement site, '1'' for other pressure surges within the measurement site, '2' for a leak at the sensor site, '3' for other surges near the sensor site, '4' for a leak outside of the measurement site, '5' for other surges outside of the measurement site. Other inputs and outputs are conceived.

Referring to Table 1, only two adjacent sensors for each case are listed that have the earliest registered event timestamps. Using a single sensor pair nearest to the event location can be adequate to differentiate leaks from other pressure surges at the sensor site or outside of the measurement site. In some embodiments, the evaluation of signal attenuation can extend to other adjacent sensor pairs in each wave propagating direction for events that occurred within the measurement site to aid in differentiating between leaks and routine operational pressure surges. In such embodiments, the ratio of analytical inputs of the sensors may be similar for the first sensor pair, but may show different gradients for the second sensor pair with fast leak signal attenuation. For the second sensor pair, the event occurred between the first sensor pair and thus the event would be considered as outside of measurement site for the second sensor pair, and fuzzy rules can be applied using an ANFIS model analysis. In some embodiments, the analytical inputs based on the far-distant sensor pair may still work for less-compressible pipeline fluid even if an intermediate sensor does not function.

In some embodiments, after a leak is detected either at a sensor site or within the measurement site, a leak alarm can be issued from the cloud site followed by the detected leak location. Described herein are systems and methods to identify pressure surges from other pipeline anomalies at the sensor sites through CNN image pattern recognition, and to differentiate pipeline leaks from other pressure surges using an ANFIS model for decision making. The precision of timestamps and the accuracy in leak location determination may be improved by using data inputs with high sampling rate.

Figure 16:
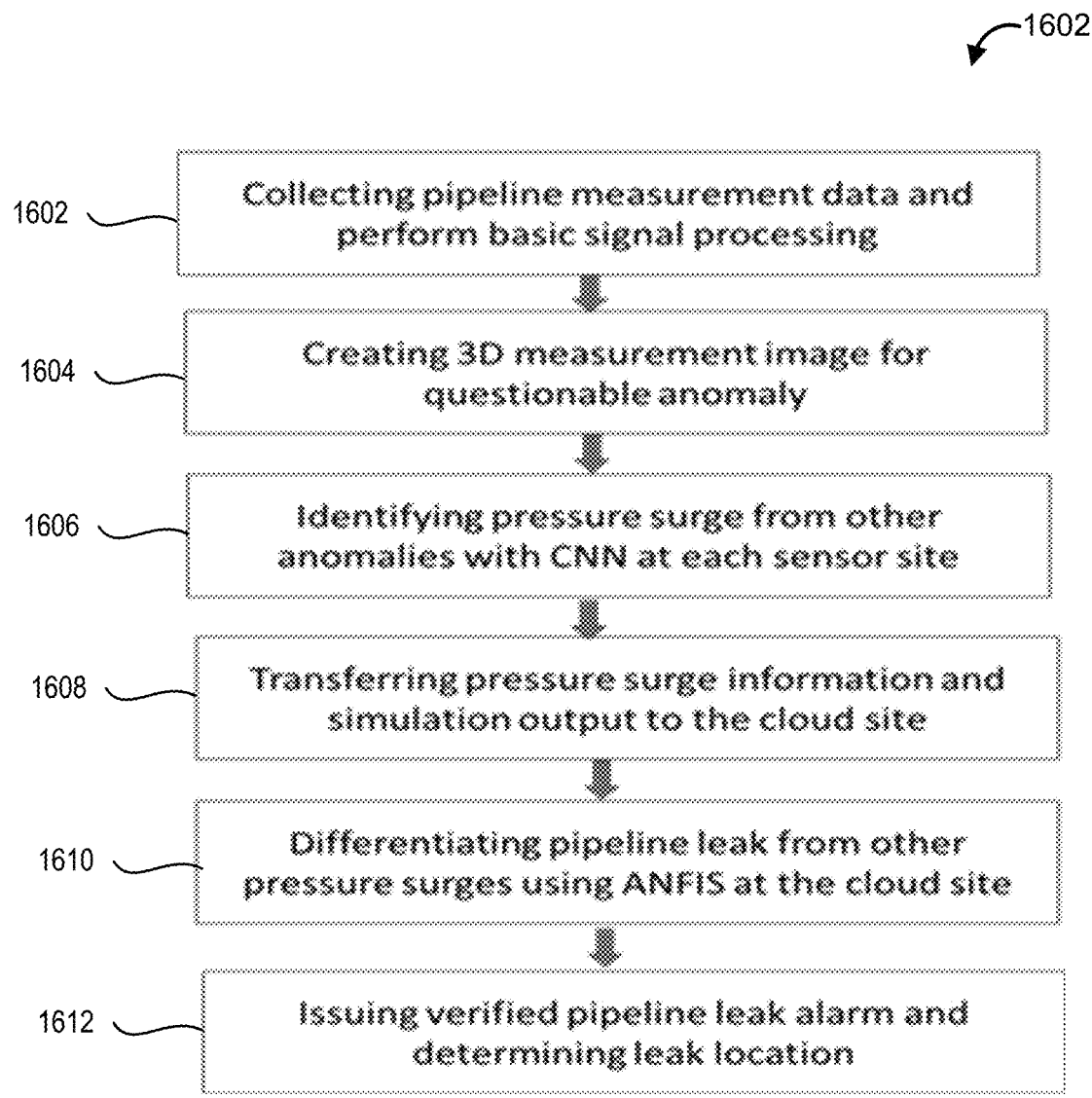
FIG. 16 illustrates an example process for real-time pipeline leak detection with advanced measurement classification and decision making, according to some embodiments.

FIG. 16 illustrates an example process 1600 for real-time pipeline leak detection with advanced measurement classification and decision making, according to some embodiments.

The real-time pipeline leak detection can include collecting pipeline measurement data and performing signal processing (block 1602), creating 3D measurement images for a pipeline anomaly (block 1604), identifying pressure surges from other anomalies with a CNN at each sensor site (block 1606), transferring pressure surge information (e.g., timestamp, value of a pressure drop, a sum of the scalogram (SS) of the CWT) and simulation output (e.g., a simulated change of the flow rate (DV) for the given pressure drop and a magnitude of the triggering value (MT) from a simulation output of enhanced filtering) to the cloud site (block 1608), differentiating pipeline leaks from other pressure surges using an ANFIS model at the cloud site (block 1610), issuing a verified pipeline leak alarm and determining leak location (block 1612).

In some embodiments, off-line data post-processing, both measurement image classification and ANFIS decision making, can be performed. In some embodiments, simulated pipeline leaks can be in the pipeline measurement classification and decision making. In some embodiments, real-world leak examples can be integrated into the pipeline measurement classification and decision making. In some embodiments, pressure surges associated with routine operations can be used in pipeline measurement classification and decision making. In some embodiments, measurement details of use of the pumps, compressors, and control valves of routine operation can also be used in pipeline measurement classification and decision making.

Alternative ANFIS Model Embodiments

Figure 17:
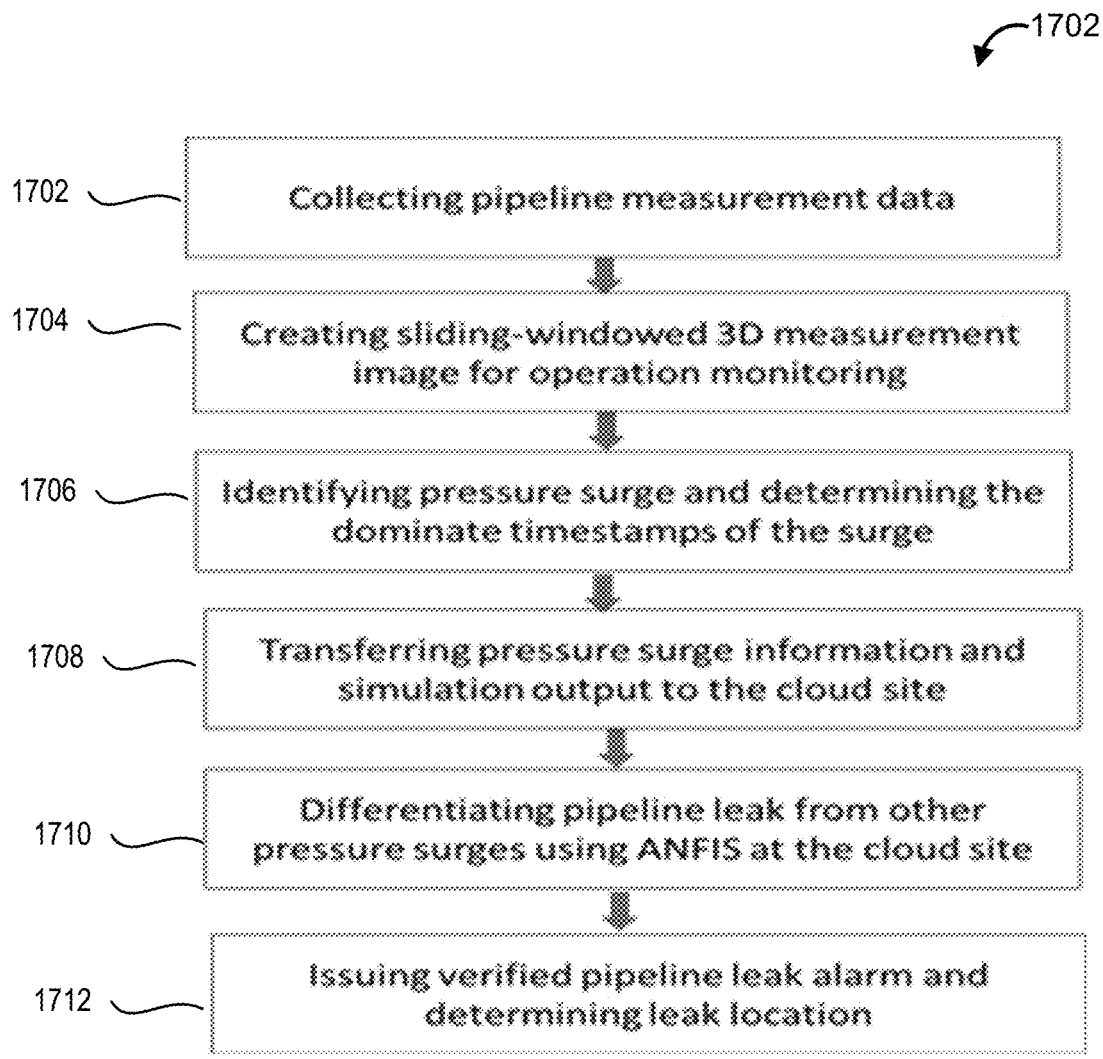
FIG. 17 illustrates an alternative example process for real-time pipeline leak detection with advanced measurement classification and decision making, according to some embodiments.

FIG. 17 illustrates an alternative example process 1700 for real-time pipeline leak detection with advanced measurement classification and decision making, according to some embodiments.

The process 1700 includes collecting pipeline measurement data (block X02), creating sliding-windowed 3D measurement images for operation monitoring (block 1704), identifying pressure surge and determining the dominant timestamps of the surge (1706), transferring pressure surge information and simulation output to the cloud site (1708), differentiating pipeline leaks from other pressure surges using an ANFIS model at the cloud site (1710), and issuing a verified pipeline leak alarm and determining the leak location (1712).

In some embodiments, pipeline data can be screened with pre-determined signal processing and transformation algorithms to search for anomaly signatures before the CNN pattern recognition may be applied to minimize the computation load of field application. In alternate embodiments, the application workflow can be implemented by applying CNN screening first, followed by a determination of dominate timestamp and frequency once a pressure surge may be verified. Since pressure surge signals can be characterized with higher energy, the dominate timestamp and frequency can be determined by locating the maximum absolute value of the CWT scalogram for the given windowed inputs.

Process 1700 may require that the CNN training sets include the raw measurement images. In some embodiments, CNNs can be retrained with a combination of image inputs from both raw and filtered measurement data. The retrained CNNs then can balance the pipeline data conditions and adapt to variation in the testing images. The diversity of pipeline measurement images can be improved by generating training images created from inputs of different signal processing algorithms.

Deep learning may require diverse images for training a CNN. In some embodiments, for supervised training, variable images can be assigned from raw and filtered data as the CNN inputs for each class and assigns them the same class label for the CNN outputs. Then CNN can learn underlying functions between variable image inputs and outputs. Identifying the same class of objects from different inputs can be a way to train the CNN in pattern recognition to, for example, make it more universal.

Figure 18:
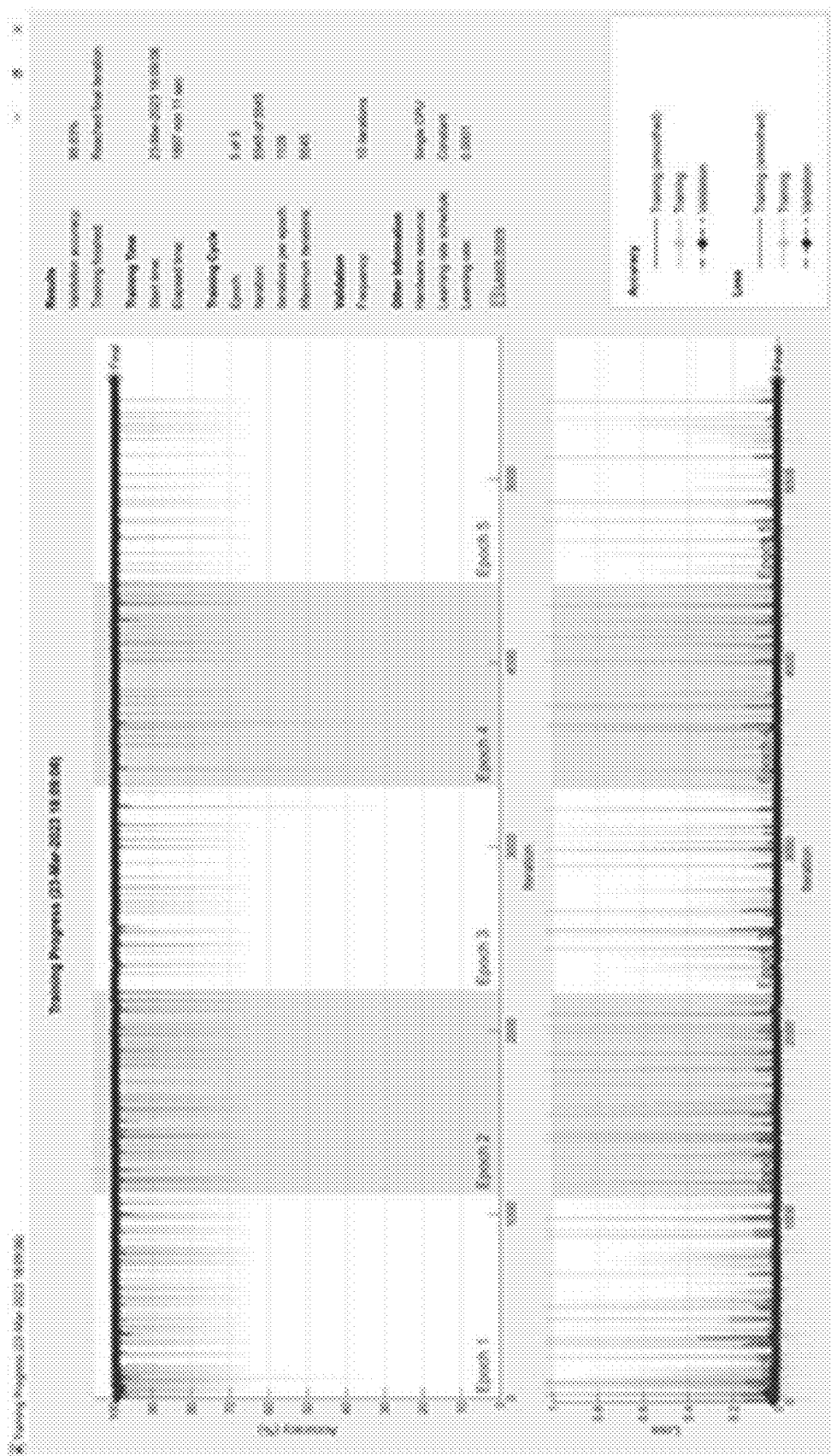
FIG. 18 illustrates an example retraining with transfer learning carried out by adding new images generated from applying moving average filtering to the existing image database, according to some embodiments.

FIG. 18 illustrates an example retraining with transfer learning carried out by adding new images generated from applying moving average filtering to the existing image database, according to some embodiments.

In the example shown in FIG. 18, retraining was initiated with the CNN model built from the first transfer learning which retrained GoogleNet using about 14,000 pipeline measurement images from the raw and enhanced filtering. In the second transfer learning, the retraining was initiated with high validation accuracy. The number of images used during the second retraining was about 21,000 in total with new images from moving-averaged data inputs. In some embodiments, transfer learning can be initiated from the latest CNN models to integrate measurement images from various pipelines running different fluids, and build universal CNNs from an expanded pipeline image database. In some embodiments, the image database can include other measurement images, such as Acoustic Emission images, for more general pipeline anomaly recognition in addition to pressure measurement images.

In some embodiments, ANFIS model inputs can be adjusted at the cloud site for consistent decision making with available pipeline measurements and simulation outputs. In some embodiments, ANFIS models can be substituted with conventional multilayer feedforward neural networks to perform similar functionality. In some embodiments, other neural networks or evolutionary optimization can be used in place of ANFIS fuzzy logic. ANFIS models may be preferable because of their ability to model nonlinear systems by interpolating multiple linear models.

Figure 19:
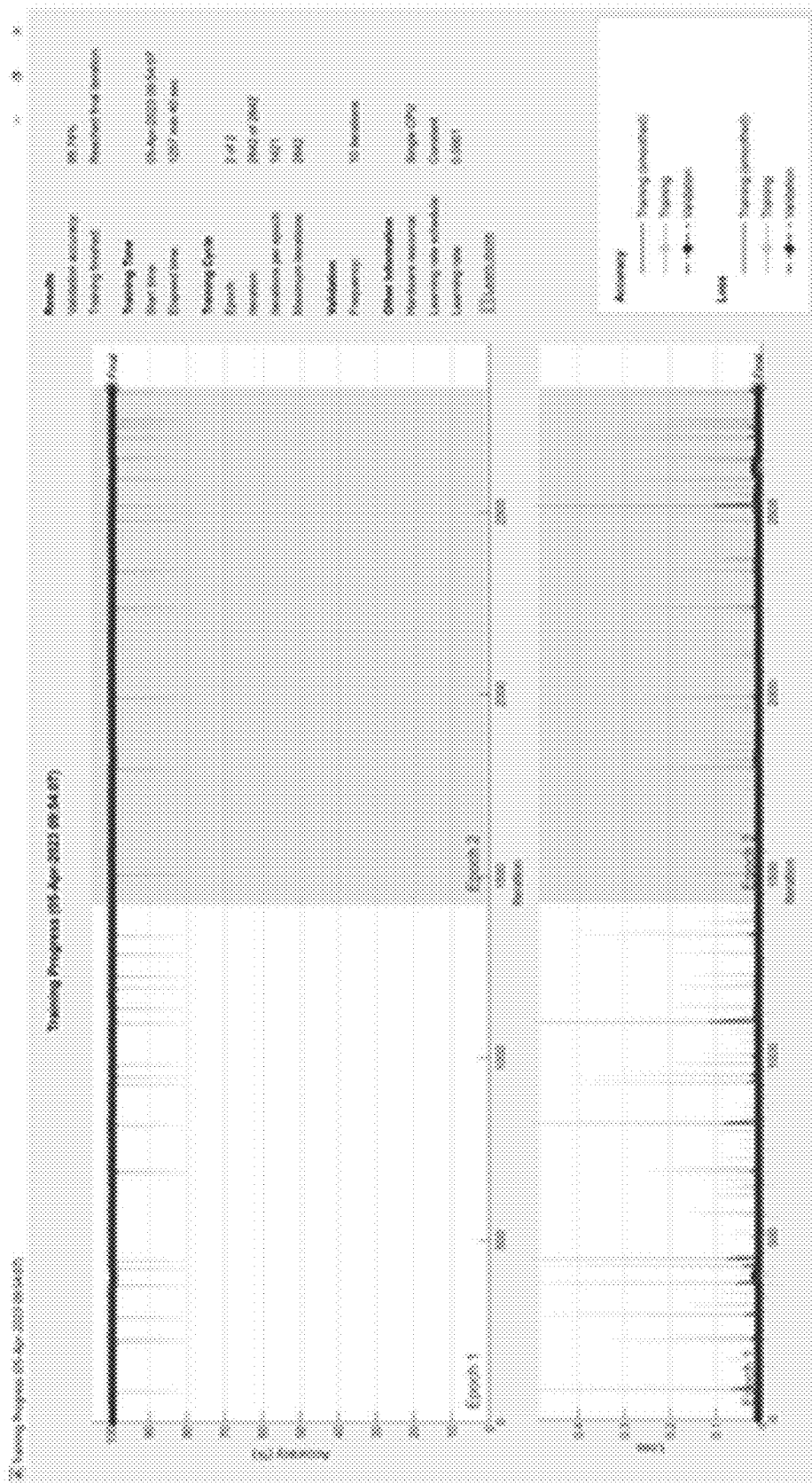
FIG. 19 illustrates CNN training and validation based on a combination of pipeline pressure measurement images of liquefied propane, natural gas, and water, according to some embodiments.

FIG. 19 illustrates CNN training and validation based on a combination of pipeline pressure measurement images of liquefied propane, natural gas, and water, according to some embodiments.

FIG. 19 shows that the CNN can be trained with images created from different fluids using different filtering algorithms through multi-step transfer learning.

In some embodiments, CWT images can be created based on enhanced filtering outputs, moving-average filtering outputs, and raw pressure measurement data to improve the diversity of training examples and to adapt different signal processing algorithms. About 27,000 images were used for training and more than 5000 images of those images were used for validation.

In some embodiments, it may be feasible to build a universal CNN model at the sensor site to classify pipeline pressure measurement images generated from different types of fluids. In some embodiments, the pressure range of data input can be from 550 to 2500 (psi), and density range can be from 0.1 to 1.0 (g/cc). The original training using LPG data inputs can be initiated from, for example, the GoogleNet prototype through transfer learning. Transfer learning may also be applied to the new training with other combinational data inputs. The new training can be initiated from the earlier retrained CNN, requiring only limited additional retraining. Training accuracy of CNN classification can be 100%, and the validation accuracy can be 99.74%. The CNN model built on current pipeline fluids may be capable of accurately differentiating pressure surges from other anomalies and operation data for the pipelines transferring the same types of fluids. For other pipeline fluids, higher viscosity oil for example, some CNN model would may still be applicable, or may only require minor retraining adjustment.

Example Embodiment of a System Using Statistic Forecasting Error Screening to Identify Leak Alarms and CNN to Validate Leak Alarms In another aspect, embodiments described herein combine signal processing, statistics and machine learning to provide enhanced pressure wave analysis and improve pipeline leak (and other pipeline anomaly) detection. In another aspect, embodiments described herein make use of transfer learning from convolutional neural networks used to identify images to detect leaks (and other pipeline anomalies) in signal data.

In some embodiments, multiple numerical filters can be selected through time and frequency analysis to convert raw pipeline pressure signals into a near-Gaussian distributed and SNR-enhanced time series. The leak detection can be implemented with a data screening procedure by using a computation-efficient two-point statistic method. The procedure can start with initialization of data statistics using the first seconds of data. After that, the statistics can be updated when a new measurement point is received, and prediction of the new data point can also be performed using a batch of fast calculations. In this method, leak detection can be treated as a special case of anomaly detection and a leak check can trigger (e.g., for further evaluation) when a forecast error at the given time instant is extremely high. A dynamic threshold, which can optionally be set to about 4 to 8 times of instantaneous standard deviation of forecasting error, can be set to trigger the leak check. In some embodiments, the validation of a leak signature can be implemented with a CNN, taking relevant time-frequency representations of filtered pressure waves as image inputs. Alternatively, the CNN trained with pipeline calibration, testing, and operation data can be implemented for standalone application, taking image inputs transformed from raw pressure waves for automated filtering, pattern recognition, leak detection, and classification without extra signal processing.

The leak threshold setting can be dependent on the pipeline configuration and fluid type (e.g., type of gas or type of liquid). Embodiments described herein can adapt the dynamic leak signature based on the forecasting error distribution which might be less case-sensitive and more statistically interpretable. Embodiments described herein may improve products or services or delivery with lower false negative and false alarm rates, and/or maximize asset value for users.

The following discussion is primarily in the context of detecting leak. However, the systems, methods, and devices described herein may also be applicable to detecting other pipeline anomalies (e.g., pipeline blockages).

The following discussion is directed to a non-limiting exemplary embodiment of the systems and methods described herein. In particular, the following discussion focuses on a system and method that use statistic forecasting error screening to identify possible leaks and CNNs to validate the leak alarms. These leak detection studies are conducted on a 500 feet long water loop. The leak tests are simulated under supervisory control without any other pressure surges. All sudden pressure drops detected at the sensor sites are induced by the simulated leaks.

Figure 20:
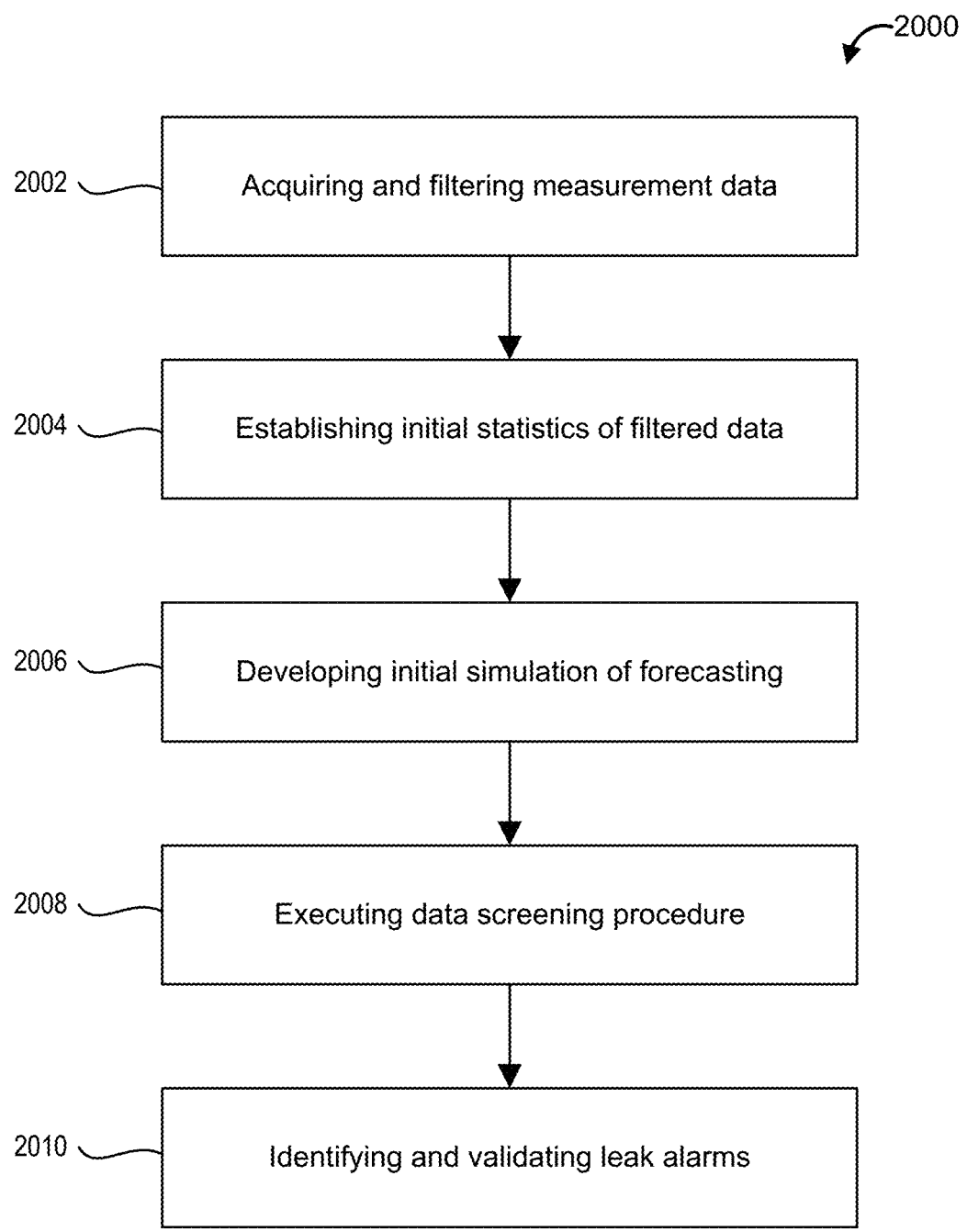
FIG. 20 illustrates a process diagram for a method of statistic forecasting error screening in assisting with pipeline leak detection, according to some embodiments.

FIG. 20 illustrates a process diagram for a method 2000 of statistic forecasting error screening in assisting with pipeline leak detection, according to some embodiments.

The procedure 2000 for statistic forecasting error screening in assisting with pipeline leak detection, according to some embodiments, in FIG. 20 can involve different operations. At block 2002, the process applies filtering technologies to extract feature information from measurement data. At block 2004, the process initializes statistical variables on a small starting data set. At block 2006, an initial simulation for forecasting is developed based on a second small starting data set. At block 2008, the process executes complete real-time screening to monitor statistical forecasting error of filtered operation data. In some embodiments, at block 2010, the process optionally receives leak alarms and time-frequency presentation of related data, validates leak signatures and classifies the leak type with CNNs trained using deep learning algorithms. The operations at block 2010 can also be applied as a standalone anomaly (e.g., leak) detection solution.

Step 2002: Acquiring and Filtering Measurement Data

Many statistical methods demand Gaussian or normal distributed data to meet assumptions that support the theories and applications. The mixed pressure signals in pipelines with leak rarefaction wave, pump noise, operation fluctuation and other background interference are not necessarily Gaussian distributed. However, focusing on the primary feature frequency components of typical pipeline systems, embodiments described herein can generate filtered signals that are Near-Gaussian distributed.

Figure 21:
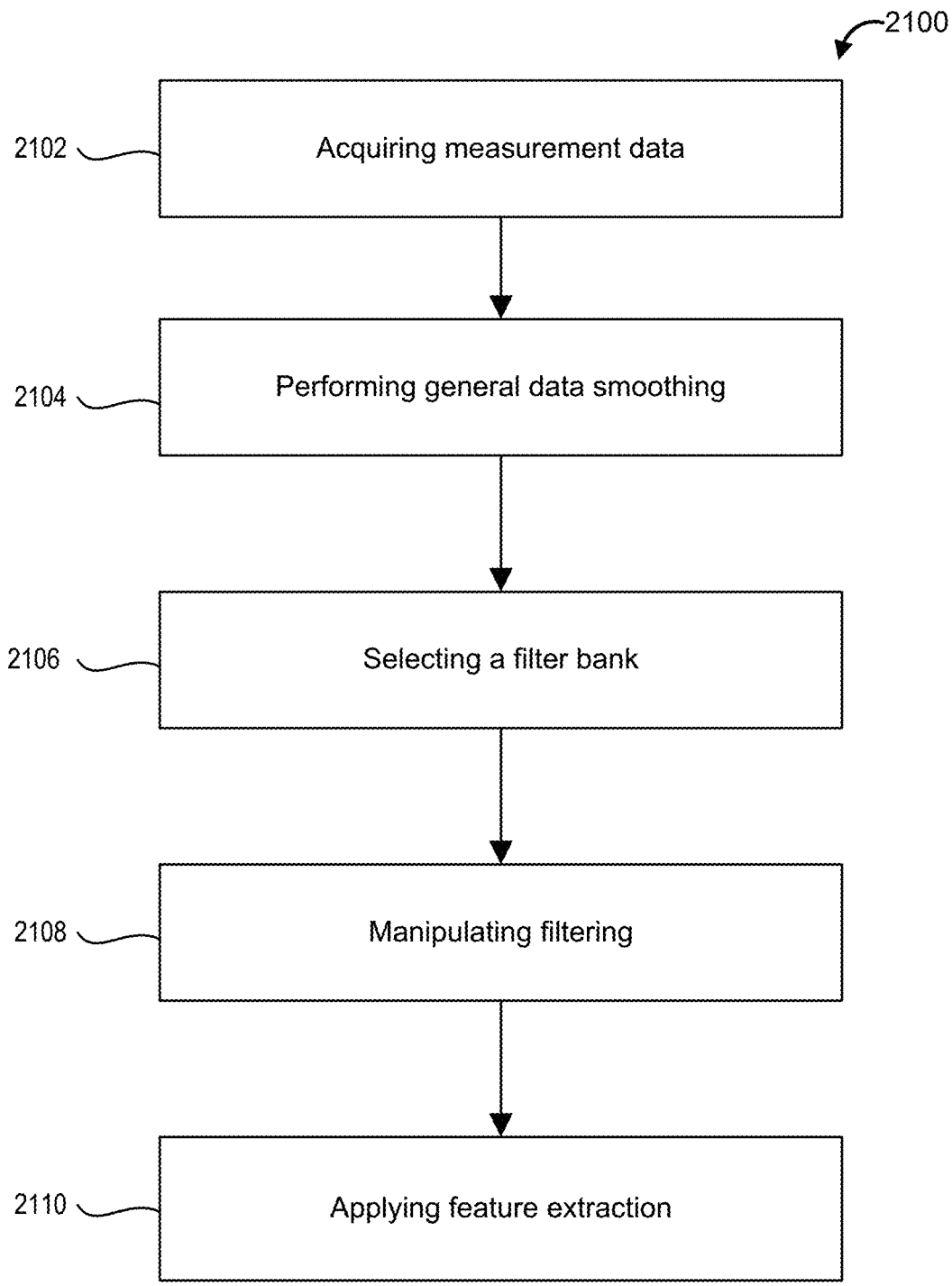
FIG. 21 illustrates a flow chart diagram of a process for signal processing applicable to pipeline leak detection, according to some embodiments.

FIG. 21 illustrates a flow chart diagram of a process 2100 for signal processing applicable to pipeline leak detection, according to some embodiments.

At block 2102, the measurement data is acquired. At block 2104, the process performs general data smoothing, which may include moving average filtering of measurement data to remove high frequency components. At block 2106, the process selects a filter bank, which can depend on what frequency components are to be kept, including using low-pass filters, exponential filters, band-pass filters, high-pass filters and combinations of the above. For example, for fixed applications, a hardware or circuit-based filtering device can be implemented based on system time and frequency analysis. Alternatively, for general applications, soft or numerical filters can be applied to achieve the functionality desired. At block 2108, the process manipulates filtering, which can involve determining which filter would apply first or the order of performing a bank of filtering. It can also specify what data (e.g., raw data or previously filtered data) a particular filter would apply and if any additional mathematical manipulation is needed. At block 2110, the feature data set can be extracted from the raw data set. The transformed data are characterized with improved SNR, exhibiting distinguishable signatures, and making leak or anomaly detection more convenient.

In some embodiments, parameters associated with blocks 2104 through 2110 can be determined using an evolutionary optimization procedure such as a genetic algorithm (GA) as described in greater detail below. These parameters can be determined offline during, for example, a training phase and applied to the system during operation.

Step 2004: Establishing Initial Statistics of Filtered Data

Initial statistics can be based on the first second(s) of filtered data, including calculation of the mean, variance and autocorrelation of that data set using standard statistical equations:

$$M = \frac{1}{n}\sum_{i=1}^{n} X_i \qquad (1)$$

$$V = \frac{1}{n}\sum_{i=1}^{n} (X_i - M)^2 \qquad (2)$$

$$C_n^k = \frac{\sum_{i=1}^{n-k}(X_i - M)(X_{i+k} - M)}{\sum_{i=1}^{n}(X_i - M)^2} \qquad (3)$$

where M can be the mean of the data, n can be the number of samples, and lag k=1 can be for neighbor point correlation. Assuming the initial data set has, for example, a range of (e.g., 1000) data points (note that this will be only the first second of data if the data sampling frequency is 1000 Hz), initial autocorrelation coefficient will be:

$$C_{1000} = \frac{\sum_{i=1}^{999}(X_i - M)(X_{i+1} - M)}{\sum_{i=1}^{1000}(X_i - M)^2} \qquad (4)$$

Step 2006: Developing Initial Statistics of Forecasting Error

Continuing with the above example, the next range of (e.g., 1000) data points (from i=1001 to 2000 for example, or any other predefined second initialization data set) can be used to initialize statistics of forecasting error of the filtered signals. In this step, the computationally efficient two-point statistics can be used to update instantaneous mean, variance, and autocorrelation as described in Eq. (5), (6) and (7), and calculate the forecasting error of each data point:

$$M_i = 1/N((N-1)M_{i-1} + X_i) \qquad (5)$$

$$V_i = \frac{1}{N}\left((N-1)V_{i-1} + (X_i - M_i)^2\right) \qquad (6)$$

$$C_i = 1/N\left[(N-1)C_{i-1} + \frac{(X_i - M_i)(X_{i-1} - M_{i-1})}{\sqrt{V_i V_{i-1}}}\right] \qquad (7)$$

Starting with i=1001, the previous mean $M_{1000}$, variance $V_{1000}$ and autocorrelation $C_{1000}$ can be calculated from the first initial data set, and calculation of $M_{1001}$, $V_{1001}$ and $C_{1001}$ only requires two-point information based on the Eqs. (5)-(7). After $M_{1001}$ and $C_{1001}$ can be updated, then data forecast $F_{1001}$ is simulated and forecasting error $E_{1001}$ can be determined using the Eq (8) and Eq (9):

$$F_i = X_{i-1}C_i + (1-C_i)M_i \qquad (8)$$

$$E_i = X_i - F_i \qquad (9)$$

For the second initialization data set, the mean forecasting error, initialized as EM, can be averaged from $E_{1001}$ to $E_{2000}$, and the variance EV can be calculated with Eq. (10) and Eq. (11):

$$EM = \frac{1}{n}\sum_{i=1}^{n} E_i \qquad (10)$$

$$EV = \frac{1}{n}\sum_{i=1}^{n} (E_i - EM)^2 \qquad (11)$$

EM can be denoted as $EM_{2000}$ and EV can be denoted as $EV_{2000}$ at the end of the second initialization. These values can also be used as initial values of the next step for two-point statistical update on formal operation data.

Step 2008: Executing Data Screening Procedure

The formal data screening can begin after the basic statistics are initialized from the two small starting data sets above. To monitor the statistical forecasting error of new data point, Eqs. (5) to (9) can be executed first, followed by Eq. (12) and Eq. (13) as expressed below:

$$EM_i = 1/N((N-1)EM_{i-1} + E_i) \qquad (12)$$

$$EV_i = \frac{1}{N}\left((N-1)EV_{i-1} + (E_i - EM_i)^2\right) \qquad (13)$$

It can be observed that Eqs. (12) and (13) may be formulated similar to Eqs. (5) and (6) with variable M and V (mean and variance of the filtered data) substituted by variable EM and EV (mean and variance of the forecasting error). The capital N in these equations can be a memory size set to meet the statistical assumption, which is autocorrelation $C_i$ dependent. For high sampling frequency, 1000 Hz for example, $C_i$ can be very high and close to a constant, and N can be set to 22900. Otherwise N=100 log(0.1)/log($C_i$). The threshold for anomaly detection can be set based on forecasting error and its corresponding standard deviation in Eq. (14).

$$|X_i - F_i| > L\sqrt{EV_i} \qquad (14)$$

Assuming normal distribution of the forecasting error, the discrimination level L may typically range from 4 to 8 from the test loop data and field calibration and operation data.

Figure 22:
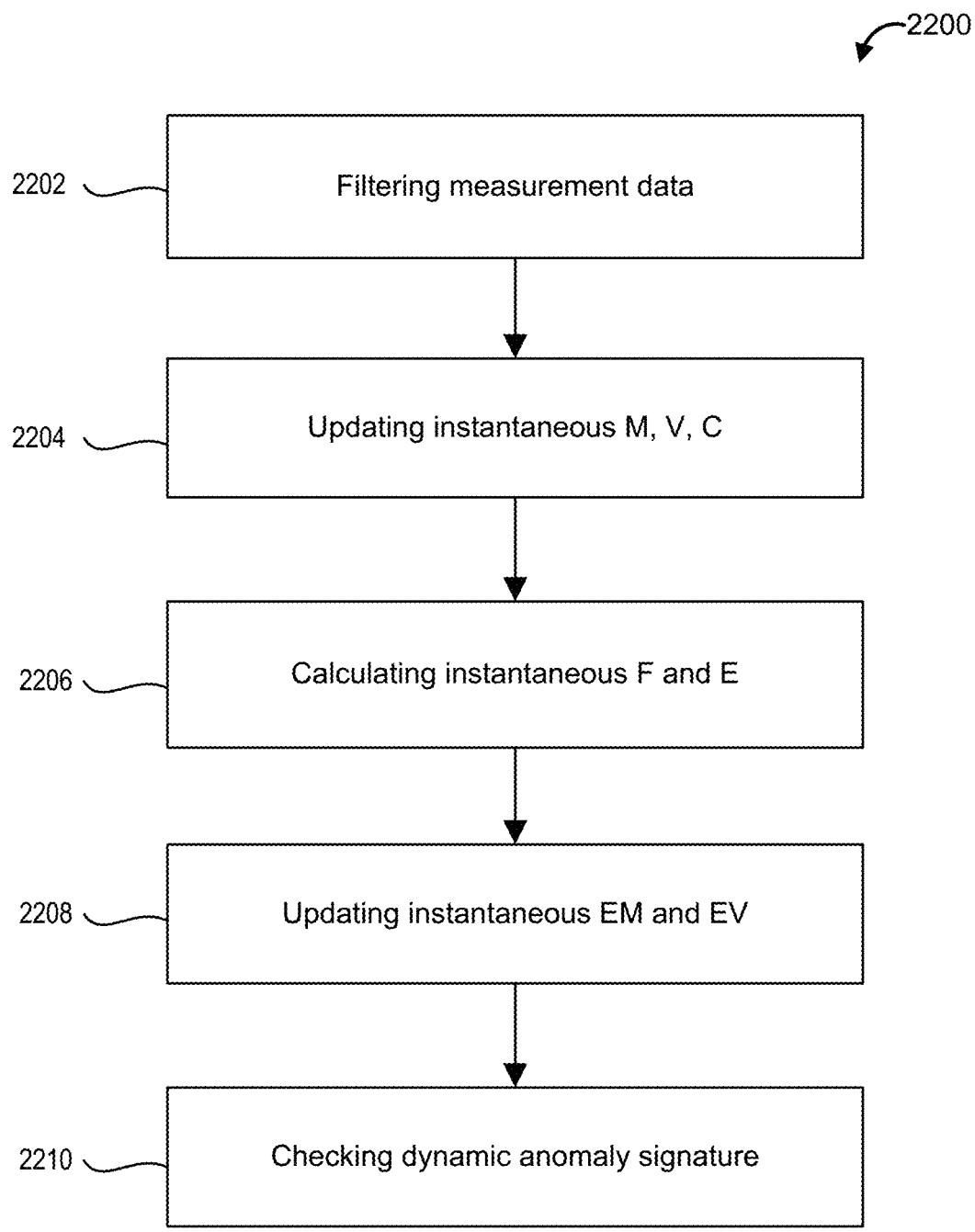
FIG. 22 illustrates a process flow of operations used in the screening execution block, according to some embodiments.

FIG. 22 illustrates a process flow 2200 of operations used in the screening execution block, according to some embodiments.

At block 2202, the measurement data can be filtered. At block 2204, instantaneous M, V, and C can be updated. At block 2206, the instantaneous F and E can be computed. At block 2208, the instantaneous EM and EV can be updated. At block 2210, the dynamic anomaly signature can be updated.

The process can repeat for each new data point. Variations in parameters for the internal test loop experiment follow.

Figure 23:
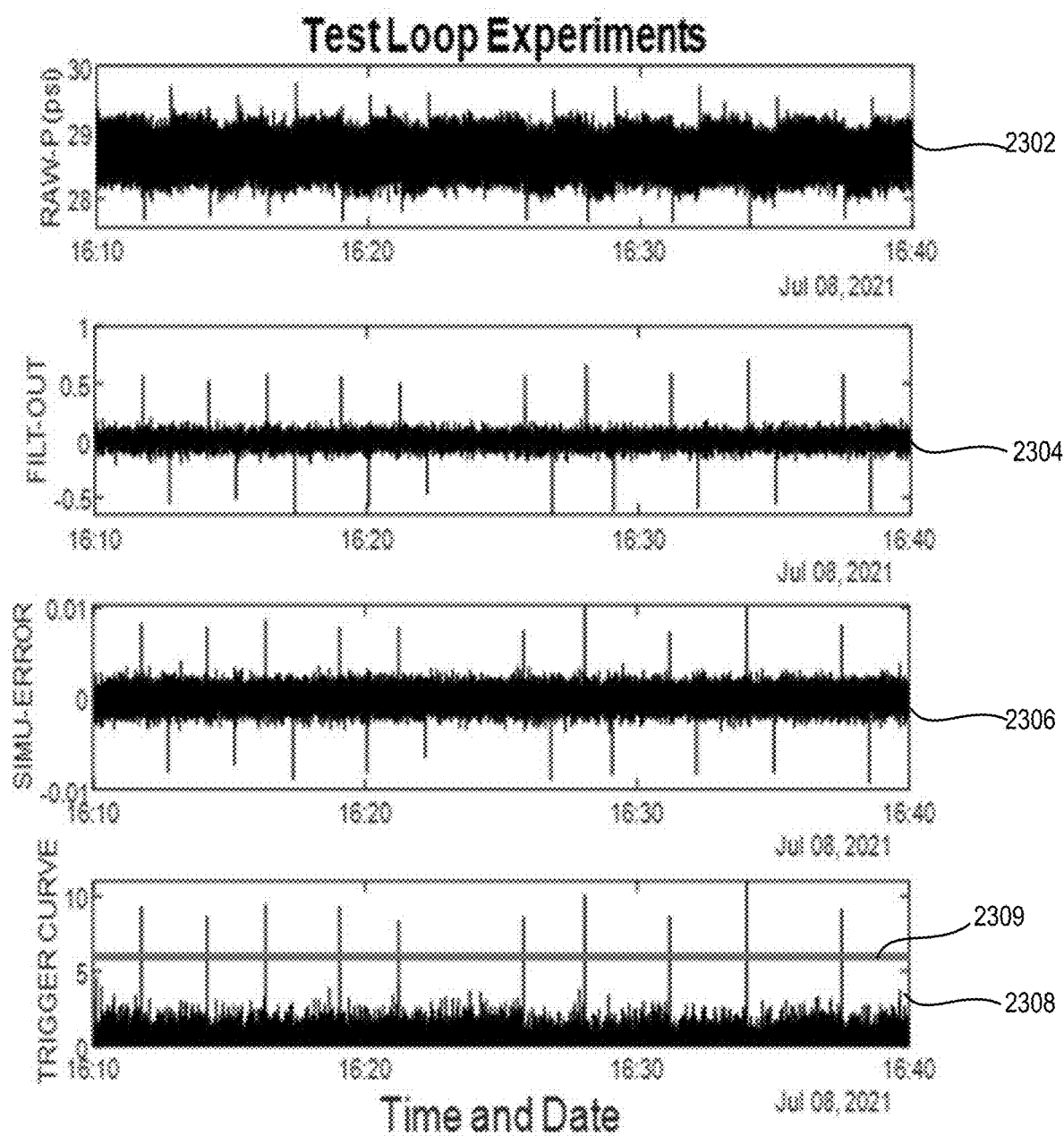
FIG. 23 illustrates a set of plots from an internal test loop example, according to some embodiments.

FIG. 23 illustrates a set of plots from an internal test loop example, according to some embodiments. These are experiments only and do not limit the embodiments described herein.

Raw-P (2302) are exemplary raw pressure measurements collected from sequential valve opening and closing operations over 30 minutes. A visible pressure drop can typically be accompanied by the valve opening to emulate a leak event. A pressure jump can be followed by closing of the valve to restore the normal operation conditions. Under a noisy environment, the leak signature may not be obvious, requiring additional signal processing to improve SNR. FILT-OUT (2304) shows the exemplary data through preselected filtering processes. The filtering processes might be case-dependent, including use of low-pass, high-pass and band-pass filters or a combination of the above through various mathematic manipulations to extract feature-embedded time series. SIMU-ERROR (2306) presents exemplary forecasting error (Eq. (9)) following a statistical data screening procedure. Forecasting errors can include both positive and negative values, but only the positive peaks may be related to the leak signatures as shown on the trigger curve (2308). The value on the trigger curve can be the calculated ratio of the forecasting error over its standard deviation (refer to Eq. (14)). Note that all parameters in FIG. 23 can vary over the time. The leak discrimination on the trigger curve (line 2309) can also be checked instantaneously during data screening. In this example, ⅛" orifice may be used with 1000 Hz sampling frequency, and the discrimination level (threshold) may be set to 6. It has been demonstrated from different internal loop tests and field tests that the threshold based on the ratio of forecasting error of the data screening over its standard deviation can be less sensitive to the pipeline configuration, sensor installation and operation conditions.

Figure 24:
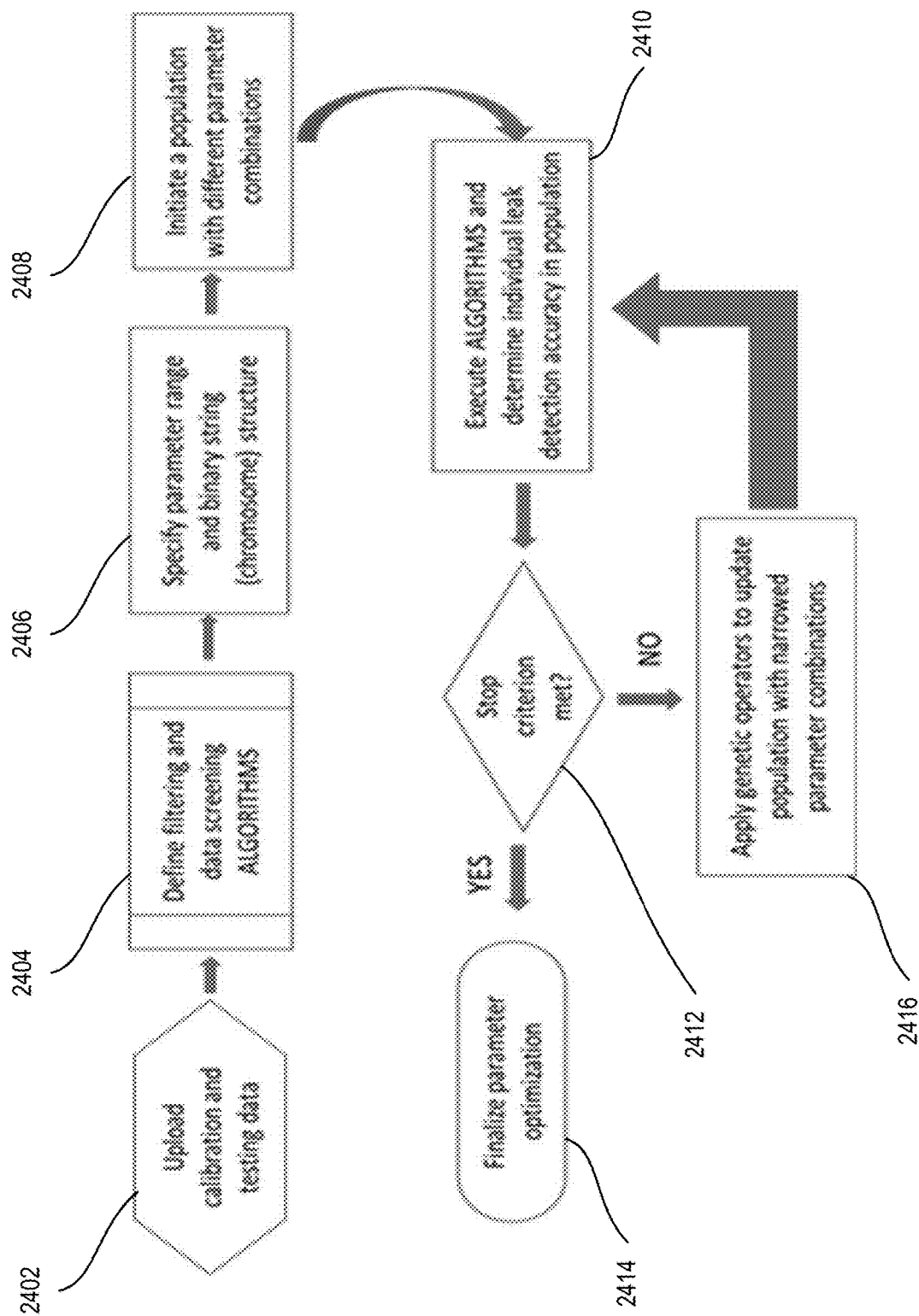
FIG. 24 illustrates a flowchart for an evolutionary computation based optimization procedure with use of the genetic algorithm (GA), according to some embodiments.

FIG. 24 illustrates a flowchart for an evolutionary computation based optimization procedure with use of the genetic algorithm (GA), according to some embodiments.

GA is a stochastic global search engine that mimics the metaphor of natural biologic evolution. As a computational intelligent method, GA operates on a population of potential solutions applying the principle of survival of the fittest to produce improved solutions through multiple generations. Individuals in the population can be coded in binary strings with each parameter under optimization represented by an adequate number of bits, reflecting the level of accuracy or range of the individual decision variables. The combination of the parameters to be optimized is then structured as chromosome for each potential solution, and the length of the chromosome string depends on the number of parameters and the associated accuracy specification. At each generation, the fitness of each individual can be evaluated based on the user-defined objective function, and an updated population of solutions can be created by using genetic operators such as ranking, selection, crossover and mutation. This evolutionary computation approach can eliminate the need to calculate the first derivative and/or the second derivative (as done in some optimization methods) and is suitable to solve complex optimization problems.

In an example embodiment, calibration and testing data can be uploaded into the system at block 2402. Then filtering and data screening algorithms can be defined at block 2404. These filtering and data screening algorithms can include parameters that will be optimized by the genetic algorithm. Parameter range and binary string (chromosome) structure may then be specified at block 2406. The chromosomes represent the parameters that can be optimized by the genetic algorithm. A population with different parameter combinations may then be initiated at block 2408. The method is intended to simulate natural selection and as such the system starts with a diverse population to see which members of the population will do better at the task (and consequently contribute to the genetics of the next round of simulation). Processes or code instructions are executed at block 2410 to determine individual leak detection accuracy in population. This step allows the individuals within the population to simulate the training task to determine which are more or less accurate. At block 2412, the stop criterion can be queried. The stop criterion can, for example, be a minimum accuracy by individuals in the population. If the stop criterion is met, then parameter optimization is finalized at block 2414. If the stop criterion is not met then genetic operators can be applied to update the population to narrow parameter combinations at block 2416 and the population undergoes algorithm execution to determine individual leak detection accuracy in the population again at block 2410.

Stop criterion can also be, for example, a number of iterations or generations. GA can generate ranked solutions and the populations of updated parameter combinations though evolutionary computation can converge to a narrow but optimized range at the end of the searching process.

As one of the embodiments, leak threshold setting can also be optimized together with filtering parameters using GA to minimize false positives and false alarms of calibration and testing data. In applications described herein, the basic parameters to be optimized may include moving-average window size in data preprocessing, the cut-off frequency of each numeric filter, and the discrimination level (threshold) to trigger the leak signature.

The foregoing discussion described some methods, systems, and devices. The following are some non-limiting example implementations of the methods, systems, and devices described thus far.

Figure 25:
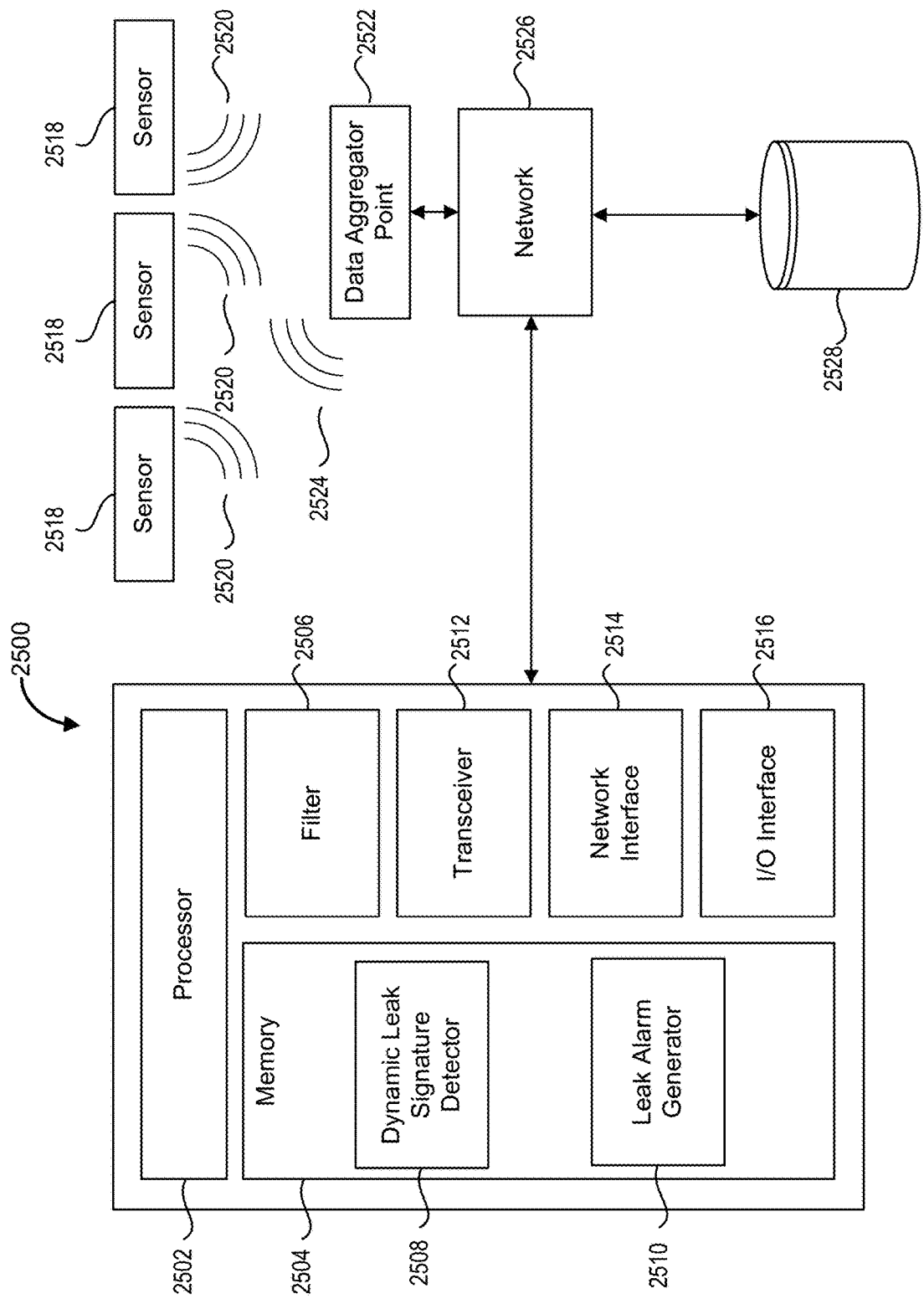
FIG. 25 illustrates a system to detect a leak alarm, according to some embodiments.

FIG. 25 illustrates a system to detect a leak alarm, according to some embodiments. The system includes a computing device 2500, one or more sensors 2518, a data aggregator 2522, a network 2526, and an electronic datastore 2528. Computing device 2500 includes a processor 2502, a memory 2504, a filter 2506, a transceiver 2512, a network interface 2514, and an I/O interface 2516. The memory 2504 includes a dynamic leak signature detector 2508 and a leak alarm generator 2510.

Processor 2502 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 2504 can be configured to store various data utilized by computing device 2500 including, for example, data reflective of filter 2506, dynamic signature detector 2508, or leak alarm generator 2510. Memory 2504 may also store training data, model parameters, variables, hyperparameters, and the like. Memory 2504 may implement a relational or object-oriented database, such as Microsoft SQL Server, Oracle, DB2, Sybase, Pervasive, MongoDB, NoSQL, or the like. Memory 2504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Filter 2506 can optionally be used to filter data received from the sensor(s) 2518. The filtering may include, for example, using time and frequency analysis to select the filters using a primary frequency range of the pipeline measurement. The filtering may include data smoothing, selecting a filter bank, manipulating the filtering (e.g., changing order and type of filters, etc.), and applying feature extraction. In some embodiments, filtering is done to produce near-Gaussian or normal distributed data. In some embodiments, filtering parameters can be determined with an evolutionary optimization process.

Dynamic leak signature detector 2508 can calculate the forecast error distribution of the predicted measurement data, compute and compare a ratio signature against the leak threshold. This forecast can be used to determine where a point of data falls outside the expected statistics for the system. In some embodiments, using a dynamic leak signature can make the leak detection more robust and indiscriminate to pipeline configuration. In some embodiments, the dynamic leak signature detector can be configured to detect other pipeline anomalies.

In some embodiments, the forecasting-error-based analysis may be more consistent and less sensitive to the pipeline configuration, operating condition, and sensor positions, compared to other methods.

The dynamic leak signature detector 2508 can involve the processor 2502 coupled to a non-transitory memory 2504 storing instructions that can be executed by the processor 2502 to implement operations described herein.

Leak alarm generator 2510 generates a leak alarm based on filtered measurements from the pipeline and the dynamic leak signature detector 2508. Leak alarm generator 2510 can indicate when the measured data falls outside the expected statistics for the pipeline. In some embodiments, leak alarm generator 2510 can track leak location, size, or timestamp. In some embodiments, the leak alarm generator 2510 can generate alarms for anomalies (e.g., a leak).

Leak alarm generator 2510 can also be integrated with the computing device 2500, or may be a standalone device (e.g. with a hardware processor and memory) connected to different components by, for example, network interface 2514, a connection, or a communication channel.

Transceiver 2512 can be used to transmit the leak alarm data to another computing device. For example, transceiver 2512 may send the leak alarm to a computing device with an interface for a user to indicate to the user that there is a (potential) leak detected. Alternatively, transceiver 2512 may send the leak alarm to an external datastore to store data relating to the leak alarm. Transceiver 2512 may also send and receive other information between computing device 2500 and other components (e.g., pipeline measurements from sensor(s) 2518). In some embodiments, the system may send the leak alarm with leak alarm data to a cloud site for further confirmation, for example, with information from sensors 2518. This may be done to further validate the existence of a leak, for example, by using information from two or more sensor sites, to reduce the number of false alarms.

In some embodiments, transceiver 2512 can use cellular, satellite, or local Ethernet methods of sending and receiving information. Systems, methods, and devices described herein can be compatible with all cloud-based platforms, such as IoT, remote control of leak testing, and data storage.

Network interface 2514 enables computing device 2500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 2516 enables computing device 2500 to interconnect with one or more input devices, such as a keyboard, mouse, camera, touch screen and a microphone, or with one or more output devices such as a display screen and a speaker. When I/O interface 2516 is interconnected to a display screen, it may be referred to as a display interface.

Sensor(s) 2518 can be a pipeline sensors capable of measuring pipeline parameters. In some embodiments sensor(s) 2518 can be pressure sensors, sonic (acoustic) sensors, accelerometer transducers, temperature sensors, fluid density sensors, or flow velocity sensors. Other sensor types are also possible. Sensor(s) 2518 may also include a plurality of sensors which may or may not be the same type of sensor.

Sensor(s) 2518 can provide pipeline measurements to computing device 2500. In an example embodiment, sensor(s) 2518 can communicate with data aggregator point 2522 using sensor transmission signal(s) 2520 and data aggregator point signal 2524.

Data aggregator point 2522 can aggregate the data from sensor(s) 2518 and transmit the pipeline measurements through network 2526 to computing device 2500. Other aggregation method are also conceived. For example, some processing may be carried out by sensor 2518.

Network 2526 can enable components of the system to communicate with one another such as computing device 2500, data aggregator point 2522, and electronic data store 2528.

Electronic datastore 2528 can be configured to store various data utilized by computing device 2500 including, for example, data reflective of filter 2506, dynamic leak signature detector 2508, or leak alarm generator 2510. Electronic datastore 2528 may also store training data, model parameters, variables, hyperparameters, and the like. Electronic datastore 2528 may implement a relational or object-oriented database, such as Microsoft SQL Server, Oracle, DB2, Sybase, Pervasive, MongoDB, NoSQL, or the like. Electronic datastore 2528 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In accordance with an aspect, there is provided a system for leak or other anomaly detection in a pipeline. The system including at least one pipeline sensor 2518 fluidly connected to the pipeline, a processor 2502, a memory 2504 operatively coupled to the processor 2502, and instructions stored in the memory 2504. The at least one pipeline sensor 2518 is communicatively connected to the processor 2502. The instructions are executable by the processor 2502 to instruct the system to filter pipeline measurement data received from the at least one pipeline sensor 2518 by extracting a feature data set using filter 2506, compute and compare a dynamic ratio signature against the leak threshold based on a forecast error distribution of predicted pipeline measurement data using dynamic leak signature detector 2508, generate a leak alarm using a dynamic leak signature with leak alarm generator 2510, and transmit the leak alarm using transceiver 2512 and/or store the leak alarm using memory 2504 or electronic datastore 2528.

In accordance with a further aspect, the system generates filtered pipeline measurement data using filter 2506 which may include using filters selected by time and frequency analysis covering a primary feature frequency range of the pipeline measurement data to generate near-Gaussian or normal distributed data, and a SNR-enhanced time series.

Pipeline leak signatures may be dominated by the low frequency components. The goal of filtering-based signal processing can be to distinguish the leak signatures from the normal operation data, and isolate the signatures from the background noise. A leak calibration can be run for the given pipeline configuration by opening and closing the valves with specified orifices (leak size) and taking the pressure responses at the sensor spots, therefore, the leak signature is known. After adequate calibration and testing on different systems, data processing algorithms that can be less sensitive to the pipeline configurations and fluid types can be developed.

In accordance with a further aspect, the system filters pipeline measurement data received from the at least one pipeline sensor 2518 by extracting feature information using filter 2506 which may include performing data smoothing, selecting a filter bank, manipulating filtering, and applying feature extraction.

In accordance with a further aspect, the system computes and compares a dynamic ratio signature against the leak threshold to trigger a leak check based on the forecast error distribution of predicted pipeline measurement data using dynamic leak signature detector 2508. This may include establishing initial statistics of the filtered pipeline measurement data at an initial time component, developing an initial simulation of a forecast error, and executing real-time data screening to monitor the forecast error distribution based on new pipeline measurement data set at a subsequent time component.

In accordance with a further aspect, the system establishes the initial statistics of the filtered pipeline measurement data at an initial time component which may include computing mean, variance, and autocorrelation of the filtered pipeline measurement data.

In accordance with a further aspect, the system develops the initial simulation of the forecast error which may include updating the mean, the variance, and the autocorrelation using a simulated data forecast to compute the forecast error.

In accordance with a further aspect, the system executes real-time data screening to monitor the forecast error distribution based on the new pipeline measurement data set at the subsequent time component which may include computing a mean forecasting error and a variance forecasting error.

In accordance with a further aspect, the system establishes the dynamic ratio signature against the leak threshold based on the forecast error distribution of predicted pipeline measurement data using dynamic leak signature detector 2508. The ratio signature may be computed by the forecasting error and the corresponding standard deviation.

In accordance with a further aspect, the system may implement data screening which may include updating instantaneous statistics of the filtered pipeline measurement data based on the new pipeline measurement data set at the subsequent time component, computing instantaneous forecast and forecast errors based on the updated instantaneous statistics, and updating instantaneous mean and variance of the forecast error. The system can determine the dynamic leak signature based on the updated instantaneous mean and variance of the forecast error.

In accordance with a further aspect, the system generates filtered pipeline measurement data which may include using an evolutionary optimization process optimize filter parameter selection and leak signature determination. In some embodiments, the evolutionary optimization process may include a GA. Evolutionary optimization processes may be used to optimize the parameters associated with filter 2506, dynamic leak signature detector 2508, or leak alarm generator 2510. Evolutionary optimization processes may also be used to optimize other system parameters. The optimized parameters may be stored in memory 2504 or electronic datastore 2528. Non-limiting examples of parameters that may be optimized using evolutionary optimization processes include, for example, span of moving average smoothing in data preprocessing, cut-off frequency for each filter selected, and the ratio threshold applicable to the variety of calibration, testing, and operation data.

In accordance with a further aspect, the system generates the filtered pipeline measurement data using filter 2506 which may include smoothing the pipeline measurement data, selecting a filter bank based on the range of primary feature frequencies, manipulating filtering to determine an order of filters of the filter bank applied, and extracting features.

In accordance with a further aspect, parameters used to select the filter bank and manipulate the filtering may be determined using an evolutionary optimization process. These parameters may, for example, be selected by a genetic algorithm.

Figure 26:
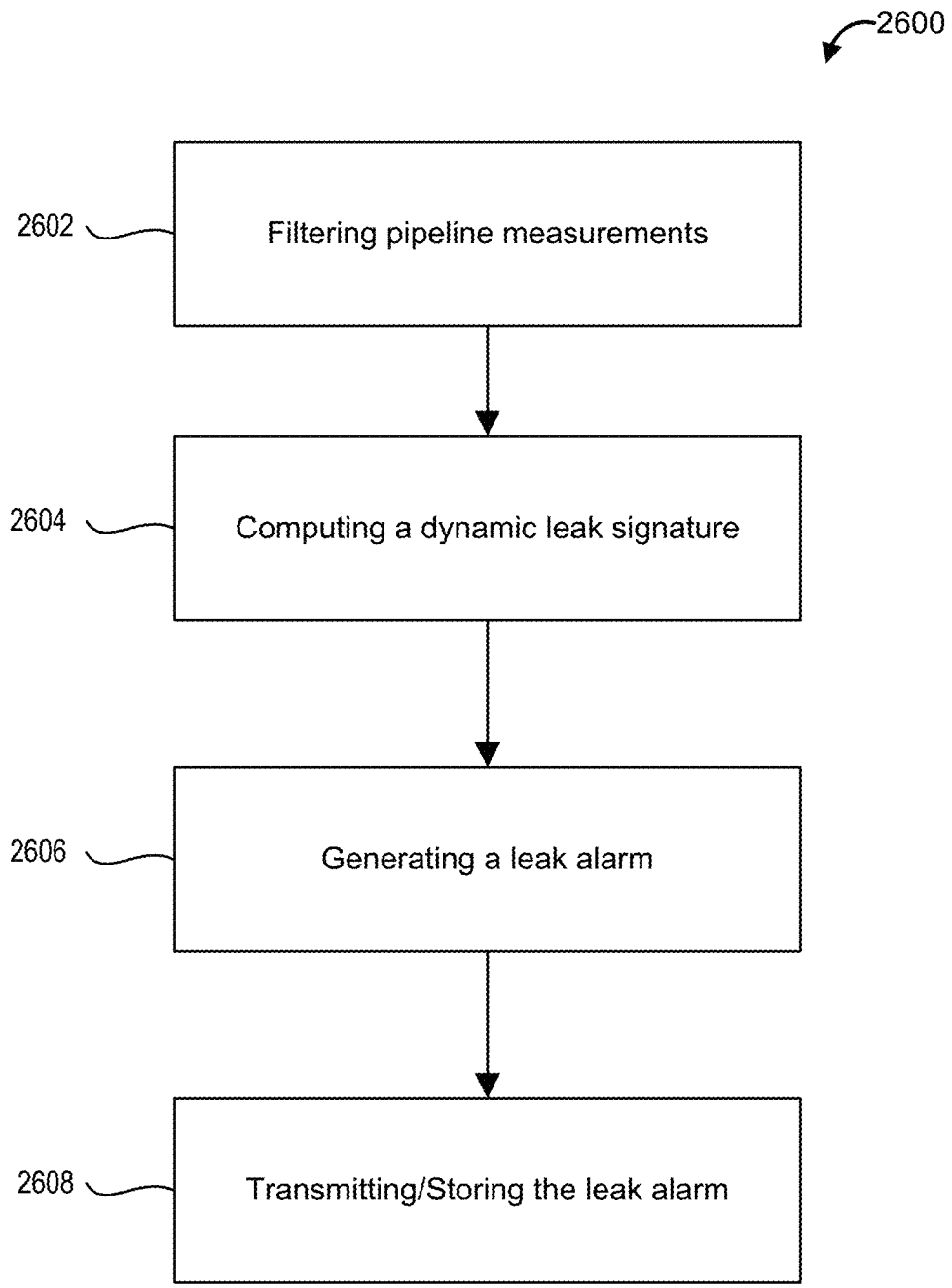
FIG. 26 illustrates a process diagram a method of detecting a leak alarm that can be implemented by the system in FIG. 25, according to some embodiments.

FIG. 26 illustrates a process diagram a method 2600 of detecting a leak alarm that can be implemented by the system in FIG. 25, according to some embodiments.

In accordance with an aspect, there is provided a method 2600 for leak or other anomaly detection in a pipeline. The method 2600 can involve filtering pipeline measurement data received from at least one pipeline sensor fluidly connected to the pipeline by extracting a feature data set (2602), computing and comparing a dynamic ratio signature against the leak threshold based on a forecast error distribution of predicted pipeline measurement data (2604), generating a leak alarm using a dynamic leak signature (2606), and transmitting and/or storing the leak alarm (2608).

In accordance with a further aspect, the method 2600 can involve generating filtered pipeline measurement data (2602) using filters selected by time and frequency analysis covering a primary feature frequency range of the pipeline measurement data to generate near-Gaussian or normal distributed data, and SNR-enhanced time series.

In accordance with a further aspect, the method 2600 can involve filtering pipeline measurement data received from at least one pipeline sensor by extracting feature information (2602) which may include performing data smoothing, selecting a filter bank, manipulating filtering, and applying feature extraction.

In accordance with a further aspect, the method 2600 can involve computing and comparing a dynamic ratio signature against the leak threshold based on the forecast error distribution of predicted pipeline measurement data (2604). This may include establishing initial statistics of the filtered pipeline measurement data at an initial time component, developing an initial simulation of a forecast error, and executing real-time data screening to monitor the forecast error distribution based on new pipeline measurement data set at a subsequent time component.

In accordance with a further aspect, the method 2600 can involve establishing the initial statistics of the filtered pipeline measurement data at an initial time component which may include computing mean, variance, and autocorrelation of the filtered pipeline measurement data.

In accordance with a further aspect, the method 2600 can involve developing the initial simulation of the forecast error which may include updating the mean, the variance, and the autocorrelation using a simulated data forecast to compute the forecast error.

In accordance with a further aspect, the method 2600 can involve executing real-time data screening to monitor the forecast error distribution based on the new pipeline measurement data set at the subsequent time component which may include computing a mean forecasting error and a variance forecasting error.

In accordance with a further aspect, the method 2600 can involve computing and comparing the dynamic ratio signature against the leak threshold based on the forecast error distribution of predicted pipeline measurement data (2604) which may be computed by the forecasting error and the corresponding standard deviation.

In accordance with a further aspect, the method 2600 can involve data screening which may include updating instantaneous statistics of the filtered pipeline measurement data based on the new pipeline measurement data set at the subsequent time component, computing instantaneous forecast and forecast errors based on the updated instantaneous statistics, updating instantaneous mean and variance of the forecast error, and determining the dynamic leak signature based on the updated instantaneous mean and variance of the forecast error.

In accordance with a further aspect, the method 2600 can involve generating filtered pipeline measurement data (2602) using an evolutionary optimization process to optimize filter parameter selection and leak signature determination. In some embodiments, a GA may be used as the evolutionary optimization process. The evolutionary optimization can be used to optimize the parameters associated with filtering (2602), dynamic leak signature computing (2604), or leak alarm generation (2606). The evolutionary optimization process may be used to optimize other system parameters. The optimized parameters may be stored or transmitted. Non-limiting examples of parameters that may be optimized using evolutionary optimization processes include, for example, span of moving average smoothing in data preprocessing, cut-off frequency for each filter selected, and the ratio threshold applicable to the variety of calibration, testing, and operation data.

In accordance with a further aspect, the method 2600 can involve filtering the pipeline measurement data (2602) by smoothing the pipeline measurement data, selecting a filter bank based on the primary feature frequency range, manipulating filtering to determine an order of filters of the filter bank applied, and extracting features.

In accordance with a further aspect, parameters may be used to select the filter bank and manipulate the filtering. The parameters can be determined using an evolutionary optimization process. These parameters may, for example, be selected by a genetic algorithm.

Figure 27:
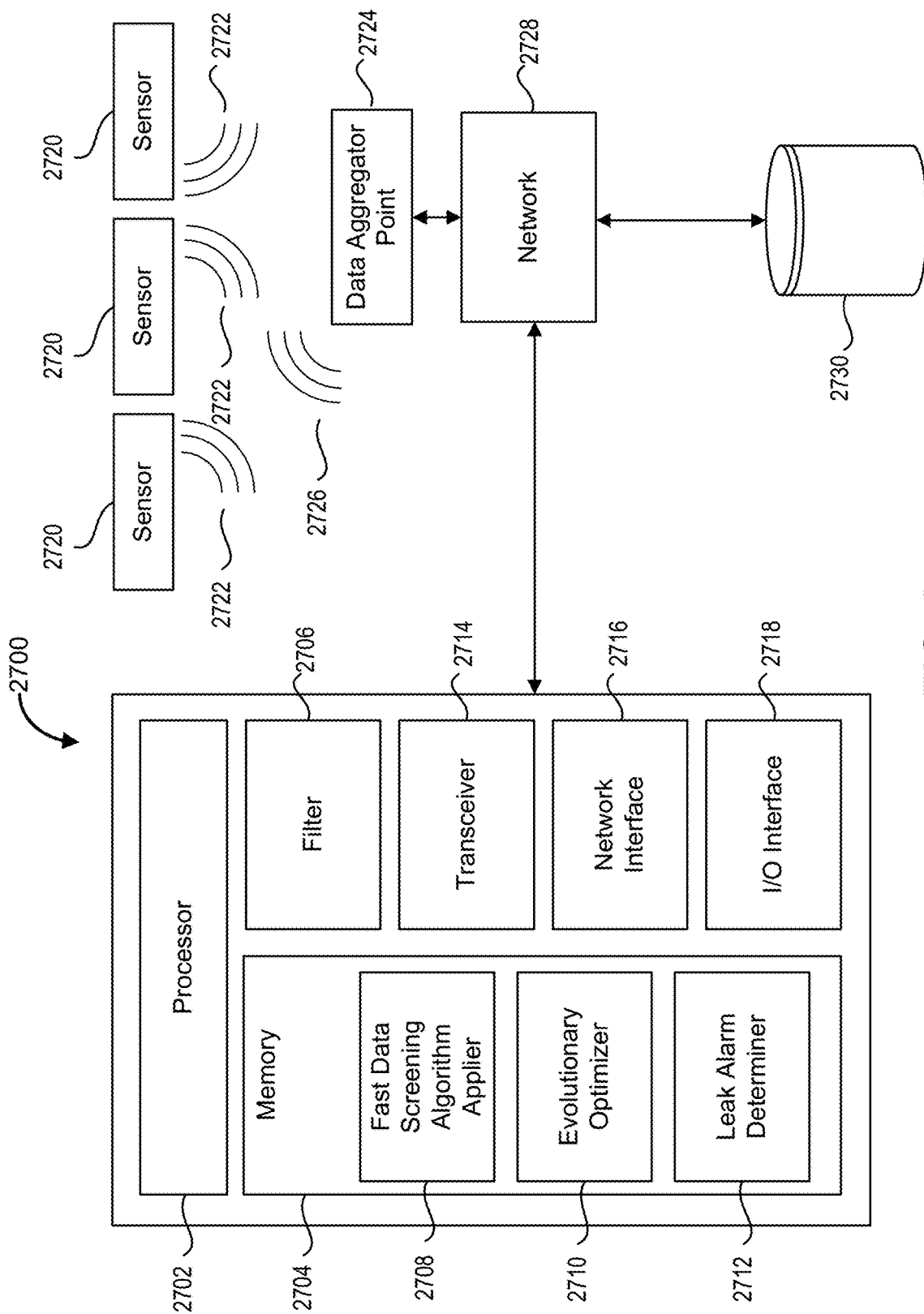
FIG. 27 illustrates a system to optimize parameters using evolutionary optimization and detect a leak alarm (for a leak or other pipeline anomaly), according to some embodiments.

FIG. 27 illustrates a system to optimize parameters using evolutionary optimization and detect a leak alarm (for a leak or other pipeline anomaly), according to some embodiments. The system includes a computing device 2700, one or more sensors 2720, a data aggregator 2724, a network 2728, and an electronic datastore 2730. Computing device 2700 includes a processor 2702, a memory 2704, a filter 2706, a transceiver 2714, a network interface 2716, and an I/O interface 2718. The memory 2704 includes a fast data screening algorithm applier 2708, an evolutionary optimizer 2710, a leak alarm determiner 2712.

Processor 2702 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 2704 can be configured to store various data utilized by computing device 2700 including, for example, data reflective of filter 2706, fast data screening algorithm applier 2708, evolutionary optimizer 2710, and leak alarm determiner 2712. Memory 2704 may also store training data, model parameters, variables, hyperparameters, and the like. Memory 2704 may implement a relational or object-oriented database, such as Microsoft SQL Server, Oracle, DB2, Sybase, Pervasive, MongoDB, NoSQL, or the like. Memory 2704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Filter 2706 can optionally be used to filter data received from the sensor(s) 2720. The filtering may include, for example, using time and frequency analysis to select the filters using a primary frequency range of the pipeline measurement. The filtering may include data smoothing, selecting a filter bank, manipulating the filtering (e.g., changing order and type of filters, etc.), and applying feature extraction. In some embodiments, filtering is done to produce near-Gaussian or normal distributed data. In some embodiments, filtering parameters can be determined with genetic algorithms.

Some embodiments are capable of using raw data to determine a leak alarm. An evolutionary optimization process (e.g., a GA) can be used to optimize parameters to process raw data or filtered data. Where there is filtering, then the evolutionary optimization process can further be used to optimize the parameters of the filters.

Fast data screening algorithm applier 2708 can apply fast data screening to the data. The fast data screen may acquire pipeline measurement data, establish initial statistics of filtered pipeline data, develop initial statistics on data forecasting, execute data screening with fast two-point statistics, and apply robust threshold for leak detection. The parameters of the fast data screening can be optimized using a genetic algorithm.

Evolutionary optimizer 2710 can be used to optimize the parameters of the system. Evolutionary optimizer 2710 can, for example, carry out a procedure similar to that illustrated in FIG. 24. The results of evolutionary optimization process can be stored on memory 2704 or electronic datastore 2730 and consequently evolutionary optimization process does not need to be independently used to determine a leak alarm.

In some embodiments, evolutionary optimizer 2710 can optimize the parameters offline. In these embodiments, data stored on memory 2704 or on electronic datastore 2730 can be processed using filter 2706, and fast data screening algorithm applied 2708 to determine an alarm. The system may then apply evolutionary computation with, for example, GA using evolutionary optimizer 2710 to optimize parameters. Once evolutionary optimizer 2710 has optimized the parameters, then those parameters can be stored on memory 2704 or electronic datastore 2730 for future data processing. Future data processing can include processing pipeline measurements from sensor(s) 2720. In some embodiments, the optimized parameters may be transmitted to another computing device to process pipeline measurements elsewhere.

Leak alarm determiner 2712, determines a leak alarm based on measurements from the pipeline and the dynamic leak signature. Leak alarm determiner 2712 can indicate when the measured data falls outside the expected statistics for the pipeline.

Fast data screening algorithm applier 2708, evolutionary optimizer 2710, or leak alarm determiner 2712, can be integrated with the computing device 2700, or may each be a standalone device (e.g., with a hardware processor and memory) connected to different components by network interface 2714, a connection, or a communication channel.

Transceiver 2714 can be used to transmit the leak alarm data to another computing device. For example, transceiver 2714 may send the leak alarm to a computing device with an interface for a user to indicate to the user that there is a (potential) leak detected. Alternatively, transceiver 2714 may send the leak alarm to an external datastore to store data relating to the leak alarm. Transceiver 2714 may also send and receive other information between computing device 2700 and other components (e.g., pipeline measurements from sensor(s) 2720). In some embodiments, the system may send the leak alarm with leak alarm data to a cloud site for further confirmation, for example, with information from sensors 2720. This may be done to further validate the existence of a leak, for example, by using information from two or more sensor sites, to reduce the number of false alarms.

In some embodiments, transceiver 2714 can use cellular, satellite, or local Ethernet methods of sending and receiving information. Systems, methods, and devices described herein can be compatible with all cloud-based platforms, such as IoT, remote control of leak testing, and data storage.

Network interface 2716 enables computing device 2700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 2718 enables computing device 2700 to interconnect with one or more input devices, such as a keyboard, mouse, camera, touch screen and a microphone, or with one or more output devices such as a display screen and a speaker. When I/O interface 2718 is interconnected to a display screen, it may be referred to as a display interface.

Sensor(s) 2720 can be pipeline sensors capable of measuring pipeline parameters. In some embodiments sensor(s) 2720 can be pressure sensors, sonic (acoustic) sensors, accelerometer transducers, temperature sensors, fluid density sensors, or flow velocity sensors. Other sensor types are also possible. Sensor(s) 2720 may also include a plurality of sensors which may or may not be the same type of sensor.

Sensor(s) 2720 can provide pipeline measurements to computing device 2700. In an example embodiment, sensor(s) 2720 can communicate with data aggregator point 2724 using sensor transmission signal(s) 2722 and data aggregator point signal 2726.

Data aggregator point 2724 can aggregate the data from sensor(s) 2720 and transmit the pipeline measurements through network 2728 to computing device 2700. Other aggregation method are also conceived. For example, some processing may be carried out by sensor(s) 2720.

Network 2728 can enable components of the system to communicate with one another such as computing device 2700, data aggregator point 2724, and electronic data store 2730.

Electronic datastore 2730 can be configured to store various data utilized by computing device 2700 including, for example, data reflective of filter 2706, fast data screening algorithm applier 2708, evolutionary optimizer 2710, and leak alarm determiner 2712. Electronic datastore 2730 may also store training data, model parameters, variables, hyper-parameters, and the like. Electronic datastore 2730 may implement a relational or object-oriented database, such as Microsoft SQL Server, Oracle, DB2, Sybase, Pervasive, MongoDB, NoSQL, or the like. Electronic datastore 2730 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In accordance with an aspect, there is provided a system for enhanced pipeline leak or other anomaly detection. The system can include at least one pipeline sensor 2720 fluidly connected to the pipeline, a processor 2702, a memory 2704 operatively couple to the processor 2702, and instructions stored in the memory 2704. The at least one pipeline sensor 2720 is communicatively connected to the processor 2702. The instructions are executable by the processor 2702 to instruct the system to apply a fast data screening algorithm to filtered pipeline measurements using fast data screening algorithm applier 2708, use an evolutionary optimization process to optimize filter parameter selection and leak signature determination using evolutionary optimizer 2710, and determine a leak alarm using the optimized filter parameter selection and leak signature determination using leak alarm determiner 2712.

In accordance with a further aspect, the fast data screening algorithm used by fast data screening algorithm applier 2708 may involve acquiring and filtering pipeline measurement data, establishing initial statistics of filtered pipeline data, developing initial statistics on data forecasting, executing data screening with fast two-point statistics, and applying robust threshold for leak detection.

In accordance with a further aspect, the optimization may involve selecting a searching range of multiple filtering parameters and trigger threshold of leak events, selecting calibration and testing data, performing multi-parameter evolutionary optimization, and applying optimized parameters to determine the leak alarm.

In accordance with a further aspect, optimization may further involve at least one of moving average window size in data preprocessing, modifying cut-off frequency for a pre-selected filter, and modifying the ratio threshold of screening forecast error over its standard deviation.

In accordance with a further aspect, the calibration and testing data may involve at least one of diverse internal test loop data and diverse field calibration and operation data.

Figure 28:
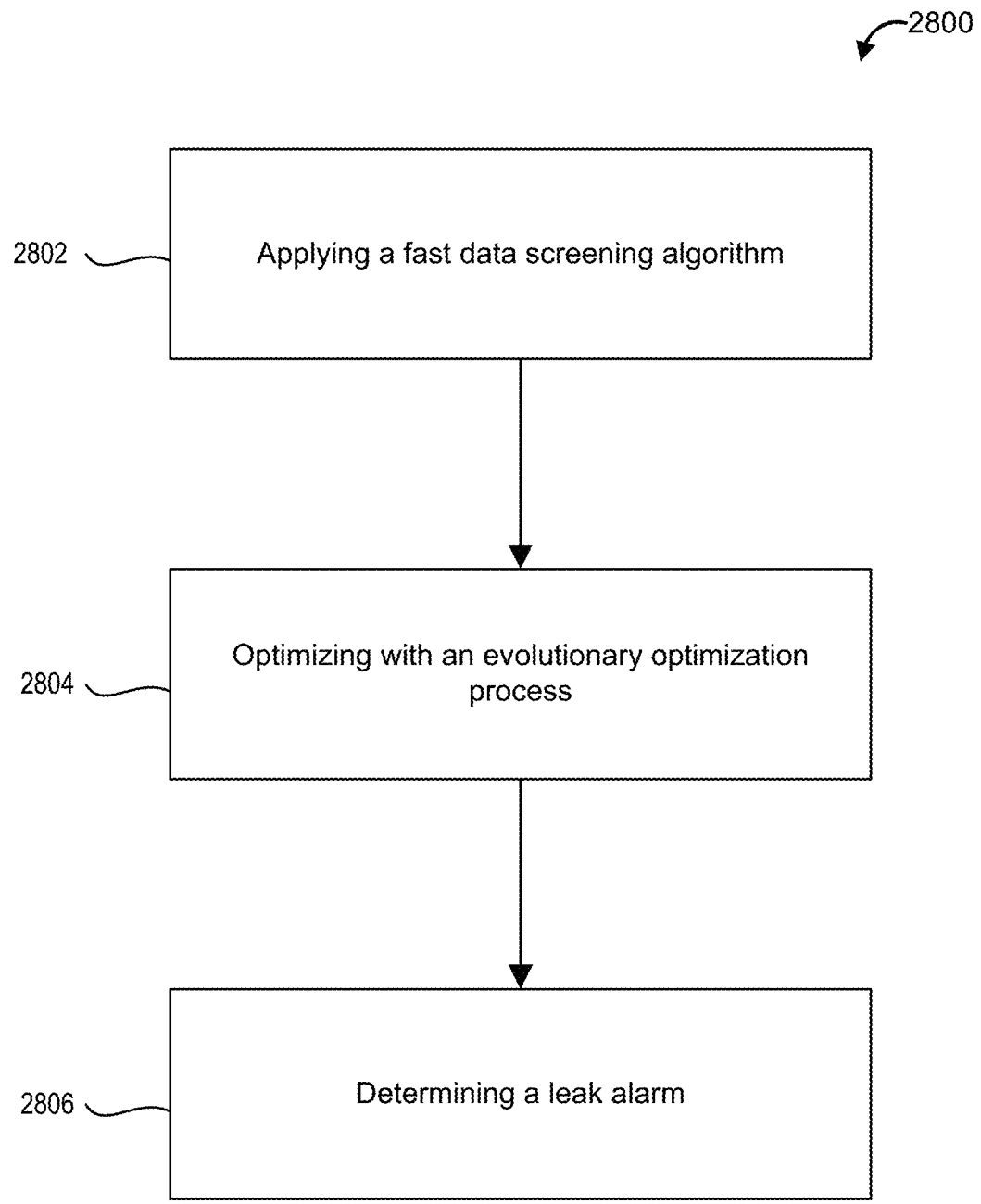
FIG. 28 illustrates a process diagram of a method of optimizing parameters using evolutionary optimization and detecting a leak alarm, according to some embodiments.

FIG. 28 illustrates a process diagram of a method 2800 of optimizing parameters using evolutionary optimization and detecting a leak alarm, according to some embodiments.

In accordance with an aspect, there is provided a method 2800 for enhanced pipeline leak detection. The method may involve applying a fast data screening algorithm to filtered pipeline measurements (2802), using an evolutionary optimization process to optimize filter parameter selection and leak signature determination (2804), and determining a leak alarm using the optimized filter parameter selection and leak signature determination (2806).

In some embodiments, optimizing the filter parameters at block 2804 need not occur immediately before determining a leak alarm of block 2806. For example, the method may make use of previously saved data to apply a fast data screening algorithm of block 2802 and then optimize the parameters of block 2802 using the evolutionary optimization process of block 2804. Once the parameters of block 2802 have been sufficiently optimized, then they may be saved or transmitted to another system. The system may then determine a leak alarm in pipeline measurements at block 2806 using the optimized parameters. In some embodiments, block 2804 can be performed offline to optimize parameters before those parameters are implemented in, for example, a live system to determine a leak alarm at block 2806.

In accordance with a further aspect, the fast data screening algorithm of step 2802 may involve acquiring and filtering pipeline measurement data, establishing initial statistics of filtered pipeline data, developing initial statistics on data forecasting, executing data screening with fast two-point statistics, and applying robust threshold for leak detection.

In accordance with a further aspect, the optimization of step 2804 may involve selecting a searching range of multiple filtering parameters and trigger threshold of leak events, selecting calibration and testing data, performing multi-parameter evolutionary optimization, and applying optimized parameters to determine the leak alarm.

In accordance with a further aspect, optimization block 2804 may further involve at least one of moving average window size in data preprocessing, modifying cut-off frequency for a pre-selected filter, and modifying the ratio threshold of screening forecast error over its standard deviation.

In accordance with a further aspect, the calibration and testing data may include at least one of diverse internal test loop data and diverse field calibration and operation data.

Step 2010: Identifying and Validating Leak Signatures

Evaluating data from multiple sensors, comparing the data screening results with real-time transient model outputs, and checking the consistency of leak alarms simulated from different disciplines, can be applied in conjunction with the embodiments described herein.

Figure 29A:
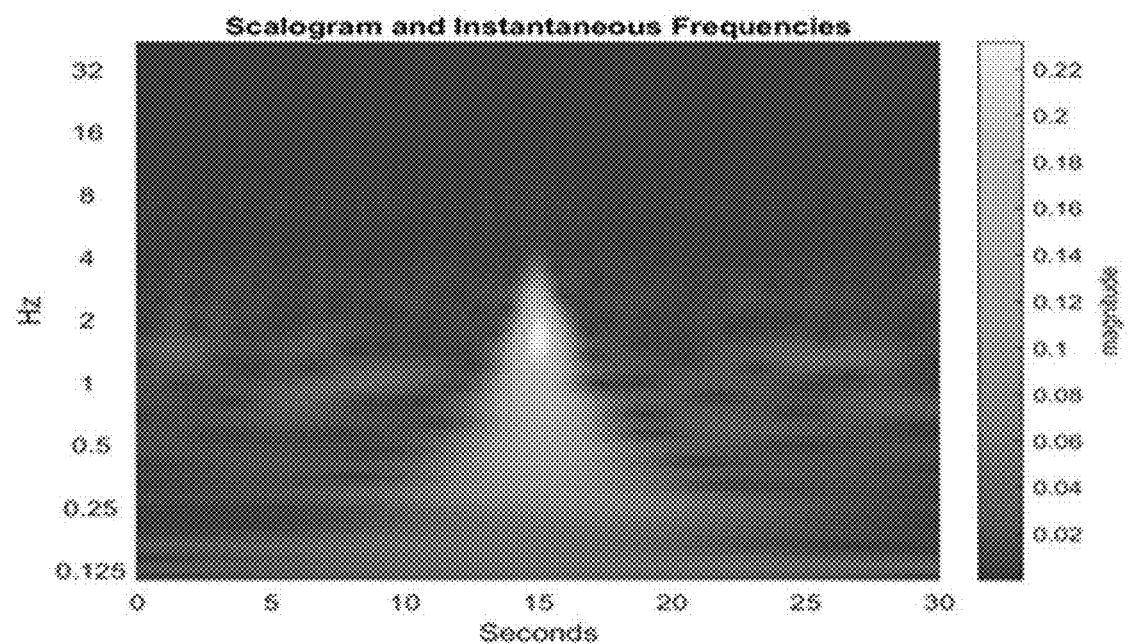
FIG. 29A illustrates an example of a time-frequency (TF) representation (i.e., a scalogram with specified time, frequency, and amplitude for data interpretation) of a leak signature obtained from the test loop using continuous wavelet transform (CWT), according to some embodiments.
Figure 29B:
FIG. 29B illustrates an example RGB color image produced from FIG. 29A, according to some embodiments.

In an embodiment, the systems of FIG. 25 and FIG. 27 can classify detected anomalies using wavelet analysis (e.g., CWT) with deep learning. FIG. 29A illustrates an example of a time-frequency (TF) representation (i.e., a scalogram with specified time, frequency, and amplitude for data interpretation) of a leak signature obtained from the test loop using continuous wavelet transform (CWT), according to some embodiments. Such 30-second TF response covers the most important transient information of wave change, and can be saved as a RGB color image and processed with convolutional neural networks (CNN) trained from deep-learning algorithms. FIG. 29B illustrates an example RGB color image produced from FIG. 29A, according to some embodiments. In particular, FIG. 29B is a colormap of FIG. 29A wherein the color has been scaled, for example, from 0 to 255 for CNN image processing.

Training a deep CNN can be computationally expensive and require a large amount of training data. In various applications, a sufficient amount of training data may not be available, and synthesizing new realistic training examples may not be feasible. In these cases, leveraging existing neural networks that have been trained on large data sets for conceptually similar tasks is desirable. This leveraging of existing neural networks is called transfer learning. The basic structure of a deep CNN developed for image recognition of large number of objects (e.g., GoogleNet, and SqueezeNet) can be adapted by modifying some layer parameters, setting new training options and retraining the deep CNN with new image data for the pipeline leak detection and classification problems.

In some embodiments, the last learnable convolution layer and final classification layer of the CNN specify how to combine the features that the network extracts into class probabilities, a loss value, and predicted labels consistent to the number of outputs of the classification network. To retrain, for example, a convolutional neural network (e.g., GoogleNet™) to classify the RGB images, for example, these two layers are replaced with new layers adapted to the data. Modifications may also include specifying the probability of the dropout layer to prevent overfitting.

After applying the robust data processing procedure with feature extraction, the image data for training CNN may be insensitive to pipeline configuration and fluid types. It is possible to initiate training with internal test loop data and evaluate the retrained deep CNN with new data obtained from the same and different systems. The retrained CNN may help estimate if the test image includes a leak (or other pipeline anomaly). If there is a leak, the deep CNN may also estimate the leak size or distance between the leak location and the sensor spot.

Figure 30:
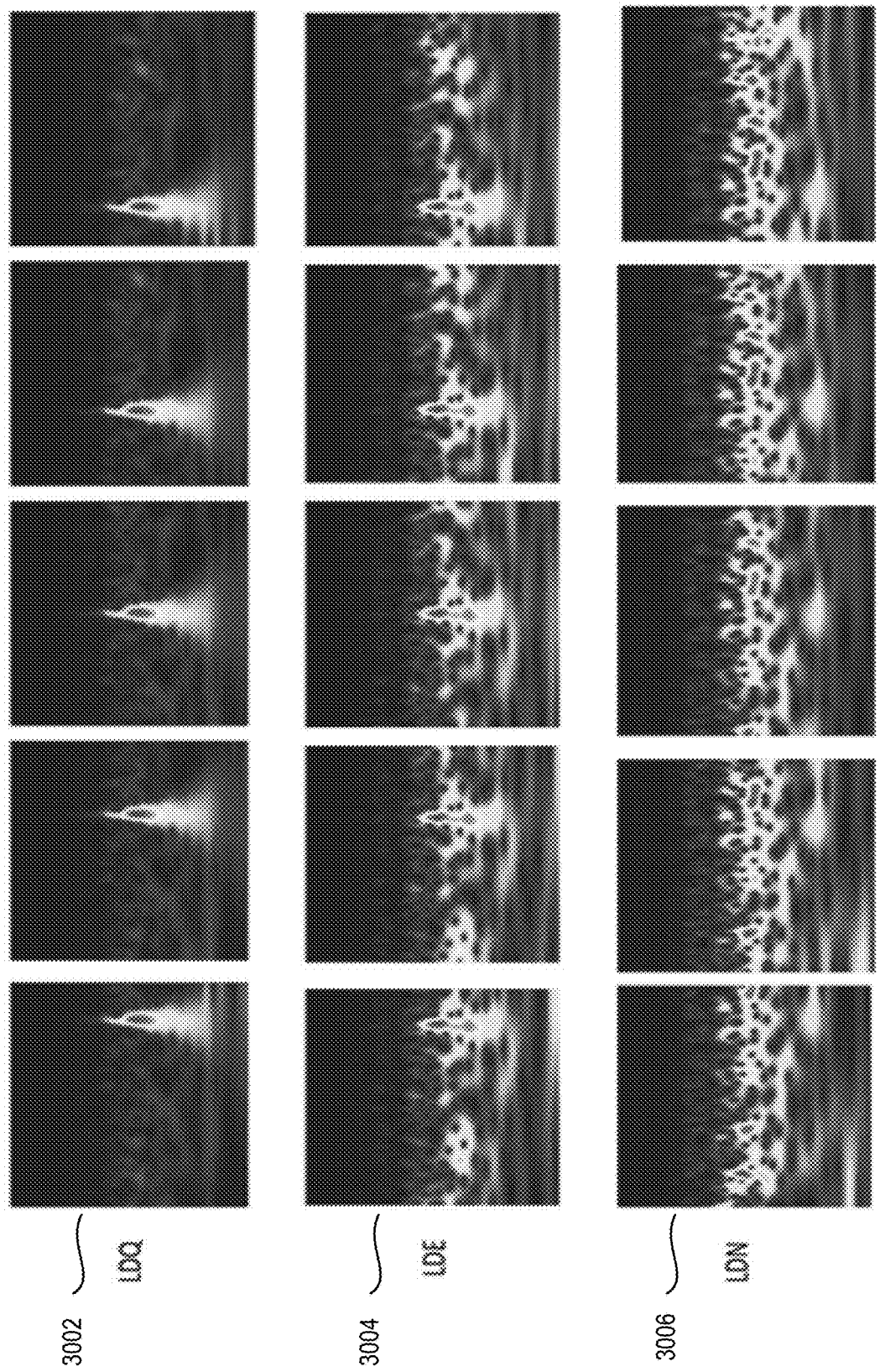
FIG. 30 illustrates training images from a test loop labeled in 3 classes, according to some embodiments.

FIG. 30 illustrates training images from a test loop labeled in 3 classes, according to some embodiments.

Row 3002 illustrates leak detection quarter inch orifice (LDQ) training images (leak detected in ¼" orifice). Row 3004 illustrates leak detection eighth inch orifice (LDE) training images (leak detected in ⅛" orifice). Row 3006 illustrates none-leak (LDN) training images and (none leak detected). Each image spans 30 seconds, and the centers of sliding windows for LDQ and LDE are shifted from −10 seconds to +10 seconds to improve diversity of the training examples. It may not be necessary to select window size with fixed time interval. CNN in this application can adapt variable time span of input images and scale them to the specified image size (e.g., 224-224-3 for GoogleNet or 227-227-3 for SquezzeNet). The data sampling frequency for wavelet analysis and image construction can be adapted to 100 Hz, focusing on low frequency components of leak signatures.

Figure 31:
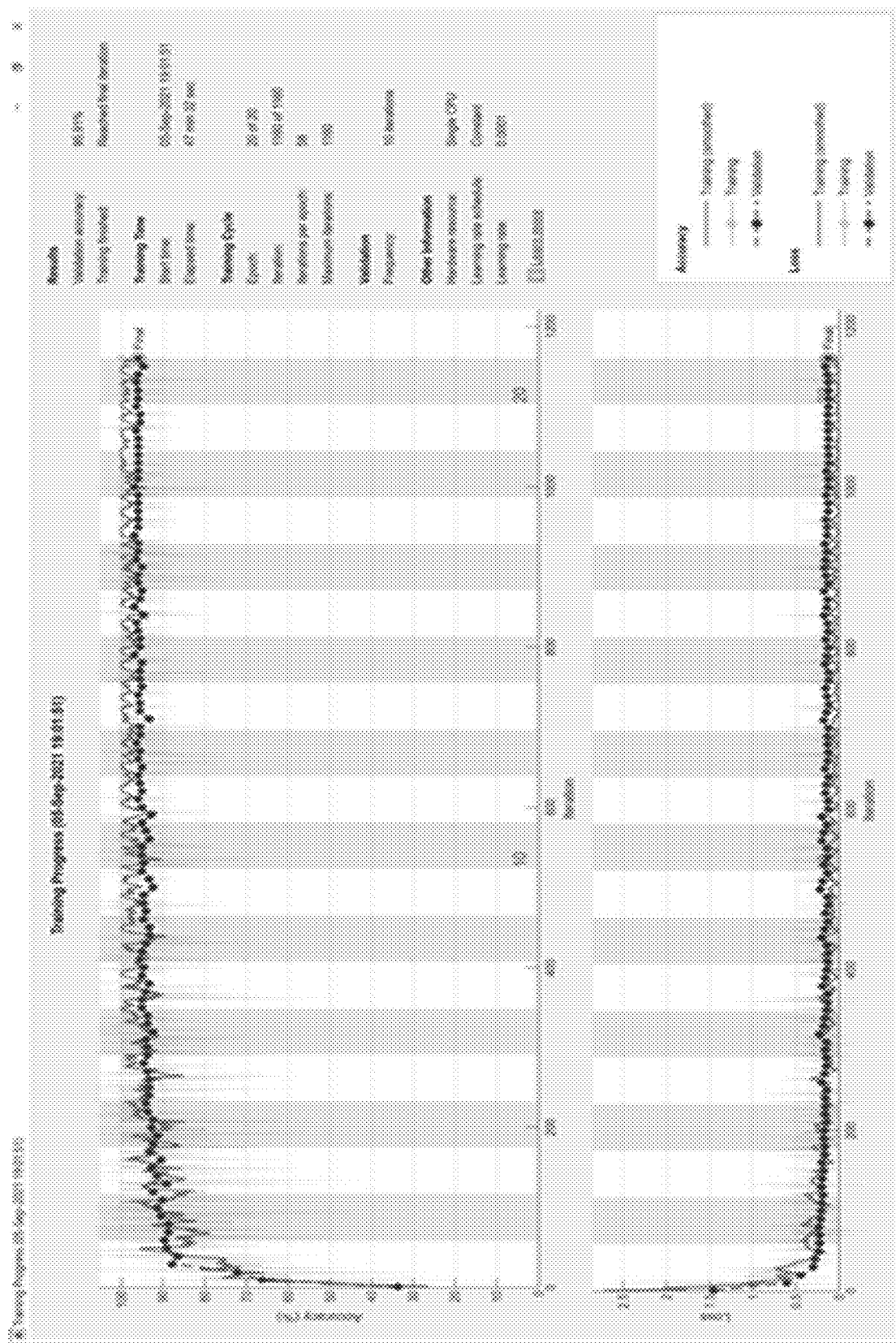
FIG. 31 illustrates example retraining results with modified layer parameters of GoogleNet, according to some embodiments.

FIG. 31 illustrates example retraining results with modified layer parameters of GoogleNet, according to some embodiments.

Figure 32:
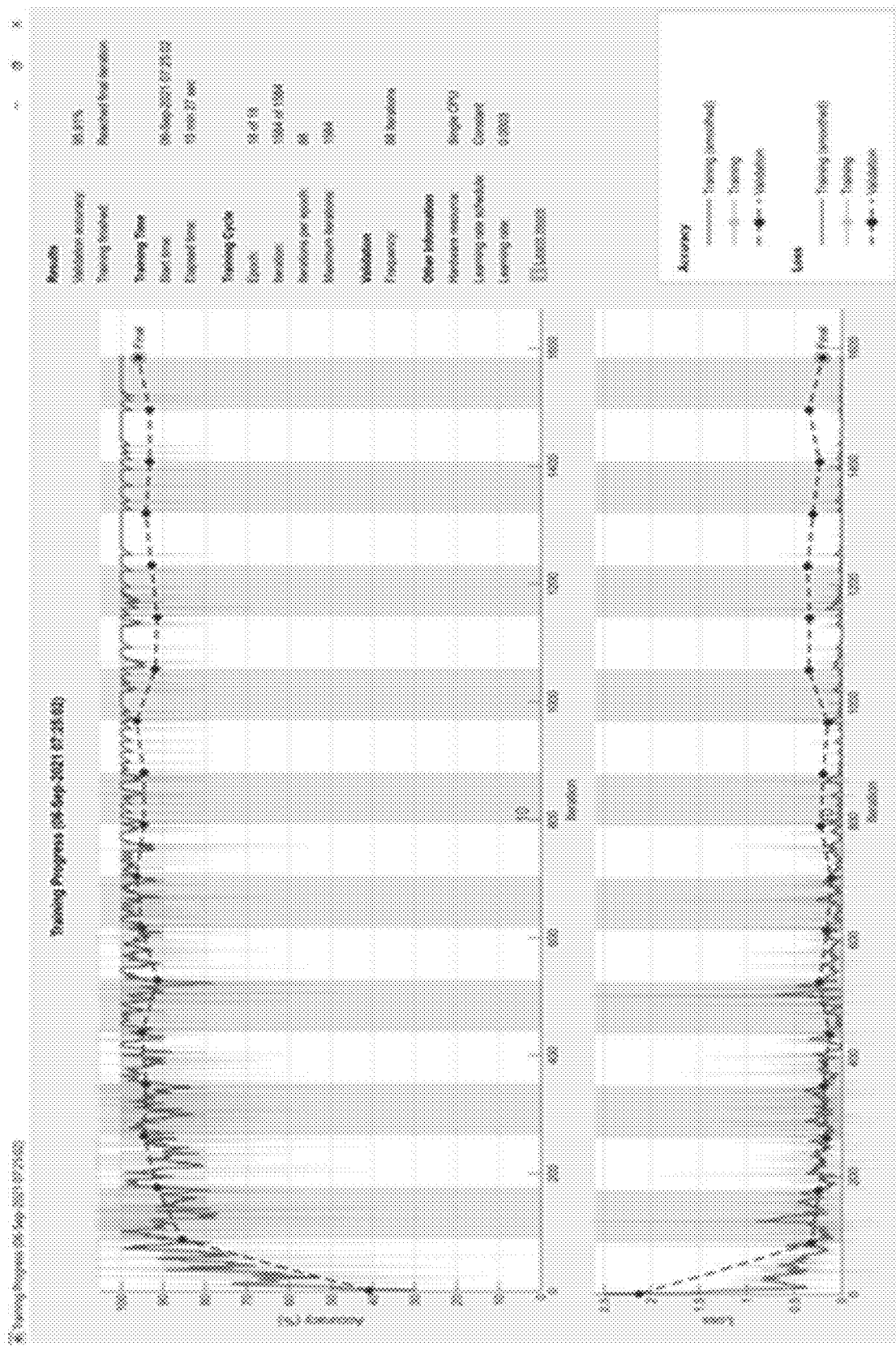
FIG. 32 illustrates example retraining results with modified layer parameters of SquezzeNet, according to some embodiments.

FIG. 32 illustrates example retraining results with modified layer parameters of SquezzeNet, according to some embodiments.

For FIG. 31 and FIG. 32, from among 1102 images in total, 882 images can be used for the training and 220 images can be used for the validation. The number of layers may be kept unchanged, i.e., 144 layers for GoogleNet and 68 layers for SqueezeNet. The validation accuracy may be (by chance) identical for the two training examples, but SqueezeNet was more computationally efficient for retraining possibly because of its less complex structure. For additional testing after the retraining, each new image can be classified using the trained CNN and output its recognized category.

Retrained GoogleNet and SqueezeNet performed equally well (namely >95%). Testing examples were collected from the same test loop with different operation parameters. Field data examples may also be tested with changes in leak edge profiles due to the variations in pipeline configuration and operational pressures, and may achieve similar accuracy for both leak and none-leak classification.

Figure 33:
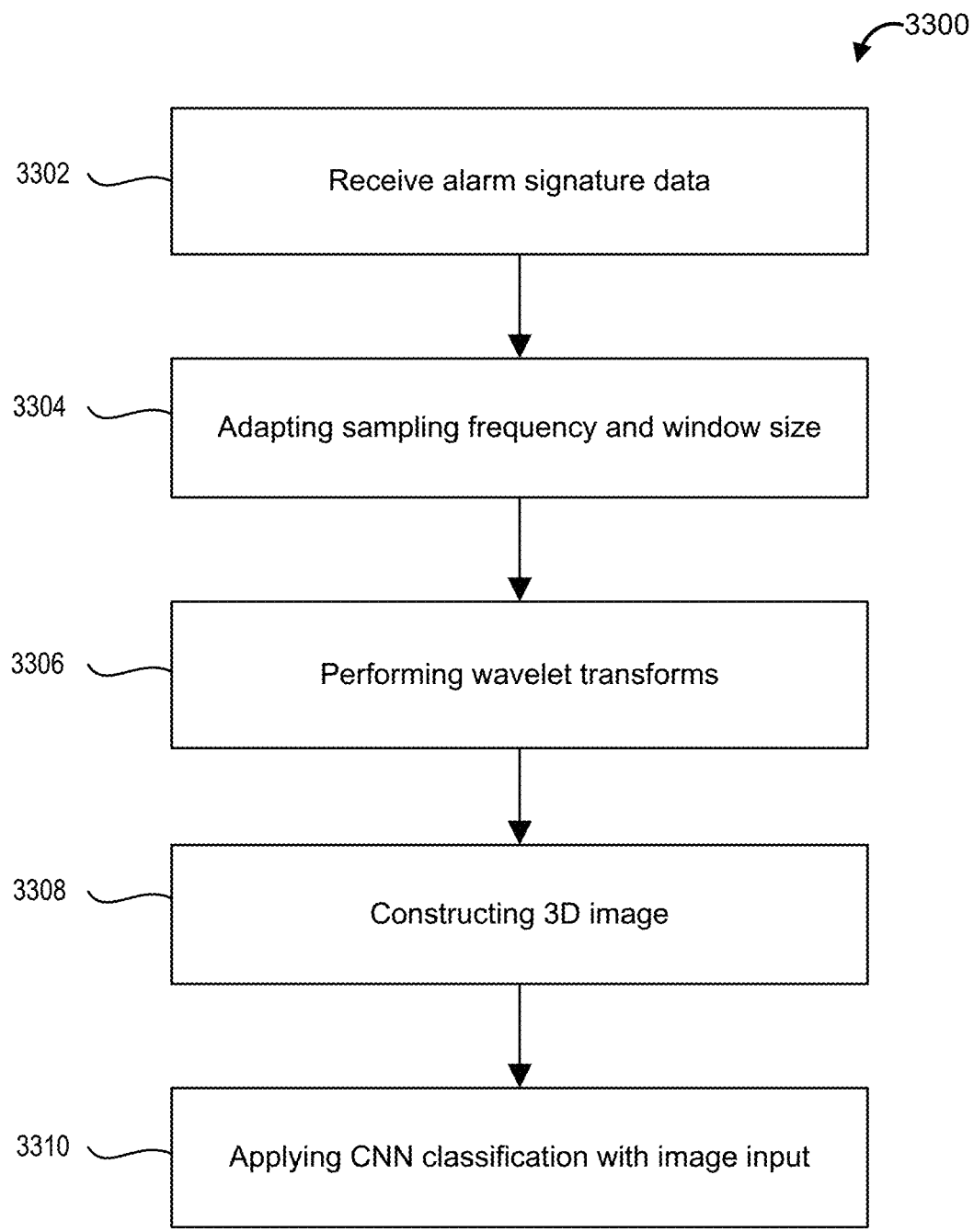
FIG. 33 illustrates a procedure for a method of leak signature identification and validation, according to some embodiments.

FIG. 33 illustrates a procedure for a method 3300 of leak signature identification and validation, according to some embodiments. With minor modification, it can also be used to process filtered pressure data for general pipeline monitoring.

Initially, alarm signature data can be received (3302) such as from a pipeline sensor. The sampling frequency and window size are then adapted (3304). The continuous wavelet transformation can be performed on the adapted alarm signature (3306). A 3D image can be constructed from the transformed alarm signature (3308). A CNN can classify the image input based on the presence or absence of a leak, leak location, leak size or other parameter (3310).

In some embodiments, images can be rescaled to the same dimensions before CNN training and testing regardless of the original sampling frequency. In some embodiments, the same sampling frequency can be used for both measurement and image generation with moderate window size. Desampling with less dense data in image generation may only be needed for large window sizes with high initial sampling frequencies. Some animating considerations can include the time required for real-time image generation with adequate resolution and the space of the image datastore. In some embodiments, applying reduced sampling frequency to an image created using filtered data with adequate smoothing can meet resolution requirements.

Example Embodiment of a System Using CNN to Detect Pipeline Leaks

The foregoing discussion described some embodiments of the methods, systems, and devices. Referring to FIG. 20, the use of a convolutional neural network trained to recognize images and retrained to recognize leaks in data of block 2010 can be used on its own or in conjunction with the systems, methods, and devices described in steps 2008 and prior. The following are some non-limiting example implementations of the methods, systems, and devices described thus far.

In some embodiments, a convolutional neural network can be paired with the data filtering described above. Referring to FIG. 25, in accordance with a further aspect, the system (having hardware processor 2502) may further be configured to validate a leak check triggered by the dynamic leak signature using a convolutional neural network (CNN), and classify a leak type using the CNN. The leak check may include a time-frequency representation of related data. The generate the leak alarm using leak alarm generator 610 may include generating the leak alarm using the validated leak check triggered by the leak signature threshold.

In accordance with a further aspect, the system can validate the leak check by converting the leak check into a 3D image using a continuous wavelet transform, and processing the 3D image using the CNN. The CNN can be trained for image recognition tasks.

In accordance with a further aspect, the CNN may be adapted for leak detection using 3D color image inputs generated from a continuous wavelet transform (CWT) of transient pressure measurements.

In accordance with a further aspect, the instructions may further instruct the system to process image inputs transformed from raw pressure waves using the CNN. The CNN can be trained with pipeline calibration, testing, and operation data, for automated filtering, pattern recognition, leak detection, and classification.

Referring to back FIG. 26, in accordance with a further aspect, the method may further include validating a leak check triggered by the dynamic leak signature using a convolutional neural network (CNN), and classifying a leak type using the CNN. The leak check may include a time-frequency representation of related data. Generating the leak alarm (2606) may include generating the leak alarm using the validated leak check triggered by the leak signature.

In accordance with a further aspect, the method can involve validating the leak check by converting the leak check into a 3D image using a continuous wavelet transform, and processing the 3D image using the CNN. The CNN can be trained for image recognition tasks.

In accordance with a further aspect, the CNN may be adapted for leak detection using 3D color image inputs generated from a continuous wavelet transform (CWT) of transient pressure measurements.

In accordance with a further aspect, the method may include processing image inputs transformed from raw pressure waves using the CNN. The CNN may be trained with pipeline calibration, testing, and operation data, for automated filtering, pattern recognition, leak detection, and classification.

In some embodiments, a convolutional neural network (CNN) can be used to detect leaks in time-frequency representations of pipeline data without the use of an evolutionary optimization process.

Figure 34:
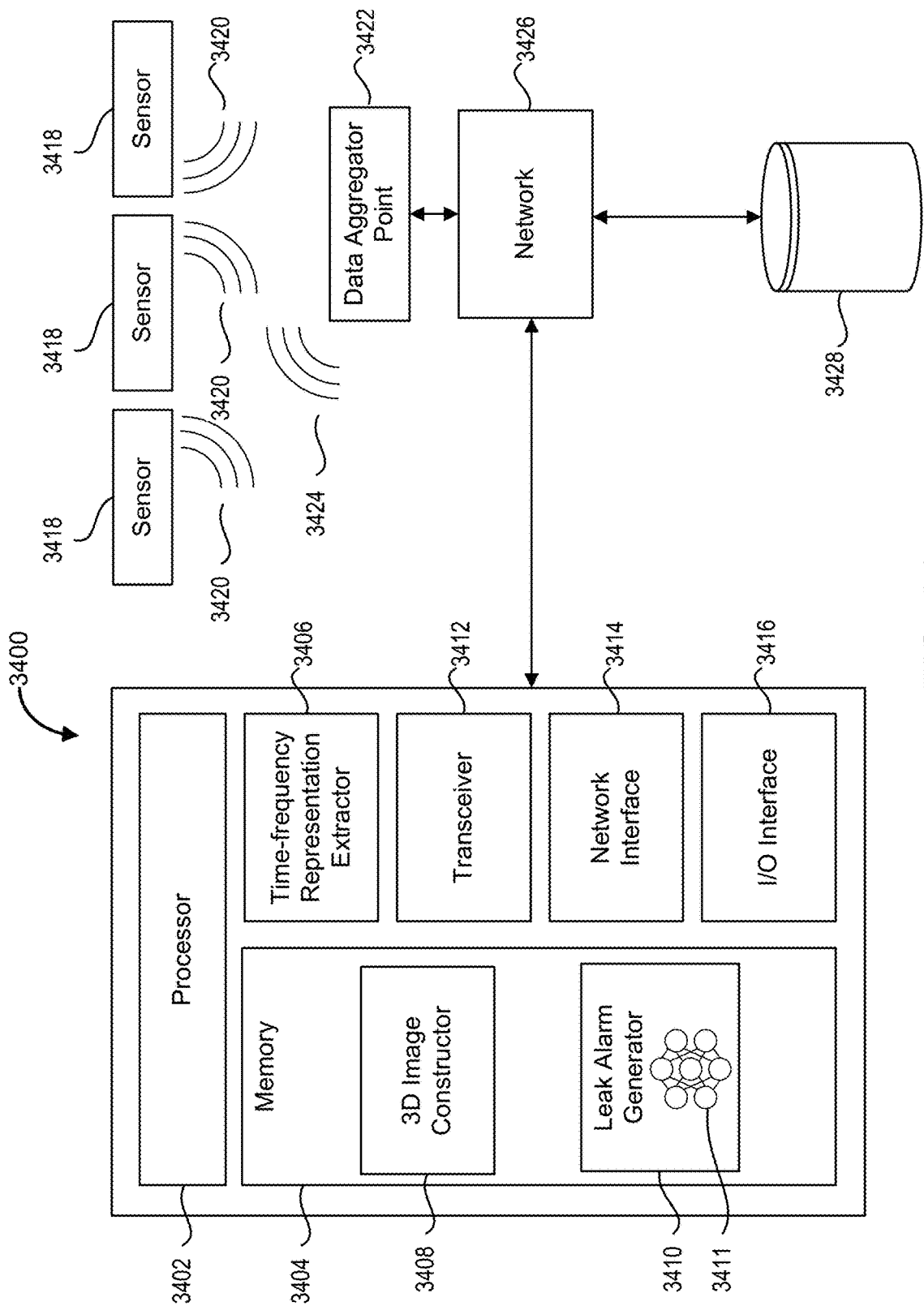
FIG. 34 illustrates a system to detect a leak or other pipeline anomaly alarm using a convolutional neural network (CNN), according to some embodiments.

For example, FIG. 34 illustrates a system to detect a leak or other pipeline anomaly alarm using a convolutional neural network (CNN), according to some embodiments. The system includes a computing device 3400, one or more sensors 3418, a data aggregator 3422, a network 3426, and an electronic datastore 3428. Computing device 3400 includes a processor 3402, a memory 3404, a time-frequency representation extractor 3406, a transceiver 3412, a network interface 3414, and an I/O interface 3416. The memory 3404 includes a 3D image constructor 3408 and a leak alarm generator 3410 including a CNN 3411.

Processor 3402 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 3404 can be configured to store various data utilized by computing device 600 including, for example, data reflective of time-frequency representation extractor 3406, 3D image constructor 3408, and leak alarm generator 3410 including a CNN 3411. Memory 3404 may also store training data, model parameters, variables, hyperparameters, and the like. Memory 3404 may implement a relational or object-oriented database, such as Microsoft SQL Server, Oracle, DB2, Sybase, Pervasive, MongoDB, NoSQL, or the like. Memory 3404 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Time-frequency representation extractor 3406 can extract a time-frequency representation of pipeline measurement data. The time-frequency extraction can be performed using filters to extract the time-frequency representation.

3D image constructor 3408 can construct a 3D image from the time-frequency representation of the pipeline measurement data. The 3D image extractor can convert the data into an image that CNN 3411 can be retrained to identify leaks in.

Leak alarm generator 3410 can generate a leak alarm based on the 3D image of the time-frequency representation of the pipeline measurement data. Leak alarm generator 3410 includes CNN 3411 which is a CNN that can be trained for image recognition tasks and retrained for leak (or other anomaly) detection tasks. CNN 3411 can process the 3D image to ascertain whether there is a leak (or other anomaly) and optionally the location of said leak and the size.

In some embodiments, the leak alarm may be indicative of a pressure surge and the system may send the leak alarm (i.e. leak alarm information) from the system to a cloud site to differentiate pressure surge behaviour indicative of a pipeline leak with pressure surge behaviour indicative of normal operation or another pipeline anomaly. The cloud site may make use of detected leak alarms (e.g., pressure surges) arising from other sensors 3418.

Time-frequency representation extractor 3406, 3D image constructor 3408, or leak alarm generator 3410 including CNN 3411, can be integrated with the computing device 3400, or may each be a standalone device (e.g., with a hardware processor and memory) connected to different components by network interface 3414, a connection, or a communication channel.

Transceiver 3412 can be used to transmit the leak alarm data to another computing device. For example, transceiver 3412 may send the leak alarm to a computing device with an interface for a user to indicate to the user that there is a (potential) leak detected. Alternatively, transceiver 3412 may send the leak alarm to an external datastore to store data relating to the leak alarm. Transceiver 3412 may also send and receive other information between computing device 3400 and other components (e.g., pipeline measurements from sensor(s) 3418). In some embodiments, the system may send the leak alarm with leak alarm data to a cloud site for further confirmation, for example, with information from sensors 3418. This may be done to further validate the existence of a leak, for example, by using information from two or more sensor sites, to reduce the number of false alarms.

In some embodiments, transceiver 3412 can use cellular, satellite, or local Ethernet methods of sending and receiving information. Systems, methods, and devices described herein can be compatible with all cloud-based platforms, such as IoT, remote control of leak testing, and data storage.

Network interface 3414 enables computing device 3400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 3416 enables computing device 3400 to interconnect with one or more input devices, such as a keyboard, mouse, camera, touch screen and a microphone, or with one or more output devices such as a display screen and a speaker. When I/O interface 3416 is interconnected to a display screen, it may be referred to as a display interface.

Sensor(s) 3418 can be pipeline sensors capable of measuring pipeline parameters. In some embodiments sensor(s) 3418 can be pressure sensors, sonic (acoustic) sensors, accelerometer transducers, temperature sensors, fluid density sensors, or flow velocity sensors. Other sensor types are also possible. Sensor(s) 3418 may also include a plurality of sensors which may or may not be the same type of sensor.

Sensor(s) 3418 can provide pipeline measurements to computing device 3400. In an example embodiment, sensor(s) 3418 can communicate with data aggregator point 3422 using sensor transmission signal(s) 3420 and data aggregator point signal 3424.

Data aggregator point 3422 can aggregate the data from sensor(s) 3418 and transmit the pipeline measurements through network 3426 to computing device 3400. Other aggregation method are also conceived. For example, some processing may be carried out by sensor(s) 3418.

Network 3426 can enable components of the system to communicate with one another such as computing device 3400, data aggregator point 3422, and electronic data store 3428.

Electronic datastore 3428 can be configured to store various data utilized by computing device 3400 including, for example, data reflective of time-frequency representation extractor 3406, 3D image constructor 3408, and leak alarm generator 3410 including a CNN 3411. Electronic datastore 3428 may also store training data, model parameters, variables, hyperparameters, and the like. Electronic datastore 3428 may implement a relational or object-oriented database, such as Microsoft SQL Server, Oracle, DB2, Sybase, Pervasive, MongoDB, NoSQL, or the like. Electronic datastore 3428 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In accordance with an aspect, there is provided a system to detect pipeline leaks using an adapted convolutional neural network (CNN) 3411. The system including at least one pipeline sensor 3418 fluidly connected to the pipeline, a processor 3402, a memory 3404 operatively coupled to the processor 3402, instructions stored in the memory 3404. The at least one pipeline sensor 3418 is communicatively connected to the processor 3402. The instructions are executable by the processor 3402 to instruct the system to receive pipeline measurement data from the at least one pipeline sensor 3418, extract a time-frequency representation of the pipeline measurement data using time-frequency representation extractor 3406, construct 3D images by transforming the time-frequency representations using a continuous wavelet transform (CWT) using 3D image constructor 3408, generate a leak alarm by detecting leak patterns in the 3D images using CNN 3411 using leak alarm generator 3410, and transmit the leak alarm using transceiver 3412 and/or store the leak alarm using memory 3404 or electronic datastore 3428.

In accordance with an aspect, there is provided a system for enhanced pipeline leak (or other anomaly) detection. The system including at least one pipeline sensor 3418 fluidly connected to the pipeline, a processor 3402, a memory 3404 operatively coupled to the processor 3402, instructions stored in the memory 3404. The at least one pipeline sensor 3418 is communicatively connected to the processor 3402. The instructions are executable by the processor 3402 to instruct the system to adapt CNNs 3411 through transfer learning using 3D color image inputs generated from a continuous wavelet transform (CWT) of pipeline measurements received from the at least one pipeline sensor 3418 wherein the CNNs 3411 can take image inputs from at least one of raw or filtered pipeline measurements to monitor the operation status, validate triggered events, and recognize leak patterns.

Figure 35:
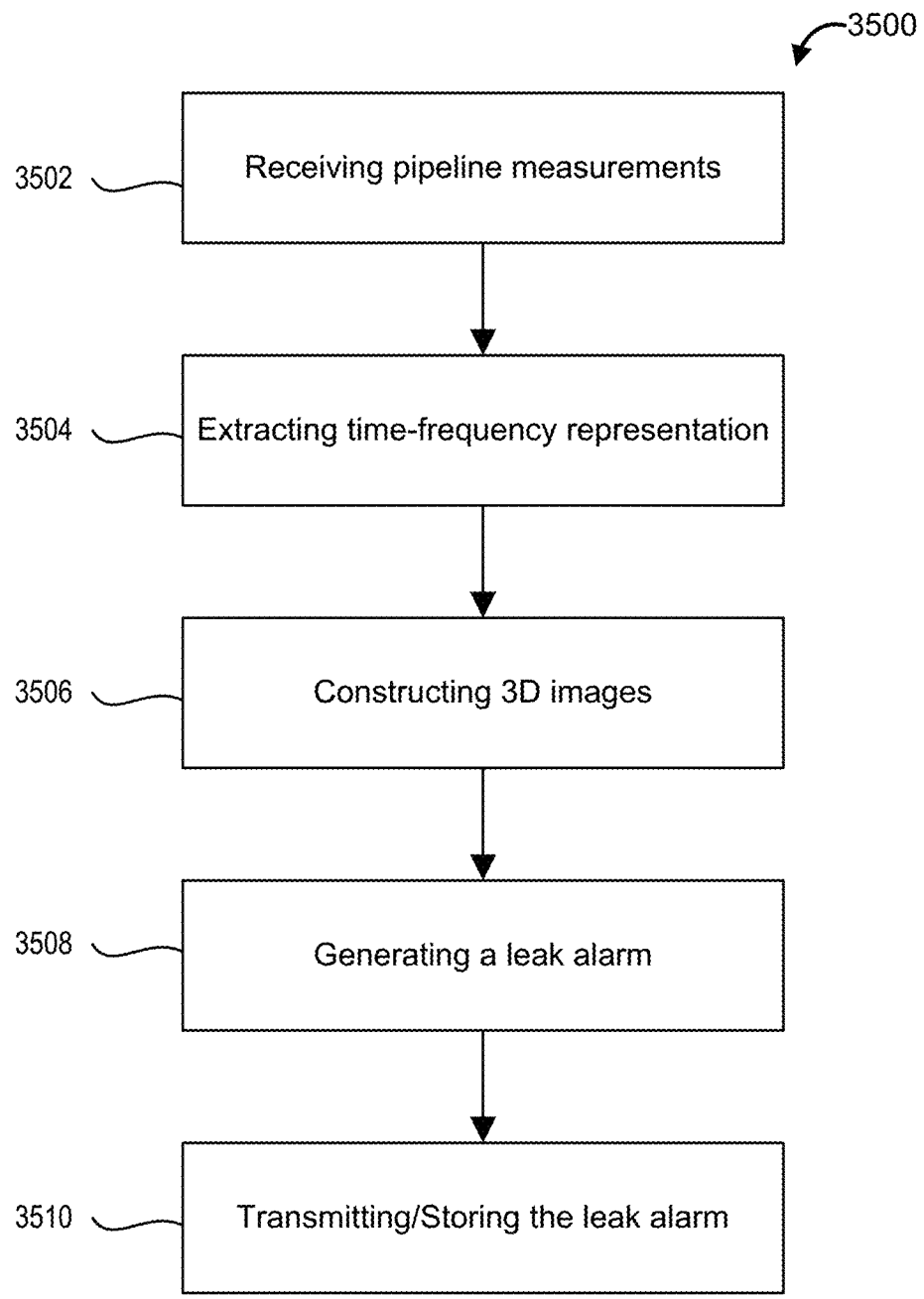
FIG. 35 illustrates a process diagram of a method of detecting a leak alarm using a convolutional neural network (CNN), according to some embodiments.

FIG. 35 illustrates a process diagram of a method 3500 of detecting a leak alarm using a convolutional neural network (CNN), according to some embodiments.

In accordance with an aspect, there is provided a method 3500 to detect pipeline leaks (or other anomalies) using an adapted convolutional neural network (CNN). The method involves receiving pipeline measurement data from at least one pipeline sensor fluidly connected to the pipeline (3502), extracting a time-frequency representation of the pipeline measurement data (3504), constructing 3D images by transforming the time-frequency representations using a continuous wavelet transform (CWT) (3506), generating a leak alarm by detecting leak patterns in the 3D images using the CNN (3508), and transmitting and/or storing the leak alarm (3510).

In accordance with an aspect, there is provided a method 3500 for enhanced pipeline leak detection. The method involves adapting convolutional neural networks (CNNs) through transfer learning using 3D color image inputs generated from a continuous wavelet transform (CWT) of pipeline measurements. The CNNs can take image inputs from at least one of raw or filtered pipeline measurements to monitor the operation status, validate triggered events, and recognize leak patterns.

Some embodiments of the systems, methods, and devices described herein include a system to retrain the convolutional neural network to identify leaks in 3D images of time-frequency representations of pipeline measurements.

The foregoing discussion of FIG. 34-FIG. 35 was discussed as using CNNs to generate leak alarms by detecting leak patterns in the 3D images. In some embodiments, the leak patterns may be indicative of pressure surges and the leak alarm may be further processed to verify if it is a leak (e.g., by a ANFIS model). Any discussion above or below relating to using or training CNNs would be understood by the Skilled Person to equally apply to, for example, the CNN 108 of system 100.

Figure 36:
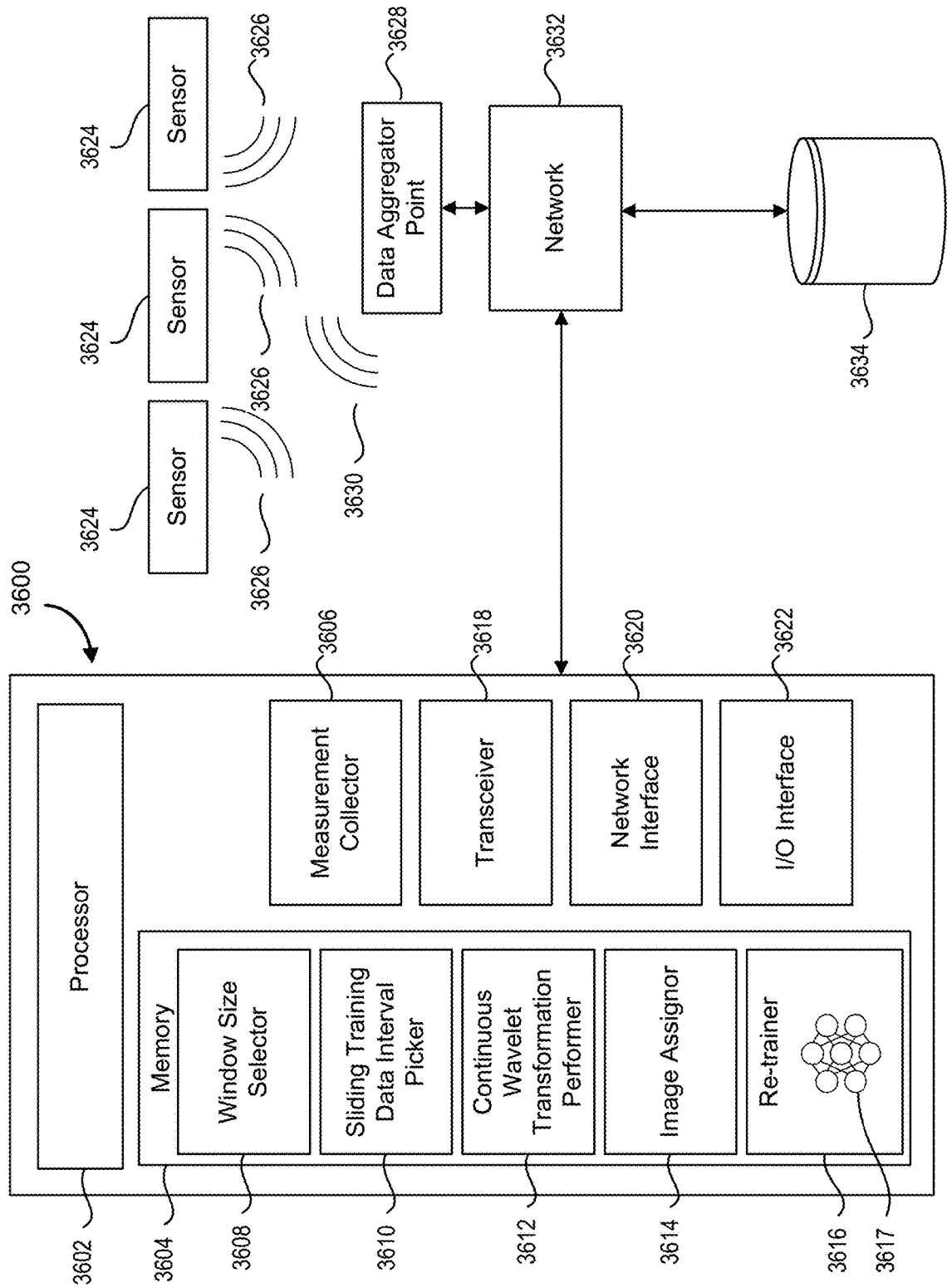
FIG. 36 illustrates another system to retrain a convolutional neural network (CNN) to detect a leak (or other pipeline anomaly) alarm, according to some embodiments.

FIG. 36 illustrates another system to retrain a convolutional neural network (CNN) to detect a leak (or other pipeline anomaly) alarm, according to some embodiments. The system includes a computing device 3600, one or more sensors 3624, a data aggregator 3628, a network 3632, and an electronic datastore 3634. Computing device 3600 includes a processor 3602, a memory 3604, a measurement collector 3606, a transceiver 3618, a network interface 3620, and an I/O interface 3622. The memory 3604 includes a window size selector 3608, a sliding training data interval picker 3610, a continuous wavelet transformation performer 3612, an image assignor 3614, a re-trainer 3616 which includes a convolutional neural network (CNN) 3617.

Processor 3602 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 3604 can be configured to store various data utilized by computing device 3600 including, for example, data reflective of measurement collector 3606, window size selector 3608, sliding training data interval picker 3610, continuous wavelet transformation performer 3612, image assignor 3614, re-trainer 3616 which includes CNN 3617. Memory 3604 may also store training data, model parameters, variables, hyperparameters, and the like. Memory 3604 may implement a relational or object-oriented database, such as Microsoft SQL Server, Oracle, DB2, Sybase, Pervasive, MongoDB, NoSQL, or the like. Memory 3604 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Measurement collector 3606 can collect measurements. Measurement collector can collect measurements from external sources, memory 3604, electronic datastore 3634, and/or sensor(s) 3624. Measurement collector 3606 can compile a set of training data to re-train CNN 3617. Measurement collector 3606 can collect data with adequate sampling frequency from different pipeline systems/configurations and sensor modules, including pitch and catch data, testing data with various leak sizes (orifices), and none-leak steady state/operation data. In some embodiments, measurement collector 3606 can simulate data generated from other modelling tools, such as SIMULINK and computational fluid dynamics (CFD) analysis, to emulate leak events which may be useful for retraining.

Window size selector 3608 can select the window size for time intervals. The time intervals can dictate the type and amount of data that will go into error forecasting in embodiments that make use of error forecasting. Window size selector 3608 will also dictate the size of the images that CNN 3617 will be processing.

Sliding training data interval picker 3610 can select intervals from within the collected measurements to use to train CNN 3617. This component can process the collected measurements and punch out training data intervals based on the window size. The frequency of training data sampling can be a user defined parameter or optimized through methods described herein (such as evolutionary optimization processes).

Continuous wavelet transformation performer 3612 can perform the continuous wavelet transformation on the training data intervals. The wavelet transformation is used to convert the windowed training data into color images.

Image assignor 3614 can classify the images based on their category or class. For example, image assignor may categorize the color images based on the presence of a leak, the size of a leak, and the location of a leak. None-leak status is typically the category with the highest frequency of presence during pipeline monitoring.

Re-trainer 3616 can re-train CNN 3617 to identify leaks in color images. CNN 3617 may be a CNN trained for image recognition. Re-trainer 3616 trains CNN 3617 to identify the relevant assignment from image assignor 3614 of the color images produced by continuous wavelet transformation performer 3612.

Measurement collector 3606, window size selector 3608, sliding training data interval picker 3610, continuous wavelet transformation performer 3612, image assignor 3614, re-trainer 3616 which includes CNN 3617 can be integrated with the computing device 3600, or may each be a stand-alone device (e.g., with a hardware processor and memory) connected to different components by network interface 3620, a connection, or a communication channel.

Transceiver 3618 can be used to transmit the leak alarm data to another computing device. For example, transceiver 3618 may send the leak alarm to a computing device with an interface for a user to indicate to the user that there is a (potential) leak detected. Alternatively, transceiver 3618 may send the leak alarm to an external datastore to store data relating to the leak alarm. Transceiver 3618 may also send and receive other information between computing device 3600 and other components (e.g., pipeline measurements from sensor(s) 3624). In some embodiments, the system may send the leak alarm with leak alarm data to a cloud site for further confirmation, for example, with information from sensors 3624. This may be done to further validate the existence of a leak, for example, by using information from two or more sensor sites, to reduce the number of false alarms.

In some embodiments, transceiver 3618 can use cellular, satellite, or local Ethernet methods of sending and receiving information. Systems, methods, and devices described herein can be compatible with all cloud-based platforms, such as IoT, remote control of leak testing, and data storage.

Network interface 3620 enables computing device 3600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 3622 enables computing device 3600 to interconnect with one or more input devices, such as a keyboard, mouse, camera, touch screen and a microphone, or with one or more output devices such as a display screen and a speaker. When I/O interface 3622 is interconnected to a display screen, it may be referred to as a display interface.

Sensor(s) 3624 can be pipeline sensors capable of measuring pipeline parameters. In some embodiments sensor(s) 3624 can be pressure sensors, sonic (acoustic) sensors, accelerometer transducers, temperature sensors, fluid density sensors, or flow velocity sensors. Other sensor types are also possible. Sensor(s) 3624 may also include a plurality of sensors which may or may not be the same type of sensor.

Sensor(s) 3624 can provide pipeline measurements to computing device 3600. In an example embodiment, sensor(s) 3624 can communicate with data aggregator point 3628 using sensor transmission signal(s) 3626 and data aggregator point signal 3630.

Data aggregator point 3628 can aggregate the data from sensor(s) 3624 and transmit the pipeline measurements through network 3632 to computing device 3600. Other aggregation method are also conceived. For example, some processing may be carried out by sensor(s) 3624.

Network 3632 can enable components of the system to communicate with one another such as computing device 3600, data aggregator point 3628, and electronic data store 3634.

Electronic datastore 3634 can be configured to store various data utilized by computing device 3600 including, for example, data reflective of measurement collector 3606, window size selector 3608, sliding training data interval picker 3610, continuous wavelet transformation performer 3612, image assignor 3614, re-trainer 3616 which includes CNN 3617. Electronic datastore 3634 may also store training data, model parameters, variables, hyperparameters, and the like. Electronic datastore 3634 may implement a relational or object-oriented database, such as Microsoft SQL Server, Oracle, DB2, Sybase, Pervasive, MongoDB, NoSQL, or the like. Electronic datastore 3634 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In accordance with an aspect, there is provided a system to adapt convolutional neural networks (CNNs) 3617 through transfer learning for pipeline data filtering, feature extraction, leak (or other anomaly) detection, and leak (or other anomaly) classification. The system including at least one pipeline sensor 3624 fluidly connected to the pipeline, a processor 3602, a memory 3604 operatively coupled to the processor 3602, instructions stored in the memory 3604. The at least one pipeline sensor 3624 is communicatively connected to the processor 3602. The instructions are executable by the processor 3604 to instruct the system to collect pipeline measurement data with adequate sampling frequency from different pipeline systems/configurations and sensor modules, including pitch and catch data, testing data with various leak sizes (orifices), and none-leak steady state/operation data using measurement collector 3606, select a window size with length of data coverage that varies from seconds to minutes using window size selector 3608, pick sliding training data intervals from each filtered time series for time-frequency analysis using sliding training data interval picker 3610, perform a continuous wavelet transformation (CWT) of windowed data inputs with adapted sampling frequency and colormap resolution to create color images using continuous wavelet transformation performer 3612, assign each image to its specified output category/class for supervised training using image assignor 3614, and retrain pre-selected deep pattern recognition CNN 3617 with modified layer parameters for leak detection and classification using re-trainer 3616. Once trained, the system may store CNN 3617 on memory 3604 or electronic datastore 3634 for future use or transmit it to an external computing device/server using transceiver 3618.

In accordance with a further aspect, the instructions may further instruct the system to apply low-pass filters (LPF), high-pass filters (HPF), band-pass filters (BPF) or a combination of the above to enhance pressure wave analysis.

In accordance with a further aspect, the instructions may further instruct the system to combine training images from raw and filtered pipeline image datastores as universal images. The system may retrieve these images from at least one sensor 3624, memory 3604, or from electronic datastore 3634.

Figure 37:
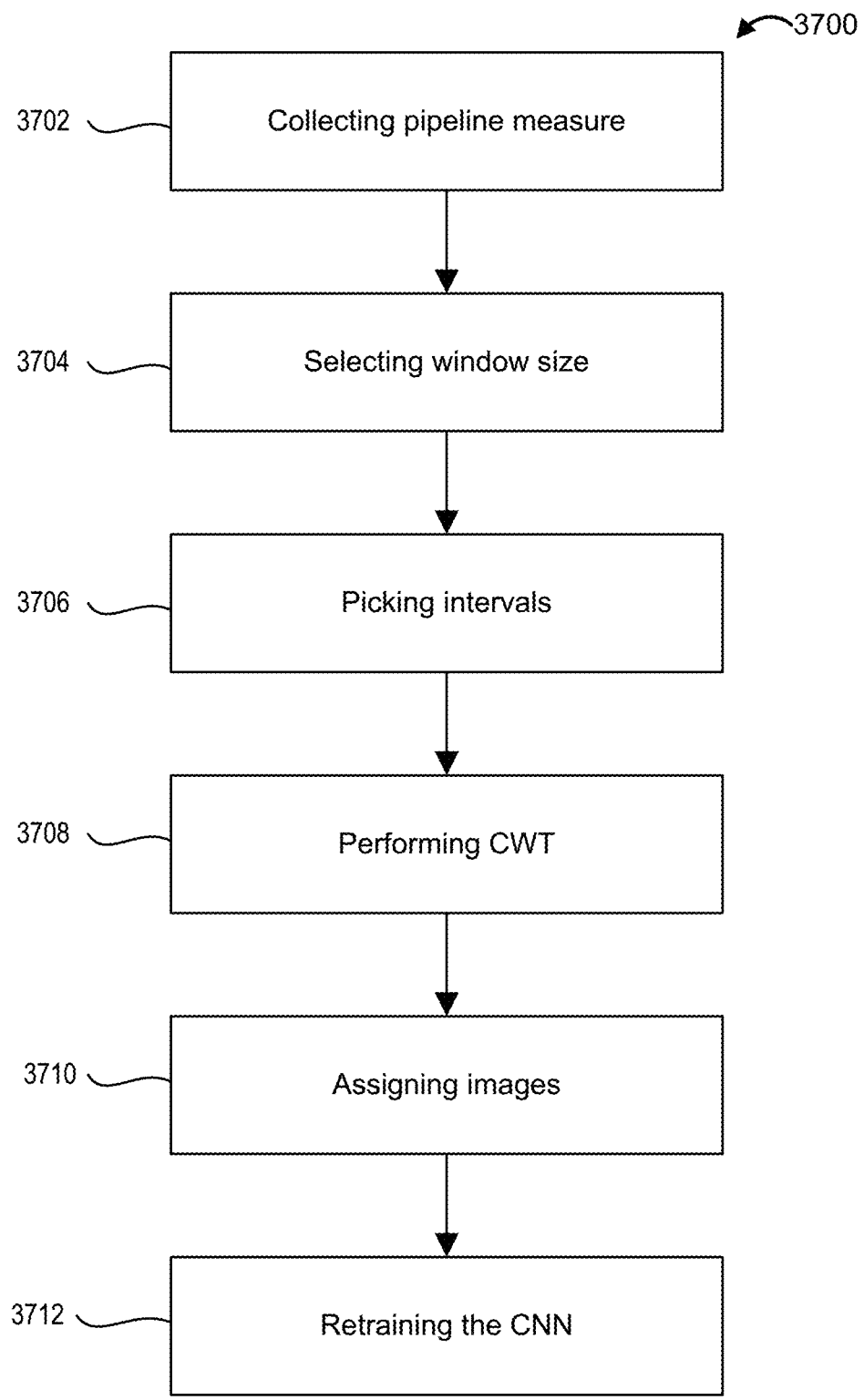
FIG. 37 illustrates a process diagram of a method of retraining a convolutional neural network to detect a leak alarm, according to some embodiments.

FIG. 37 illustrates a process diagram of a method 3700 of retraining a convolutional neural network to detect a leak alarm, according to some embodiments.

In accordance with an aspect, there is provided a method 3700 to adapt convolutional neural networks (CNNs) through transfer learning for pipeline data filtering, feature extraction, leak (or other anomaly) detection, and leak (or other anomaly) classification. The method 3700 including collecting pipeline measurement data with adequate sampling frequency from different pipeline systems/configurations and sensor modules, including pitch and catch data, testing data with various leak sizes (orifices), and none-leak steady state/operation data (3702), selecting a window size with length of data coverage that varies from seconds to minutes (3704), picking sliding training data intervals from each filtered time series for time-frequency analysis (3706), performing a continuous wavelet transformation (CWT) of windowed data inputs with adapted sampling frequency and colormap resolution to create color images (3708), assigning each image to its specified output category/class for supervised training (3710), and retraining pre-selected deep pattern recognition CNNs with modified layer parameters for leak detection and classification (3712).

In accordance with a further aspect, the method 3700 involves applying low-pass filters (LPF), high-pass filters (HPF), band-pass filters (BPF) or a combination of the above to enhance pressure wave analysis.

In accordance with a further aspect, the method 3700 involves combining training images from raw and filtered pipeline image datastores as universal images.

Some embodiments of the systems, methods, and devices described herein may timestamp and track locations of leaks or other anomalies. Such embodiments may be useful beyond leak detection, such as through providing historical data that may be used to determine root causes of leaks (e.g., if they happen in similar spots or at specific times). In some embodiments, leak signature timestamps registered at multiple sensor spots can help accurately determine the leak location. In some embodiments, data information from two sensor spots can be highlighted if a leak event happens between the two.

In some embodiments, the leak alarm may be indicative of a pressure surge and the system may send the leak alarm (i.e. leak alarm information) from the system to a cloud site to differentiate pressure surge behaviour indicative of a pipeline leak with pressure surge behaviour indicative of normal operation or another pipeline anomaly. The cloud site may make use of detected leak alarms (e.g., pressure surges) arising from other sensors.

Figure 38:
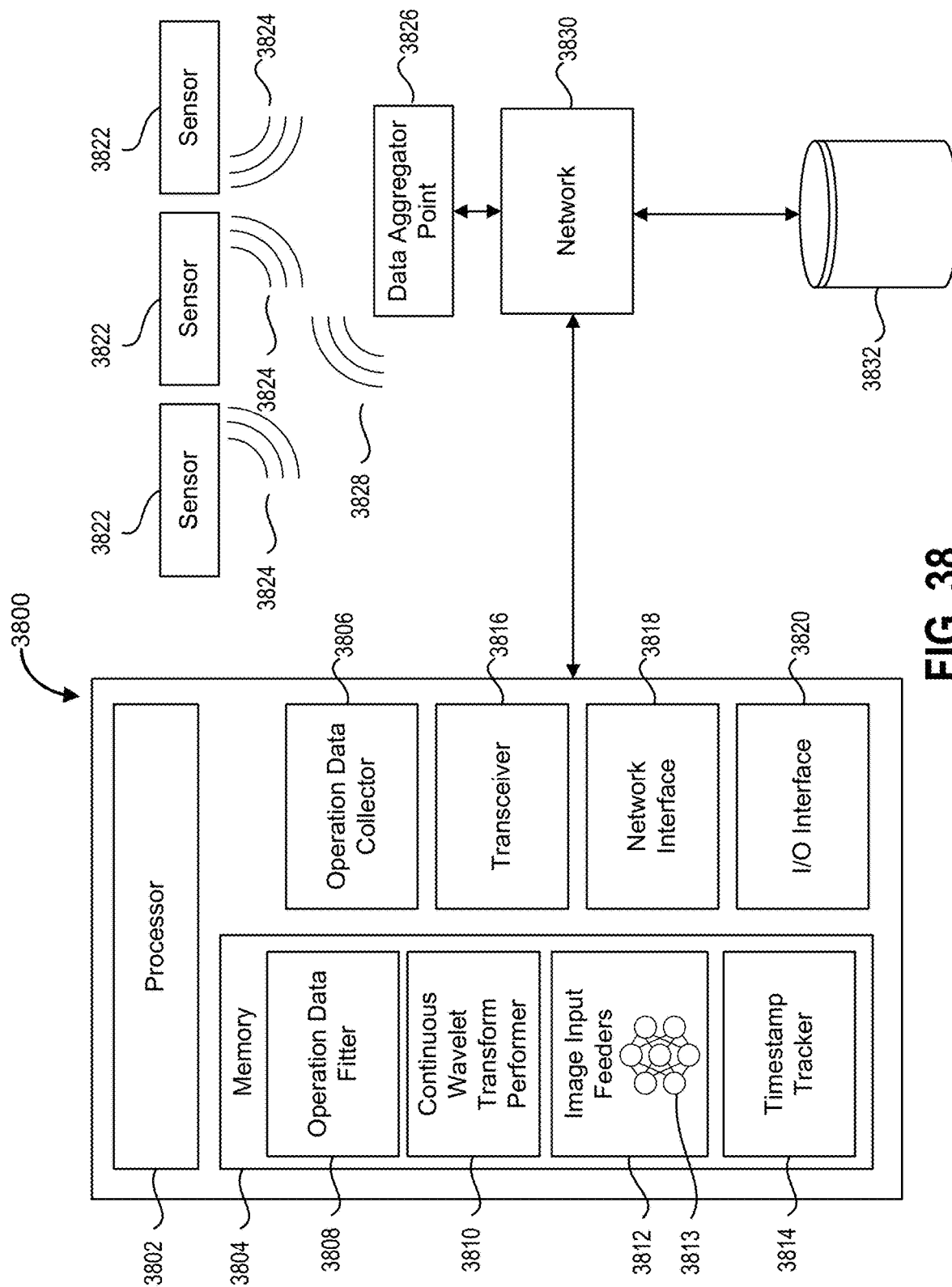
FIG. 38 illustrates a system to use a convolutional neural network (CNN) to detect leaks (or other anomalies) and store the timestamp and location of same, according to some embodiments.

FIG. 38 illustrates a system to use a convolutional neural network (CNN) 3813 to detect leaks (or other anomalies) and store the timestamp and location of same, according to some embodiments. The system includes a computing device 3800, one or more sensors 3822, a data aggregator 3826, a network 3830, and an electronic datastore 3832. Computing device 3800 includes a processor 3802, a memory 3804, an operation data collector 3806, a transceiver 3816, a network interface 3818, and an I/O interface 3820. The memory 3804 includes an operation data fitter 3808, a continuous wavelet transform performer 3810, an image input feeder 3812 including CNN 3813, a timestamp tracker 3814.

Processor 3802 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 3804 can be configured to store various data utilized by computing device 3800 including, for example, data reflective of operation data collector 3806, operation data fitter 3808, continuous wavelet transform performer 3810, image input feeder 3812 including CNN 3813, and timestamp tracker 3814. Memory 3804 may also store training data, model parameters, variables, hyperparameters, and the like. Memory 3804 may implement a relational or object-oriented database, such as Microsoft SQL Server, Oracle, DB2, Sybase, Pervasive, MongoDB, NoSQL, or the like. Memory 3804 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Operation data collector 3806 can collect operation data. Operation data collector can collect measurements from external sources and/or sensor(s) 3822. Operation data collector 3806 can compile a set of data.

Operation data fitter 3808 can fit the operation data to sliding windows with predetermined size. This can permit the CNN 3813 to better determine leaks indiscriminate of other system factors. In some embodiments, the time and frequency responses to sudden pressure-drop-induced leak signatures can vary from case to case. In these embodiments, the applicable sliding window size to capture the complete transient signature responses can be predetermined from the leak calibration testing for the given pipeline configuration, operating condition, and sensor positions. The CWT images generated with variable window sizes can be scaled to the same dimensions before training and testing CNNs.

Continuous wavelet transform performer 3810 can perform the continuous wavelet transformation on the training data intervals. The wavelet transformation is used to convert the windowed training data into color images.

Image input feeder 3812 can feed the images to CNN 3813. CNN 3813 can make determinations regarding, for example, the presence of a leak, the size of a leak, and the location of a leak.

Timestamp tracker 3814 can track the timestamps of leak detections and determine the location of the detected leaks.

Operation data collector 3806, operation data fitter 3808, continuous wavelet transform performer 3810, image input feeder 3812 including CNN 3813, and timestamp tracker 3814 can be integrated with the computing device 3800, or may each be a standalone device (e.g., with a hardware processor and memory) connected to different components by network interface 3820, a connection, or a communication channel.

Transceiver 3816 can be used to transmit the leak alarm data to another computing device. For example, transceiver 3816 may send the leak alarm to a computing device with an interface for a user to indicate to the user that there is a (potential) leak detected. Alternatively, transceiver 3816 may send the leak alarm to an external datastore to store data relating to the leak alarm. Transceiver 3816 may also send and receive other information between computing device 3800 and other components (e.g., pipeline measurements from sensor(s) 3822). In some embodiments, the system may send the leak alarm with leak alarm data to a cloud site for further confirmation, for example, with information from sensors 3822. This may be done to further validate the existence of a leak, for example, by using information from two or more sensor sites, to reduce the number of false alarms.

In some embodiments, transceiver 3816 can use cellular, satellite, or local Ethernet methods of sending and receiving information. Systems, methods, and devices described herein can be compatible with all cloud-based platforms, such as IoT, remote control of leak testing, and data storage.

Network interface 3818 enables computing device 3800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

I/O Interface 3820 enables computing device 3800 to interconnect with one or more input devices, such as a keyboard, mouse, camera, touch screen and a microphone, or with one or more output devices such as a display screen and a speaker. When I/O interface 3820 is interconnected to a display screen, it may be referred to as a display interface.

Sensor(s) 3822 can be pipeline sensor capable of measuring pipeline parameters. In some embodiments sensor(s) 3822 can be pressure sensors, sonic (acoustic) sensors, accelerometer transducers, temperature sensors, fluid density sensors, or flow velocity sensors. Other sensor types are also possible. Sensor(s) 3822 may also include a plurality of sensors which may or may not be the same type of sensor.

Sensor(s) 3822 can provide pipeline measurements to computing device 3800. In an example embodiment, sensor(s) 3822 can communicate with data aggregator point 3826 using sensor transmission signal(s) 3824 and data aggregator point signal 3828.

Data aggregator point 3826 can aggregate the data from sensor(s) 3822 and transmit the pipeline measurements through network 3830 to computing device 3800. Other aggregation method are also conceived. For example, some processing may be carried out by sensor(s) 3822.

Network 3830 can enable components of the system to communicate with one another such as computing device 3800, data aggregator point 3826, and electronic data store 3832.

Electronic datastore 3832 can be configured to store various data utilized by computing device 3800 including, for example, data reflective of operation data collector 3806, operation data fitter 3808, continuous wavelet transform performer 3810, image input feeder 3812 including CNN 3813, and timestamp tracker 3814. Electronic datastore 3832 may also store training data, model parameters, variables, hyperparameters, and the like. Electronic datastore 3832 may implement a relational or object-oriented database, such as Microsoft SQL Server, Oracle, DB2, Sybase, Pervasive, MongoDB, NoSQL, or the like. Electronic datastore 3832 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In accordance with an aspect, there is provided a system to apply adapted CNNs 3813 for pipeline operation data monitoring, health check, and leak detection. The system including at least one pipeline sensor 3822 fluidly connected to the pipeline, a processor 3802, a memory 3804 operatively coupled to the processor 3802, instructions stored in the memory 3804. The at least one pipeline sensor 3822 is communicatively connected to the processor 3802. The instructions are executable by the processor 3804 to instruct the system to collect operation data using operation data collector 3806, fit the operation data to the sliding windows with predetermined size using operation data fitter 3808, perform a continuous wavelet transform and constructing color image using continuous wavelet transform performer 3810, feed image inputs to the CNNs 3813 and generating outputs using image input feeder 3812, and track timestamps and determining a location of detected leaks using timestamp tracker 3814.

Pipeline health checks may include blockage detection. Some pipeline monitoring systems may be able to differentiate conditions of normal operation, leakage and blockage with combinational use of pressure measurement data, CWT image data and other senor data (e.g., fluid density data). Some embodiments of the devices, systems, and methods described herein may be capable of detecting pipeline anomalies such as blockages in a manner similar to their leak detection. Leak alarms and the timestamps thereof may further be analyzed by a cloud site receiving leak alarms from a plurality of sensor(s) 3822.

In accordance with a further aspect, the instructions may further instruct the system to process raw operation data with predetermined filtering algorithms using filter, and the fit the operation data includes fitting the filtered operation data.

In some embodiments, system 3800 may collect the operation data using operation data collector 3806, determine a leak alarm through other means, saving the timestamp of the leak alarm in, for example, memory 3804 or electronic datastore 3832. The system may then validate this leak alarm by fitting the operation data at the timestamp to the sliding windows with predetermined size using operation data fitter 3808, performing a continuous wavelet transform, and construct color image using continuous wavelet transform performer 3810, feeding image inputs to the CNNs 3813, and generating outputs using image input feeder 3812, and tracking timestamps and determining a location of detected leaks using timestamp tracker 3814.

Figure 39:
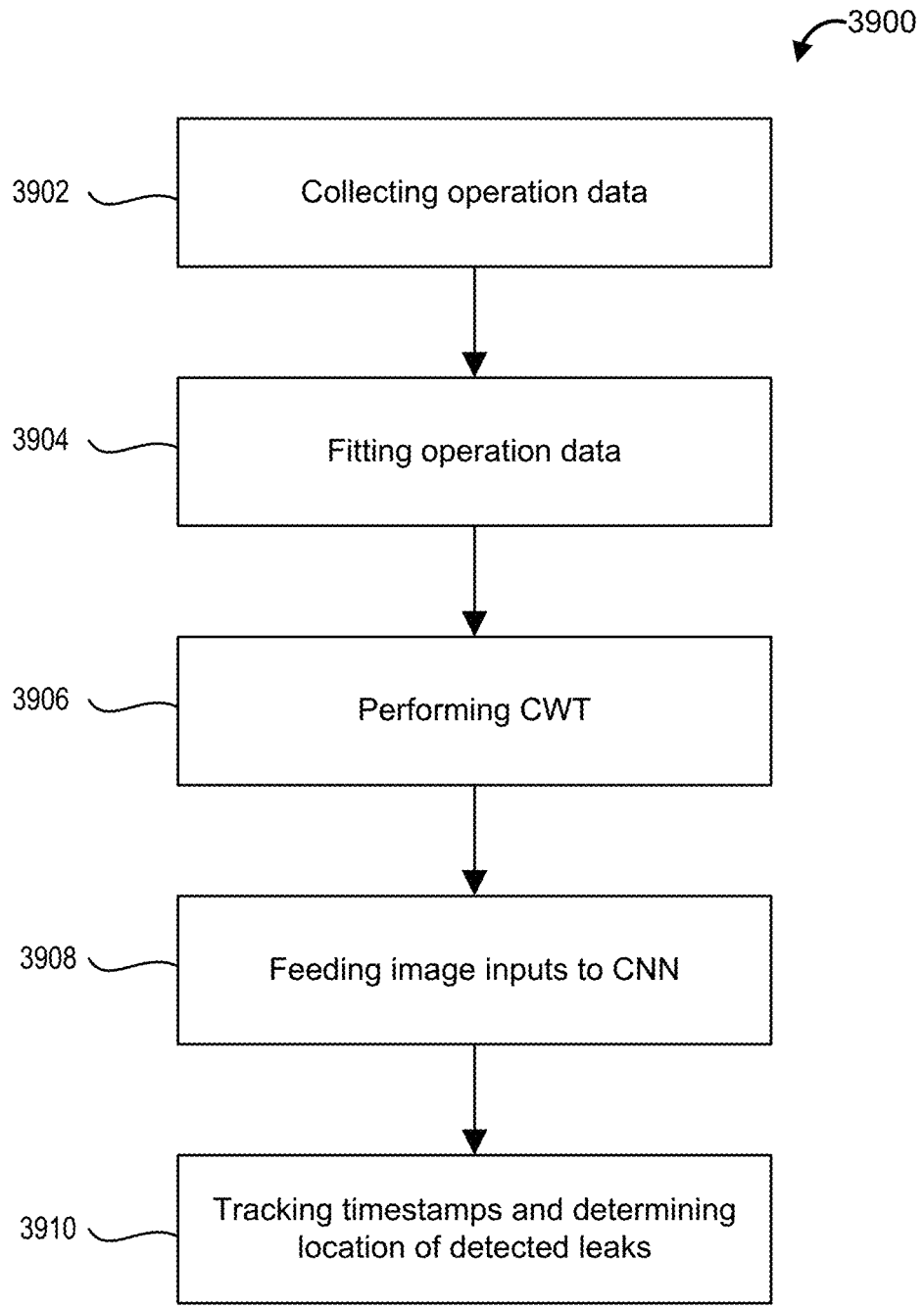
FIG. 39 illustrates process diagram of a method of using a convolutional neural network to detect leaks and store the timestamp and location of same, according to some embodiments.

FIG. 39 illustrates process diagram of a method 3900 of using a convolutional neural network to detect leaks and store the timestamp and location of same, according to some embodiments.

In accordance with an aspect, there is provided a method 3900 to apply adapted CNNs for pipeline operation data monitoring, health check, and leak detection. The method 3900 including collecting operation data (3902), fitting the operation data to the sliding windows with a predetermined size (3904), performing a continuous wavelet transform and constructing color image (3906), feeding image inputs to the CNNs and generating outputs (3908), and tracking timestamps and determining a location of detected leaks (3910).

In accordance with a further aspect, processing raw operation data with predetermined filtering algorithms, and the fitting the operation data may include fitting the filtered operation data.

In some embodiments, the method 3900 includes collecting the operation data (3902), determining a leak alarm through other means and saving the timestamp of the leak alarm. The method may then validate this leak alarm by fitting the operation data to the sliding windows with predetermined size (3904), performing a continuous wavelet transform and constructing color image (3906), feeding image inputs to the CNNs and generating outputs (3908), and tracking timestamps and determining a location of detected leaks (3910).

Other Embodiments—Raw Data Input

Some embodiments described above can combine statistic data screening with CNN based leak signature (or other pipeline anomalies) validation and classification. Other embodiments can apply time-frequency images of the raw data directly to the CNNs and automatically determine the best filtering combinations and underlying function of image pattern recognition. Taking full advantage of deep learning, CNNs in these embodiments can be trained with raw data collected from different systems with variety of classes, and can be used as a comprehensive framework to complete all tasks involved in leak detection.

Figure 40:
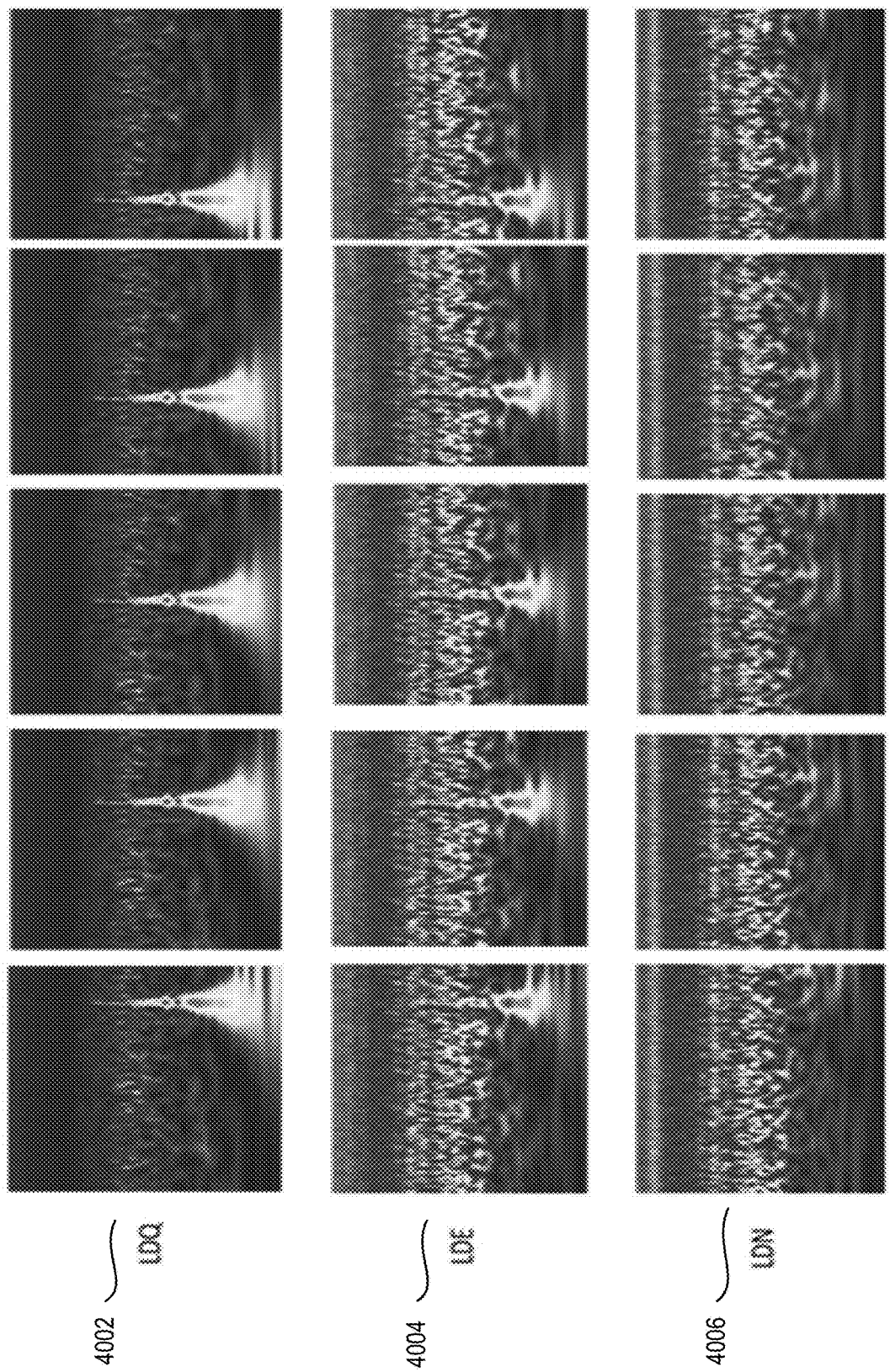
FIG. 40 illustrates training image examples calculated using the raw pressure data from an internal test loop, according to some embodiments.

FIG. 40 illustrates training image examples calculated using the raw pressure data from an internal test loop, according to some embodiments. To maximize the utilization of time-frequency information, original sampling frequency of 1000 Hz can be kept for raw-data-based CNN input generation. Row 4002 illustrates leak detection quarter inch orifice (LDQ) training images (leak detected in ¼" orifice). Row 4004 illustrates leak detection eighth inch orifice (LDE) training images (leak detected in ⅛" orifice). Row 4006 illustrates none-leak (LDN) training images and (none leak detected).

Figure 41:
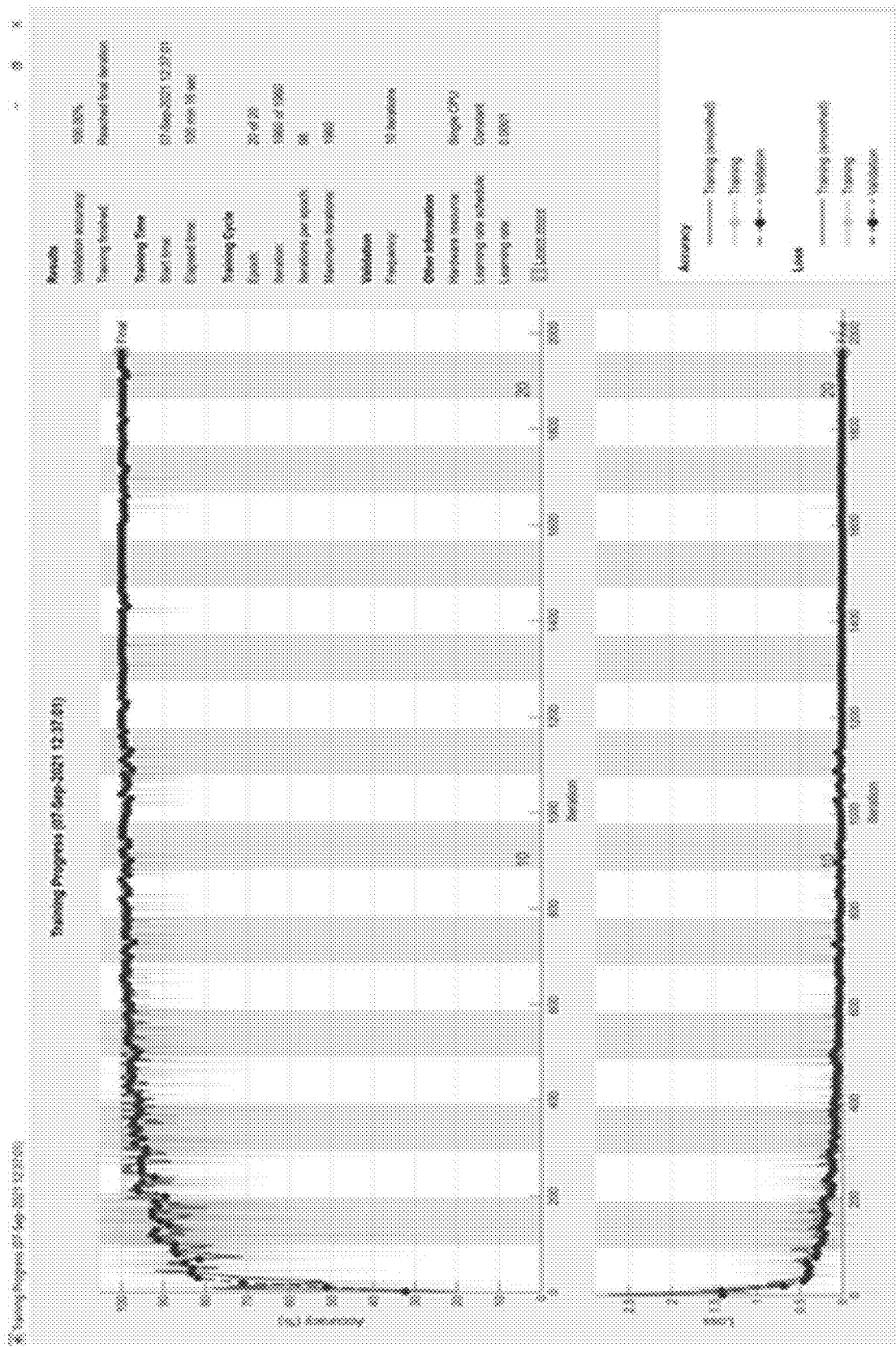
FIG. 41 illustrates example retraining results with modified layer parameters of GoogleNet using raw data images as inputs, according to some embodiments.

FIG. 41 illustrates example retraining results with modified layer parameters of GoogleNet using raw data images as inputs, according to some embodiments.

Figure 42:
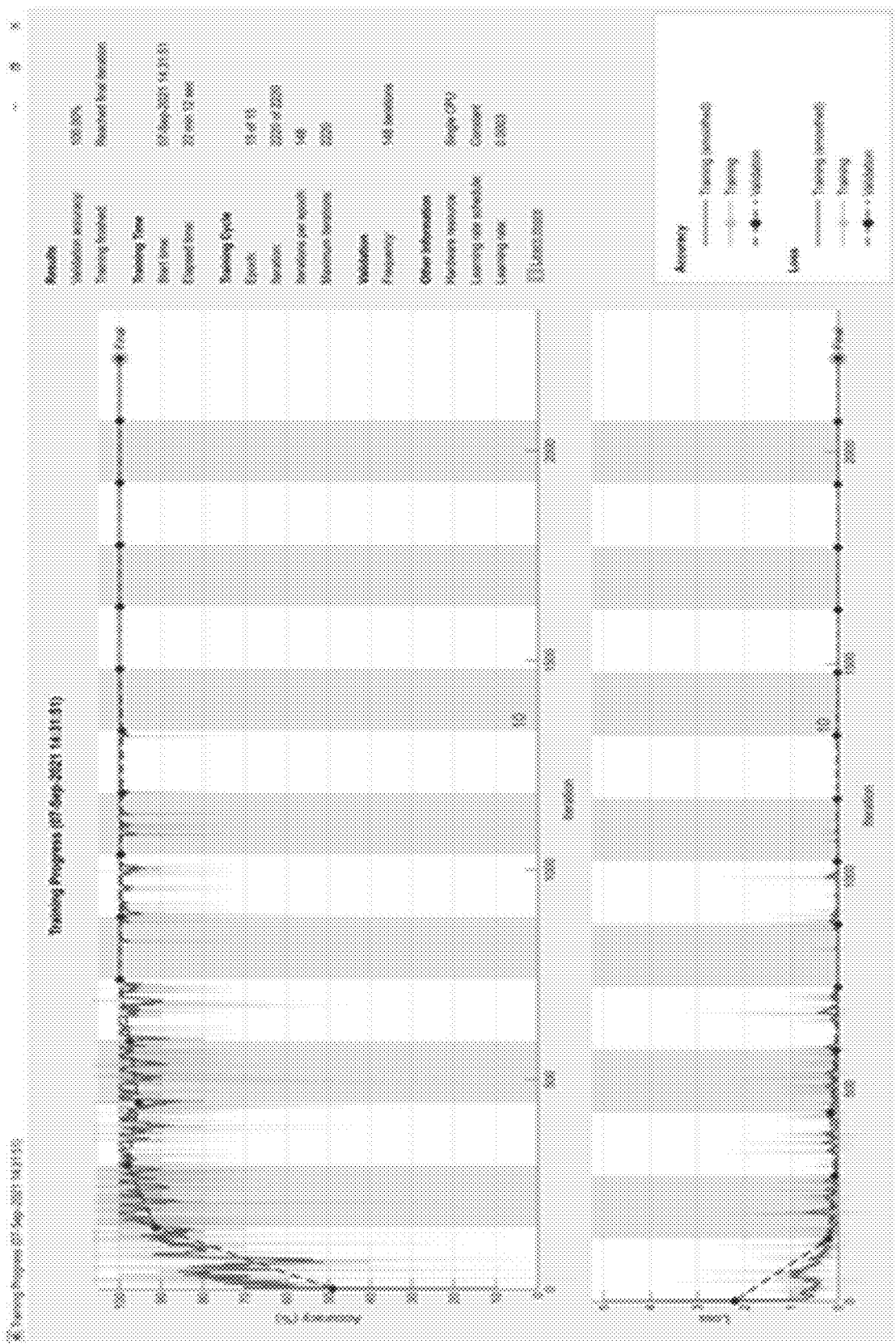
FIG. 42 illustrates example retraining results with modified layer parameters of SquezzeNet using raw data images as inputs, according to some embodiments.

FIG. 42 illustrates example retraining results with modified layer parameters of SquezzeNet using raw data images as inputs, according to some embodiments.

For FIG. 41 and FIG. 42, from among 1854 images in total, 1483 images may be used for the training and 371 images may be used for the validation. The number of layers can be kept the same as applied to the filtered data inputs. Both Figures show that the classification accuracy for validation data is about 100% for both retrained GoogleNet and SqueezeNet, indicating the potential advantages of raw-data-based CNN model development.

Additional testing used 200 images with leak signatures and 150 images with none-leak signatures. The results tested on GoogleNet and SqueezeNet achieved 97.5 to 100% accuracy which is consistent to the validation results of the training.

Figure 43:
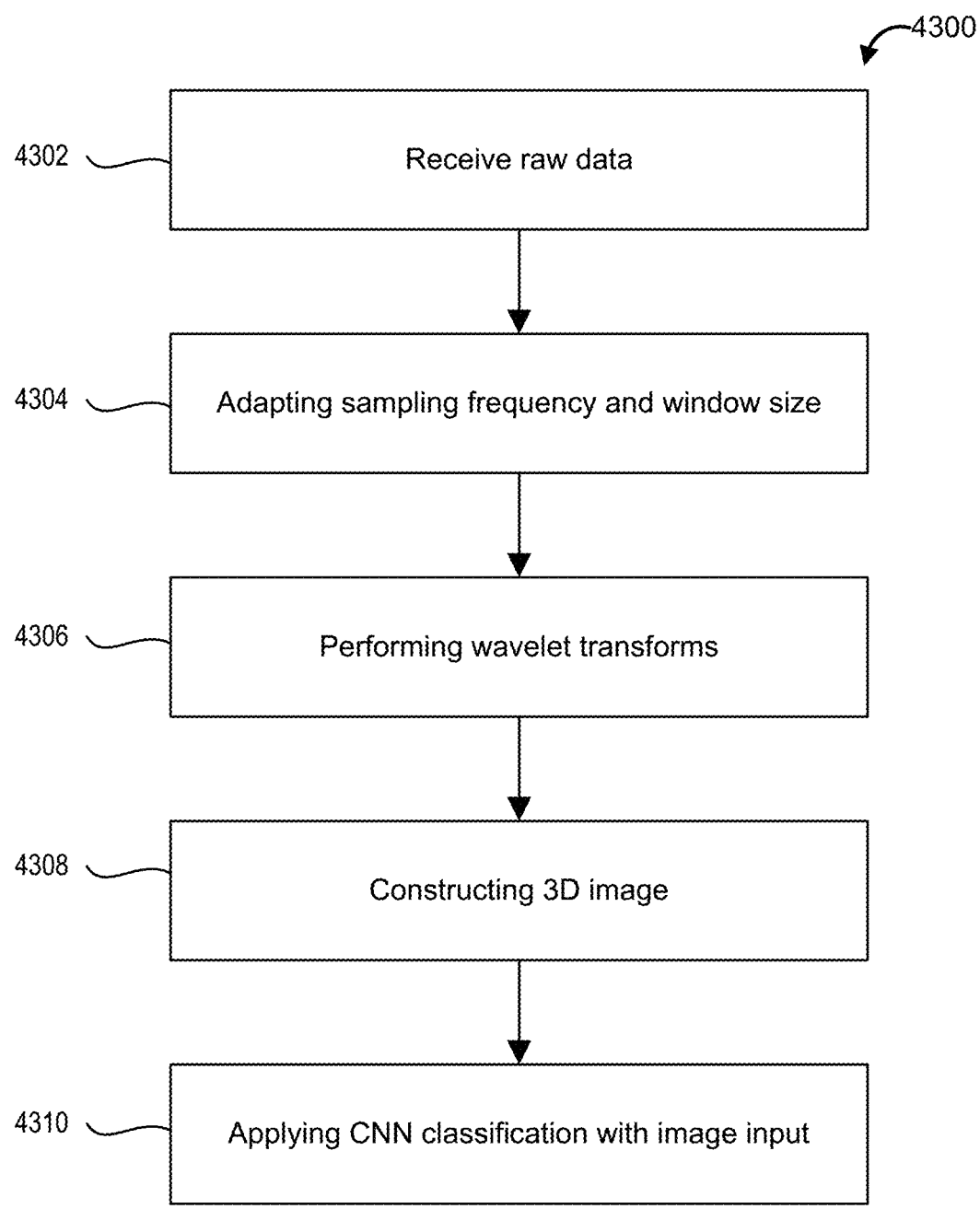
FIG. 43 illustrates the procedure for a method of implementing some embodiments of the systems and methods described herein using raw data, according to some embodiments.

FIG. 43 illustrates the procedure for a method 4300 of implementing some embodiments of the systems and methods described herein using raw data, according to some embodiments.

At block 4302, raw data can be received from pipeline sensors. At block 4304, the sample frequency and window size can be adapted. At block 4306, the wavelet transforms can be performed. At block 4308, 3D images can be constructed. At block 4310, the CNN classification can be applied to the image input.

As a standalone platform independent to user predetermined filtering and data screening algorithms, CNN trained with raw-data-based images may find more general applications in pipeline leak detection.

Although pressure sensor measurements have been used to explain principles and applications in this disclosure, there is no limit to use other sensor measurements available in internal computational pipeline monitoring, such as sonic (acoustic) sensor and accelerometer transducer. In practice, any available sensor measurements with appropriate time-frequency presentation can be saved as color image for potential use with CNNs, as long as the classification in the training data can be specified for supervised learning. To build a comprehensive training database, it can be demanding to optimize selection of system calibration data and to maximize collection of field leakage data.

As an extension of these alternative embodiments, CNNs can be trained with multiple sensor measurement data with same sensor type. In this embodiment, color images from multiple sensors expand the size and diversity of training data. Timestamps registered at different sensors may be reflected on the images and the leak signatures can be highlighted on the colormaps and tracked from pixels in determining the leak locations.

In some embodiments, training images generated from CWT of the raw and filtered pressure data can be merged for more universal applications, adaptively fitting the existing signal processing frameworks in different pipeline systems. The task of the CNN training from the combined images is to extract the common features from the integrated data varying in sampling frequency, window size and signal processing.

Figure 44:
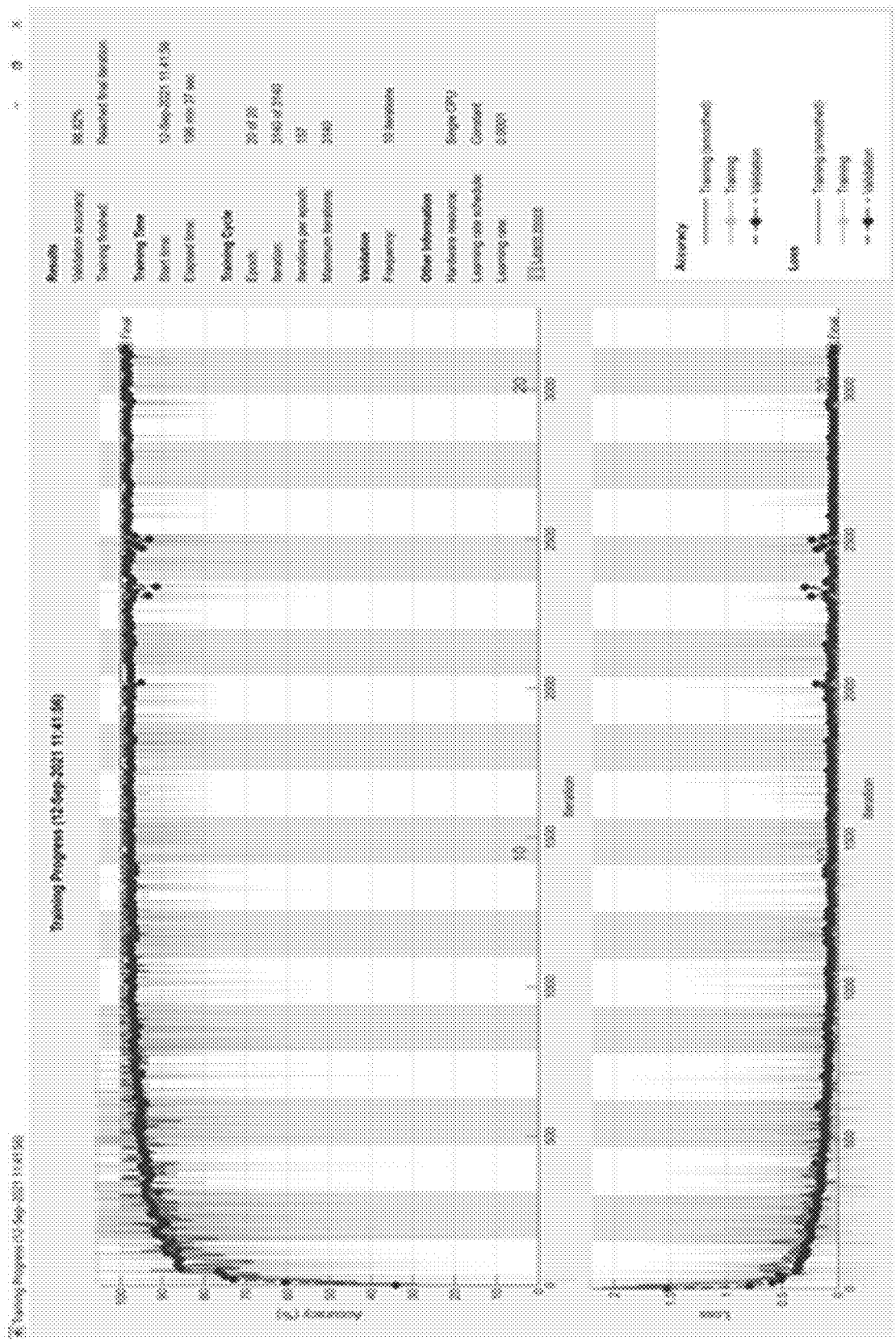
FIG. 44 illustrates a re-trained GoogleNet example merging images generated from the raw and filtered pressure data, according to some embodiments.

FIG. 44 illustrates a re-trained GoogleNet example merging images generated from the raw and filtered pressure data, according to some embodiments. The sampling frequency can be 1000 Hz for raw data and 100 Hz for the filtered data in this example. About 3000 images may used be with 80% for the training and 20% for the validation.

Other Embodiments

Any of the systems and methods described previously can be adapted for use with raw data. For example, systems illustrated in FIG. 1, FIG. 34, FIG. 36, and FIG. 38 can all make use of raw data or they can implement filters to filter the data prior to analysis by the CNN. Correspondingly a filtering step may be added to the methods illustrated in FIG. 35, FIG. 37, and FIG. 39.

In accordance with a further aspect, the at least one pipeline sensor (102, 2518, 2720, 3418, 3624, 3822) may include at least one of a pressure sensor, a sonic (acoustic) sensor, an accelerometer transducer, a temperature sensor, a fluid density sensor, and a flow velocity sensor. Any of the methods illustrated in FIG. 2, FIG. 26, FIG. 28, FIG. 33, FIG. 35, FIG. 37, and FIG. 39 may make use of any of the sensor types indicated above or any other appropriate sensor types. One type may be used within a system or method or a combination of different sensor types.

In accordance with a further aspect, generating the leak alarm may include identifying a distance between the at least one pipeline sensor and a leak. Any of the systems and methods described herein may not only determine whether there is a leak (or other anomaly), but also determine the location of the leak. The location determination may be a range of locations or an approximate location. The location may be an absolute location within the pipeline system or a location relative to a sensor. In some embodiments, the location of the leak may be determined through the use of rarefaction wave detection, such as, for example, described in International Application No PCT/US2020/044904, titled "PIPELINE LEAK DETECTION APPARATUS AND METHODS THEREOF", filed on 4 Aug. 2020, which claims priority to U.S. patent application Ser. No. 16/944,779, titled "PIPELINE LEAK DETECTION APPARATUS AND METHODS THEREOF", filed on 31 Jul. 2020, which is a continuation-in-part of U.S. patent application Ser. No. 16/532,371, titled "A PIPELINE LEAK DETECTION APPARATUS AND A METHOD OF USING SAME", filed on 5 Aug. 2019, the contents of all of which are hereby incorporated herein by reference.

In accordance with a further aspect, generating the leak alarm (or pressure surge notice) may include identifying a size of a leak (or other anomaly). Any of the systems and methods described herein may not only determine whether there is a leak, but also determine the size of the leak. The size determination may be a range of sizes or an approximate size.

In accordance with a further aspect, generating the leak alarm may include identifying a shape of a leak (or other anomaly). Any of the systems and methods described herein may not only determine whether there is a leak, but also determine the shape of the leak. The shape determination may be a range of shapes or an approximate shape. In some embodiments, a convolutional neural network may be trained on image inputs generated from acoustic sensors to, for example, estimate the shape of leaks.

In accordance with a further aspect, the at least one pipeline sensor (102, 2518, 2720, 3418, 3624, 3822) may include a plurality of pipeline sensors. Any of the methods illustrated in FIG. 1, FIG. 26, FIG. 28, FIG. 33, FIG. 35, FIG. 37, and FIG. 39 may make use of a plurality of sensors. In some embodiments, using multiple sensors may better determine, for example, the location of a leak (or other anomaly). In some embodiments, at least two pressure sensors are used to locate leak locations (or other anomalies) based on the speed of sound transmitted through pipeline fluid media and the timestamps of leak signatures registered at sensor locations. One non-limiting advantage of using a plurality of sensors is that it may help evaluate the signal attenuation as a function of leak size over the distance of the pipeline, and may help develop more robust solutions for leak detection (e.g., establishing a fuzzy set (e.g., an ANFIS model), rather than a hard limit, of thresholds in decision making). In some embodiments, using measurements from different types of sensors at selected end points through mass balance analysis may detect leaks (or other anomalies).

The foregoing primarily focused on liquids flowing through metal pipelines. Embodiments to the present disclosure can detect leaks in fluid pipelines. Some embodiments can detect leaks in liquid pipelines. Some embodiments can detect leaks in gas pipelines. Some embodiments can detect leaks in pipelines made up of alternative (e.g., soft) materials. Some embodiments can be used in pipeline health checks to check operational conditions.

Implementation Details

Figure 45:
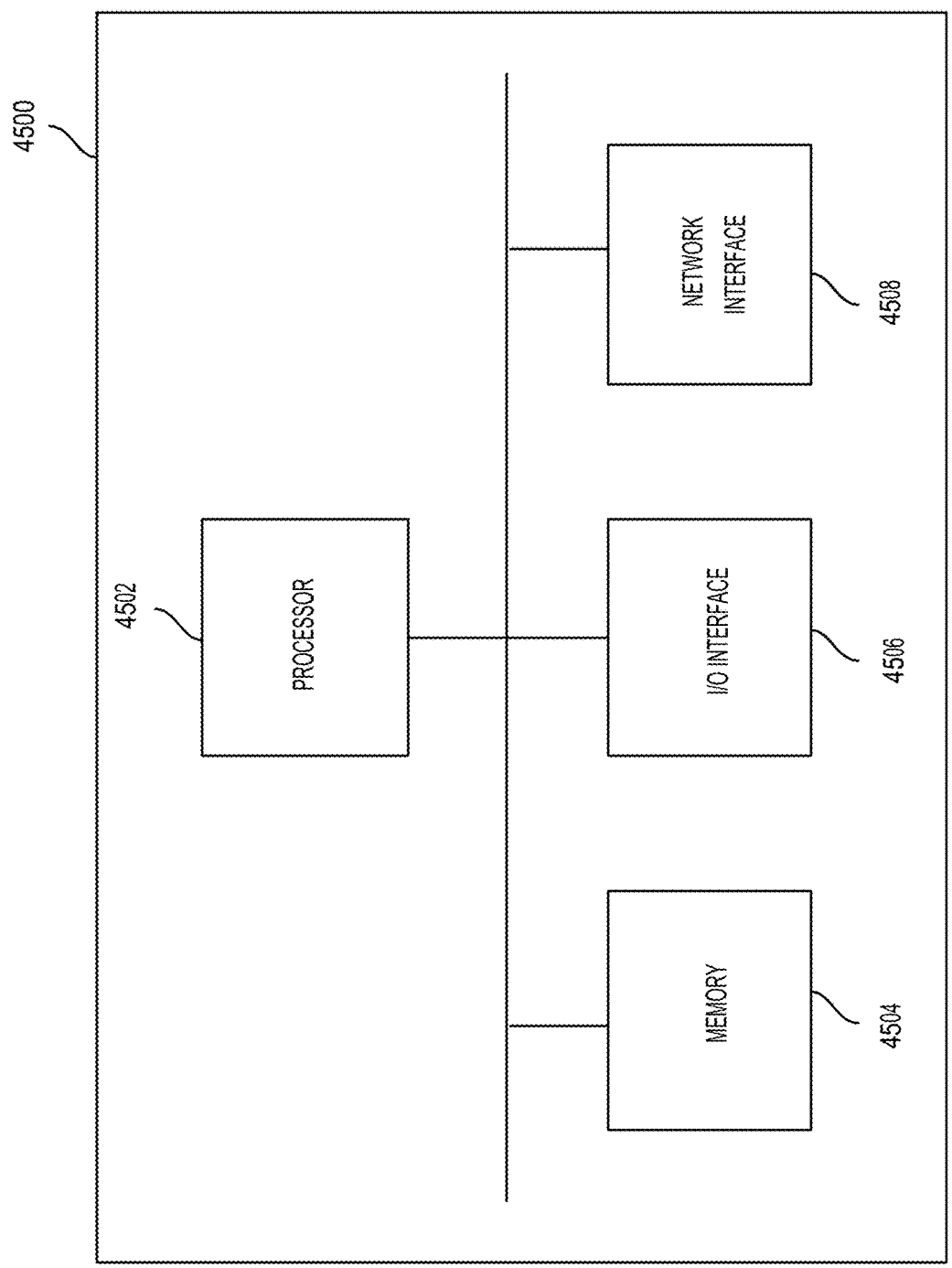
FIG. 45 illustrates a schematic diagram of an example computing device suitable for implementing the systems in FIG. 1, FIG. 25, FIG. 27, FIG. 34, FIG. 36, or FIG. 38, in accordance with an embodiment.

The methods and systems described herein can be implemented using different physical hardware components. For example, FIG. 45 is a schematic diagram of computing device 4500 in accordance with an embodiment. As depicted, computing device 4500 includes at least one processor 4502, memory 4504, at least one I/O interface 4506, and at least one network interface 4508.

Each processor 4502 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 4504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 4506 enables computing device 4500 to interconnect with one or more input devices, such as a keyboard, mouse, camera, touch screen and a microphone, or with one or more output devices such as a display screen and a speaker. When I/O interface 4506 is interconnected to a display screen, it may be referred to as a display interface.

Each network interface 4508 enables computing device 4500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, a computing device 102, 130, 2500, 2700, 3400, 3600 and 3800 may have components and/or architecture as shown in FIG. 45 and described in relation thereto.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

In accordance with a further aspect, a non-transitory computer readable medium containing program instructions for causing a computer to perform the method described herein.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A computer implemented method to detect pipeline leaks in a pipeline utilizing a plurality of sensor devices located adjacent the pipeline, the method comprising:
   capturing, from each of the plurality of sensor devices, pipeline measurement data associated with a fluid flow in the pipeline;
   determining, by a computer processor in each of the sensor devices, pressure surge data by applying a trained convolutional neural network (CNN) model to the captured pipeline measurement data for classifying pipeline pressure measurement images at each sensor site;
   transferring, via a computer network, pressure surge information from at least a portion of the plurality of sensor sites to a cloud site located remotely and separate from each of the plurality of sensor devices, whereby the pressure surge information consists of timestamps associated with the pressure surge data and at least one of a value of a pressure drop (DP), a simulated change of a flow rate (DV) for the given pressure drop, a magnitude of a triggering value (MT) from a simulation output of enhanced filtering, and a sum of a scalogram (SS) of a continuous wavelet transform (CWT); and
   determining, in the cloud site, whether the determined pressure surge data is a pipeline leak by applying the pressure surge information to an Adaptive Neural-Fuzzy Inference System (ANFIS) model.

2. The method of claim 1, further comprising training the CNN model to classify pipeline pressure measurement images using a pipeline pressure measurement image database.

3. The method of claim 2, further comprising constructing the pipeline pressure measurement image database, wherein constructing the pipeline pressure measurement image database comprises:
   collecting pressure measurement data from a plurality of pipelines transmitting one or more fluids;
   processing the measurement data using one or more filtering algorithms;
   selecting representative data patterns from a windowed time series;
   assigning the representative data patterns into different classes;
   creating 3D images from the representative data patterns using continuous wavelet transform (CWT);
   checking image class assignment of the created 3D images and removing outliers; and
   storing the created 3D images as measurement images with their class labels.

4. The method of claim 2, wherein training the CNN model comprises:
   selecting measurement images from the pipeline pressure measurement image database;
   training the CNN model through transfer learning;
   adjusting image selection or image class assignment for re-training; and
   comparing multiple CNN model performance to optimize model selection.

5. The method of claim 1, wherein determining whether the determined pressure surge data is a pipeline leak comprises: differentiating the pipeline leak from other pressure surges by using an adaptive neuro-fuzzy inference system (ANFIS) model.

6. The method of claim 5, wherein the ANFIS model is pipeline specific, and wherein the ANFIS model is trained with recorded historic pressure surge data inputs from one or more of actual pipeline leak events, simulated leak events, and the events associated with pipeline routine operations.

7. The method of claim 6, wherein the recorded historic pressure surge data inputs are calculated from a sensor pair of the plurality of sensor sites, and wherein the recorded historic pressure surge data inputs comprise a DT gradient and at least one of a ratio parameter value of a pressure drop (DP) over a distance between the sensor pair, a simulated change of a flow rate (DV) for the given pressure drop over a distance between the sensor pair, a magnitude of a triggering value (MT) from a simulation output of enhanced filtering over a distance between the sensor pair, and a sum of a scalogram (SS) of a continuous wavelet transform (CWT) over a distance between the sensor pair.

8. The method of claim 6, wherein the recorded historic pressure surge data inputs are calculated from a sensor pair of the plurality of sensor sites, wherein output from the ANFIS model is a scalar output, and wherein magnitude of the scalar output indicates that at least one of pipeline leak or routine operation is initiated within a distance between the sensor pair, at one sensor site of the sensor pair, or outside a measurement range of the sensor pair.

9. The method of claim 1, further comprising identifying a location of the pipeline leak.

10. The method of claim 1, wherein applying the trained CNN model further comprises:
receiving the pipeline pressure measurement data from a sensor site of the plurality of sensor sites;
screening the pipeline pressure measurement data to detect an anomaly triggering point;
constructing a continuous wavelet transform (CWT) 3D testing image using windowed data inputs around the anomaly triggering point; and
identifying a pressure surge by classifying the testing image using the trained CNN model.

11. A computer system to detect pipeline leaks in a pipeline utilizing a plurality of sensor devices respectively located at a plurality of sensor sites located adjacent the pipeline, the system comprising:
a plurality of sensor sites, each sensor site comprising a sensor device having a sensor processor and a sensor memory, wherein sensor instructions stored in the sensor memory and executable by the sensor processor instruct each sensor site to:
capture pipeline pressure measurement data associated with a fluid flow in the pipeline;
identify a pipeline pressure surge event at each sensor site by applying a trained convolutional neural network (CNN) model to the captured pipeline pressure measurement data for classifying pipeline pressure measurement images; and
transfer pressure surge information, via a computer network to a cloud site located remotely from each of the plurality of sensor sites, wherein the pressure surge information consists of timestamps associated with the pressure surge data and at least one of a value of a pressure drop (DP), a simulated change of a flow rate (DV) for the given pressure drop, a magnitude of a triggering value (MT) from a simulation output of enhanced filtering, and a sum of a scalogram (SS) of a continuous wavelet transform (CWT); and
the cloud site comprising a cloud processor and a cloud memory, wherein cloud instructions stored in the cloud memory and executable by the cloud processor instruct the cloud site to:
receive the pressure surge information from at least a portion of the plurality of sensor sites; and
determine whether the identified pressure surge is a pipeline leak using the pressure surge information by applying the pressure surge information to an Adaptive Neural-Fuzzy Inference System (ANFIS) model.

12. The system of claim 11, wherein the CNN model is trained for classifying pipeline pressure measurement images using a pipeline pressure measurement image database.

13. The system of claim 12, wherein the sensor instructions, the cloud instructions, or both instruct each sensor site, the cloud site, or both to construct the pipeline pressure measurement image database, wherein, to construct the pipeline pressure measurement image database, the sensor instructions, the cloud instructions, or both instruct each sensor site, the cloud site or both to:
collect pressure measurement data from a plurality of pipelines transmitting one or more fluids;
process the measurement data using one or more filtering algorithms;
select representative data patterns from a windowed time series;
assign the representative data patterns into different classes;
create 3D images from the representative data patterns using continuous wavelet transform (CWT);
check image class assignment of the created 3D images and removing outliers; and
store the created 3D images as measurement images with their class labels.

14. The system of claim 12, wherein the sensor instructions, the cloud instructions, or both instruct each sensor site, the cloud site, or both to train the CNN model, wherein, to train the CNN model, the sensor instructions, the cloud instructions, or both instruct each sensor site, the cloud site, or both to:
select measurement images from the pipeline pressure measurement image database;
train the CNN model through transfer learning;
adjust image selection or image class assignment for re-training; and
compare multiple CNN model performance to optimize model selection.

15. The system of claim 11, wherein the cloud instructions further instruct the cloud site to determine that the identified pressure surge event is a pipeline leak, wherein, to determine that the identified pressure surge is a pipeline leak, the cloud instructions instruct the cloud site to: differentiate the pipeline leak from other pressure surges via an adaptive neuro-fuzzy inference system (ANFIS) model.

16. The system of claim 15, wherein the ANFIS model is pipeline specific, and wherein the ANFIS model is trained with recorded historic pressure surge data inputs from one or more of actual pipeline leak events, simulated leak events, and the events associated with pipeline routine operations.

17. The system of claim 16, wherein the recorded historic pressure surge data inputs are calculated from a sensor pair of the plurality of sensor sites, and wherein the recorded historic pressure surge data inputs comprise a DT gradient and at least one of a ratio parameter value of a pressure drop (DP) over a distance between the sensor pair, a simulated change of a flow rate (DV) for the given pressure drop over a distance between the sensor pair, a magnitude of a triggering value (MT) from a simulation output of enhanced filtering over a distance between the sensor pair, and a sum of a scalogram (SS) of a continuous wavelet transform (CWT) over a distance between the sensor pair.

18. The system of claim 16, wherein the recorded historic pressure surge data inputs are calculated from a sensor pair of the plurality of sensor sites, wherein output from the ANFIS model is a scalar output, and wherein magnitude of the scalar output indicates that at least one of pipeline leak or routine operation is initiated within a distance between the sensor pair, at one sensor site of the sensor pair, or outside a measurement range of the sensor pair.

19. The system of claim 11, wherein the cloud instructions further instruct the cloud site to identify a location of the pipeline leak.

20. The system of claim 11, wherein the cloud instructions further instruct the cloud site to apply the trained CNN model, wherein, to apply the trained CNN model, the cloud instructions instruct the cloud site to:

receive the pipeline pressure measurement data from the sensor site;

screen the pipeline pressure measurement data to detect an anomaly triggering point;

construct a continuous wavelet transform (CWT) 3D testing image using windowed data inputs around the anomaly triggering point; and identify a pressure surge by classifying the testing image using the trained CNN model.

21. A non-transitory computer-readable medium containing program instructions for causing a computer to perform operations comprising:

identifying a pipeline pressure surge event at each of a plurality of sensor site by applying a trained convolutional neural network (CNN) model upon captured pipeline measurement data for classifying pipeline pressure measurement images on each sensor site of the plurality of sensor sites, the plurality of sensor sites capturing pipeline pressure measurement data associated with a fluid flow in a pipeline;

transferring pressure surge information obtained from at least a portion of the plurality of sensor sites to a cloud site located remotely from each of the plurality of sensor sites, the pressure surge information consists of timestamps associated with the pressure surge data and at least one of a value of a pressure drop (DP), a simulated change of a flow rate (DV) for the given pressure drop, a magnitude of a triggering value (MT) from a simulation output of enhanced filtering, and a sum of a scalogram (SS) of a continuous wavelet transform (CWT); and determining whether the identified pressure surge event is a pipeline leak at the cloud site using the pressure surge information by applying the pressure information to an Adaptive Neural-Fuzzy Inference System (ANFIS) model.

22. The non-transitory computer-readable medium of claim 21, wherein the operations further comprise training the CNN model to classify pipeline pressure measurement images using a pipeline pressure measurement image database.

23. The non-transitory computer-readable medium of claim 22, wherein the operations further comprise constructing the pipeline pressure measurement image database, wherein, to construct the pipeline pressure measurement image database, the operations comprise:

collecting pressure measurement data from a plurality of pipelines transmitting one or more fluids;

processing the measurement data using one or more filtering algorithms;

selecting representative data patterns from a windowed time series;

assigning the representative data patterns into different classes;

creating 3D images from the representative data patterns using continuous wavelet transform (CWT);

checking image class assignment of the created 3D images and removing outliers; and storing the created 3D images as measurement images with their class labels.

24. The non-transitory computer-readable medium of claim 22, wherein, to train the CNN model, the operations comprise:

selecting measurement images from the pipeline pressure measurement image database;

training the CNN model through transfer learning;

adjusting image selection or image class assignment for re-training; and comparing multiple CNN model performance to optimize model selection.

25. The non-transitory computer-readable medium of claim 21, wherein, to determine whether the identified pressure surge event is a pipeline leak, the operations comprise:

differentiating the pipeline leak from other pressure surges by using an adaptive neuro-fuzzy inference system (ANFIS) model.

26. The non-transitory computer-readable medium of claim 25, wherein the ANFIS model is pipeline specific, and wherein the ANFIS model is trained with recorded historic pressure surge data inputs from one or more of actual pipeline leak events, simulated leak events, and the events associated with pipeline routine operations.

27. The non-transitory computer-readable medium of claim 26, wherein the recorded historic pressure surge data inputs are calculated from a sensor pair of the plurality of sensor sites, and wherein the recorded historic pressure surge data inputs comprise a DT gradient and at least one of a ratio parameter value of a pressure drop (DP) over a distance between the sensor pair, a simulated change of a flow rate (DV) for the given pressure drop over a distance between the sensor pair, a magnitude of a triggering value (MT) from a simulation output of enhanced filtering over a distance between the sensor pair, and a sum of a scalogram (SS) of a continuous wavelet transform (CWT) over a distance between the sensor pair.

28. The non-transitory computer-readable medium of claim 26, wherein the recorded historic pressure surge data inputs are calculated from a sensor pair of the plurality of sensor sites, wherein output from the ANFIS model is a scalar output, and wherein magnitude of the scalar output indicates that at least one of pipeline leak or routine operation is initiated within a distance between the sensor pair, at one sensor site of the sensor pair, or outside a measurement range of the sensor pair.

29. The non-transitory computer-readable medium of claim 21, wherein the operations further comprise identifying a location of the pipeline leak.

30. The non-transitory computer-readable medium of claim 21, wherein, to apply the trained CNN model, the operations comprise:

receiving the pipeline pressure measurement data from a sensor site of the plurality of sensor sites;

screening the pipeline pressure measurement data to detect an anomaly triggering point;

constructing a continuous wavelet transform (CWT) 3D testing image using windowed data inputs around the anomaly triggering point; and identifying a pressure surge by classifying the testing image using the trained CNN model.

\* \* \* \* \*